US012568899B2

(12) United States Patent
Ghedami et al.

(10) Patent No.: US 12,568,899 B2
(45) Date of Patent: Mar. 10, 2026

(54) PORTABLE DEPLOYABLE MODULAR INDOOR VERTICAL AGRICULTURAL GROWING MACHINE

(71) Applicant: POTENTO, LLC, Houston, TX (US)

(72) Inventors: Navid Ghedami, Houston, TX (US); Silas Lanham Frazier, III, Houston, TX (US)

(73) Assignee: Potento, LLC, Houston, TX (US)

( * ) Notice: Subject to any disclaimer, the term of this patent is extended or adjusted under 35 U.S.C. 154(b) by 0 days.

(21) Appl. No.: 19/117,720

(22) PCT Filed: Apr. 7, 2024

(86) PCT No.: PCT/US2024/023503
§ 371 (c)(1),
(2) Date: Apr. 2, 2025

(87) PCT Pub. No.: WO2024/211867
PCT Pub. Date: Oct. 10, 2024

(65) Prior Publication Data
US 2026/0000039 A1      Jan. 1, 2026

Related U.S. Application Data

(60) Provisional application No. 63/495,031, filed on Apr. 7, 2023.

(51) Int. Cl.
| | |
|---|---|
| *A01G 31/06* | (2006.01) |
| *A01G 9/24* | (2006.01) |
| *A01G 31/00* | (2018.01) |
| *A01G 31/02* | (2006.01) |
| *C02F 1/32* | (2023.01) |

(52) U.S. Cl.
CPC ............ *A01G 31/06* (2013.01); *A01G 9/246* (2013.01); *A01G 9/247* (2013.01); *A01G 9/249* (2019.05); *A01G 31/011* (2025.01); *A01G 31/065* (2025.01); *C02F 1/325* (2013.01); *C02F 2201/326* (2013.01); *C02F 2303/04* (2013.01)

(58) Field of Classification Search
CPC ...... A01G 31/06; A01G 31/025; A01G 31/02; A01G 31/00
See application file for complete search history.

(56) References Cited

U.S. PATENT DOCUMENTS

| | | | |
|---|---|---|---|
| 9,955,632 B1 * | 5/2018 | Adams ................... | H05B 45/22 |
| 11,234,381 B1 * | 2/2022 | Mikkelson .......... | A01G 25/167 |
| 2014/0020292 A1 * | 1/2014 | Mcnamara ............ | A01G 9/249 |
| | | | 47/66.7 |

(Continued)

*Primary Examiner* — Magdalena Topolski
*Assistant Examiner* — Spencer T Callaway
(74) *Attorney, Agent, or Firm* — Hamby Law Firm; Bruce W. Hamby

(57) ABSTRACT

This disclosure describes a portable, deployable, modular, indoor vertical agricultural machine comprising a cabinet with a ventilation system, lighting system, structural column support, plant support system, fertigation supply system, fertigation drain and return system, an interface for an environmental control system, an environmental control system, and a nutrition supply control system. Exemplary embodiments of software and computers for controlling same are disclosed as well as exemplary embodiments for using growing trays, hanging pod structures, and lattice structures for viney plants.

13 Claims, 46 Drawing Sheets

(56)           References Cited

U.S. PATENT DOCUMENTS

| | | | |
|---|---|---|---|
| 2019/0063786 A1* | 2/2019 | Bowman | A01G 9/246 |
| 2020/0137964 A1* | 5/2020 | Bouchard | A01G 9/247 |
| 2023/0033137 A1* | 2/2023 | Dubel | A01G 9/246 |
| 2023/0080951 A1* | 3/2023 | Allgeier | A01G 9/12 |
| | | | 47/62 R |

* cited by examiner

520

510

520

510

←

Line 1 Cloud Control

| Power | 0% |
| Temp Sensor | AVG |

| On at | Off at |
| 08:00 | 20:00 |

| Dimming Temp | Shutdown Temp |
| 85°F | 90°F |

| Cloud Start at | Cloud End at |
| 10:00 | 18:00 |

| Dimming Range | 0% |

| Sunrise/set Time | Dimming Time |
| 0mins | 1mins |

Save

FIG. 39

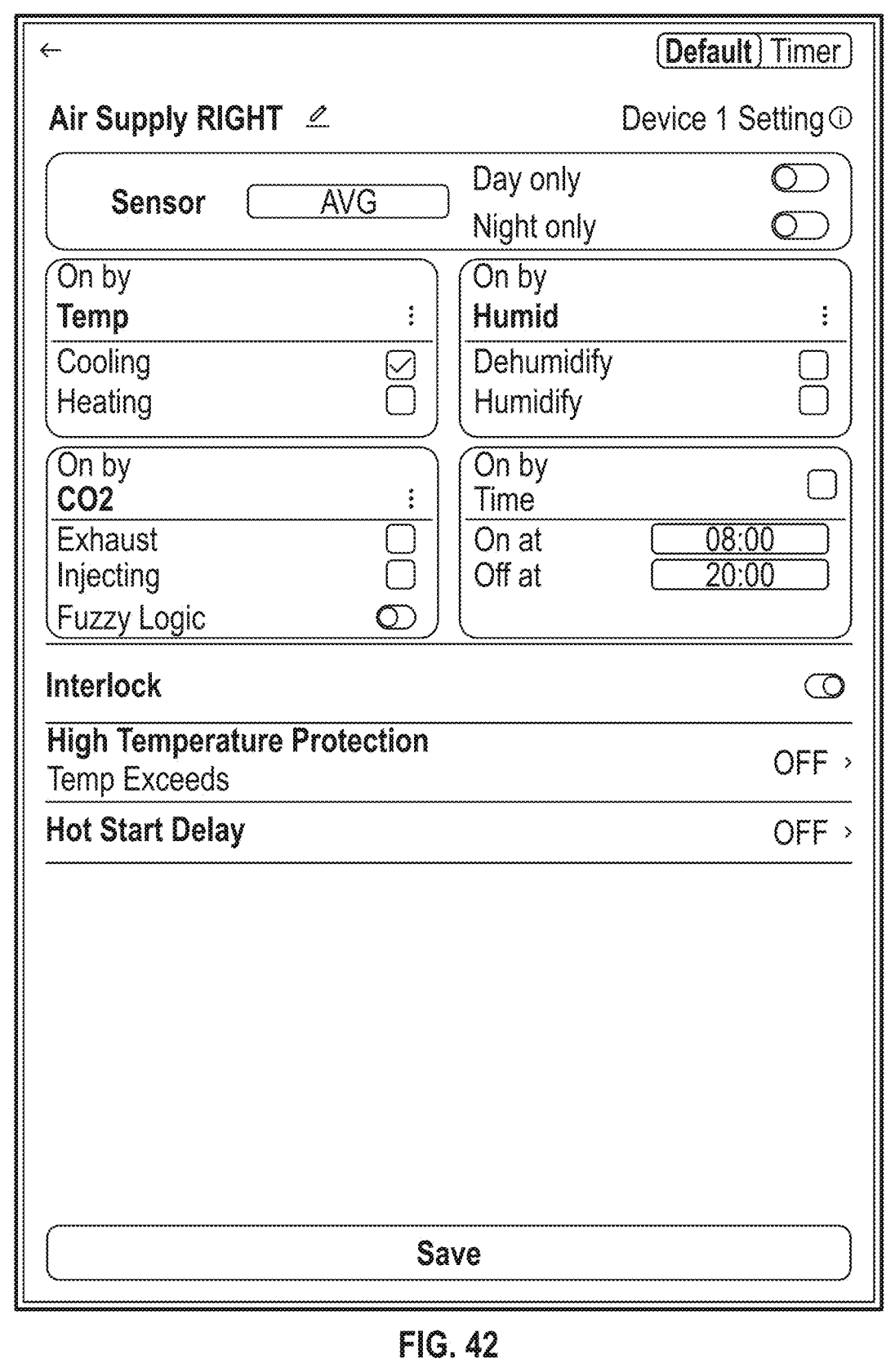

←                                                   ( Default ) Timer

Air Supply RIGHT ✎                      Device 1 Setting ⓘ

| Sensor | AVG | Day only | ⬤◯ |
| | | Night only | ⬤◯ |

| On by Temp ⋮ | On by Humid ⋮ |
| Cooling ☑ | Dehumidify ☐ |
| Heating ☐ | Humidify ☐ |

| On by CO2 ⋮ | On by Time ☐ |
| Exhaust ☐ | On at   08:00 |
| Injecting ☐ | Off at   20:00 |
| Fuzzy Logic ◯⬤ | |

Interlock                                               ◯⬤

High Temperature Protection
Temp Exceeds                                      OFF ›

Hot Start Delay                                   OFF ›

Save

FIG. 42

PORTABLE DEPLOYABLE MODULAR INDOOR VERTICAL AGRICULTURAL GROWING MACHINE

TECHNICAL FIELD

This application relates to a portable, deployable, modular, indoor vertical agricultural machine that can be used to efficiently grow a variety of plants. Several exemplary embodiments of a machine to accomplish this are disclosed.

BACKGROUND ART

The use of machines for growing crops has resulted in the patenting of some machines and applications to patent others.

Bertram, in US 2023/0020175 A1, "Vertical Farming Systems and Methods," taught a vertical farming system that employed an automated robotic device configured to operate within an automatic vertical farming system.

Tran, in U.S. Pat. No. 11,631,243 B2, "Indoor Growing System," taught an agricultural method of growing crops in cells.

However, these references do not teach the machine that is disclosed in the embodiments that are described in this application.

SUMMARY OF INVENTION

Technical Problems

One of modern agriculture's most pressing problems is how to grow many types of crops as efficiently as possible and to get them to the end consumer as quickly as possible so they can be consumed while at the height of their freshness.

To resolve this issue, a machine is needed that will solve both of the following problems: (1) How to a grow a multiplicity of diverse crops under conditions that are as close to ideal as possible; and (2) How to grow the desired crop where it is wanted, that is, near its end consumer.

Solutions to the Problems

One solution to the problem of how to grow a multiplicity of diverse crops under conditions that are as close to ideal as possible is to build a growing machine that is modular and portable so that it can be moved indoors to grow crops almost anywhere, including near the end consumer of the crop.

Another solution to the problem of how to a grow a multiplicity of diverse crops under conditions that are as close to ideal as possible is to build a growing machine that will allow for precise control and dosing of nutrition, water, ventilation and ultraviolet light to the growing crop.

Advantageous Effects of the Disclosed Embodiments

One advantage of the disclosed embodiments is that they teach a portable, deployable, modular, indoor vertical agricultural machine that can be used to efficiently grow a variety of plants, that is modular and portable so that it can be moved indoors to grow crops almost anywhere, including near the end consumer of the crop, and that can grow a multiplicity of diverse crops under conditions that are as close to ideal as possible, thereby solving the agricultural problems mentioned above.

BRIEF DESCRIPTION OF THE DRAWINGS

FIG. 39 is a screenshot of an exemplary embodiment of software showing the ability of the software to simulate clouds moving overhead by dimming and increasing the intensity of the LED bulbs according to various programmable parameters.

FIG. 42 is a screenshot of an exemplary embodiment of software showing the ability of the software to programmably control various devices of the disclosed exemplary embodiments such as an air supply.

DESCRIPTION OF THE DISCLOSED
EXEMPLARY EMBODIMENTS

This application discloses a plurality of exemplary embodiments of an apparatus, known as a portable modular indoor vertical agricultural growing machine. A number of elements are common to all of the disclosed embodiments, as set forth below.

Structures and Elements Common to All Disclosed
Exemplary Embodiments

Cabinet Common to All Disclosed Exemplary
Embodiments

Figure 1:
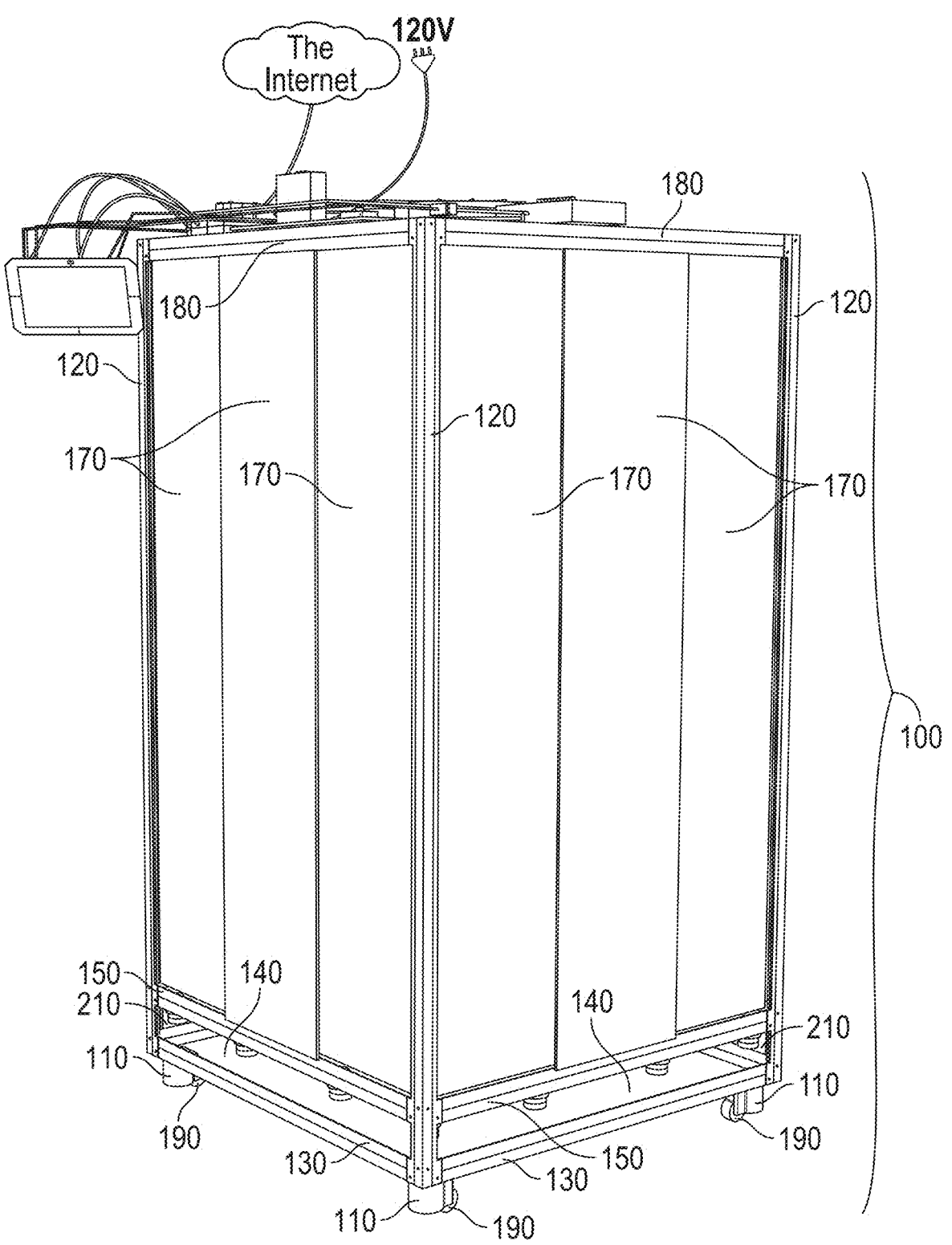
FIG. 1 is a front view of an exemplary embodiment showing the exterior of the cabinet showing the doors in the closed configuration and with the air filters removed to reveal the air filtration chamber.
Figure 4:
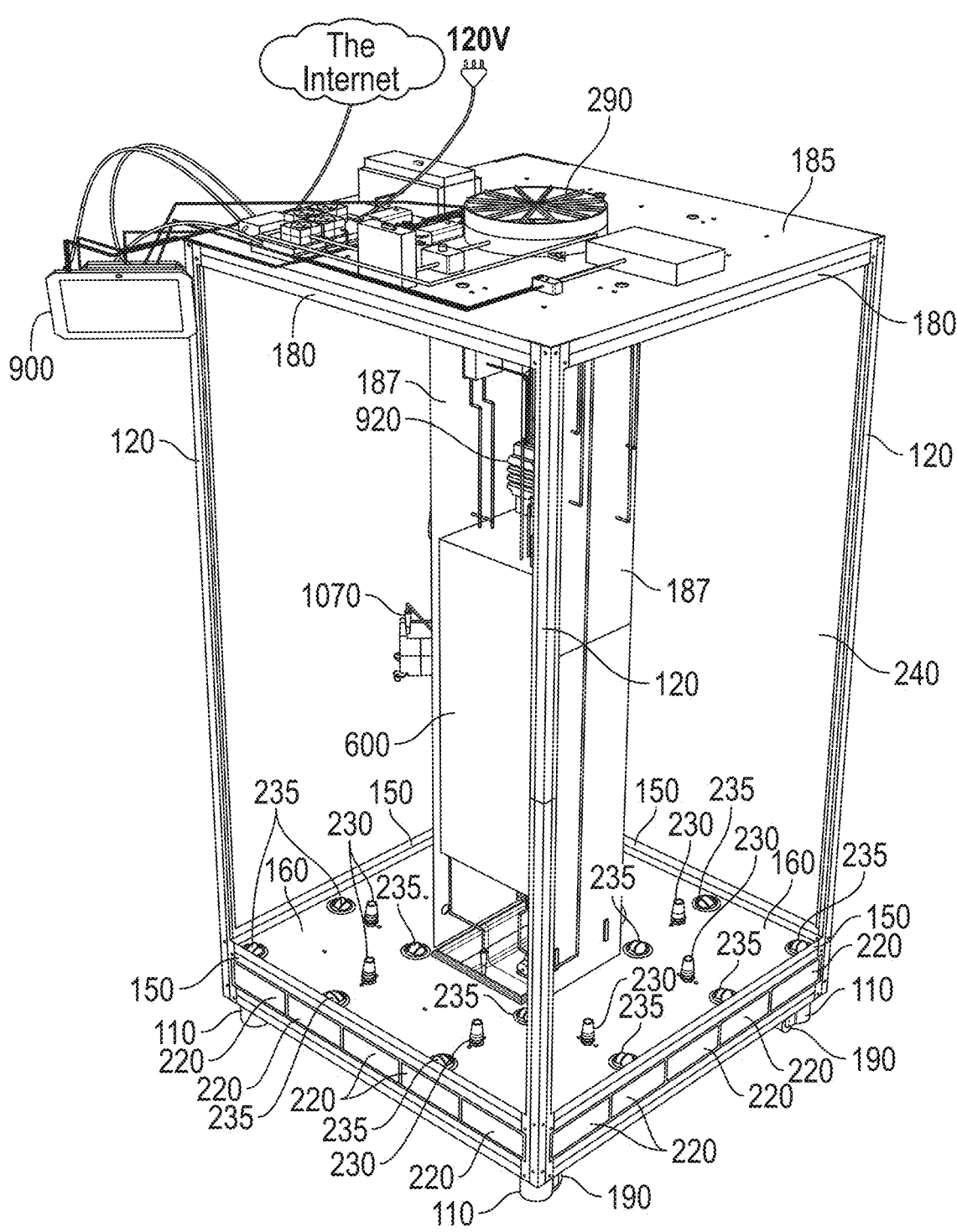
FIG. 4 is a front top perspective view of an exemplary embodiment showing the inner structural core of the disclosed embodiments.
Figure 5:
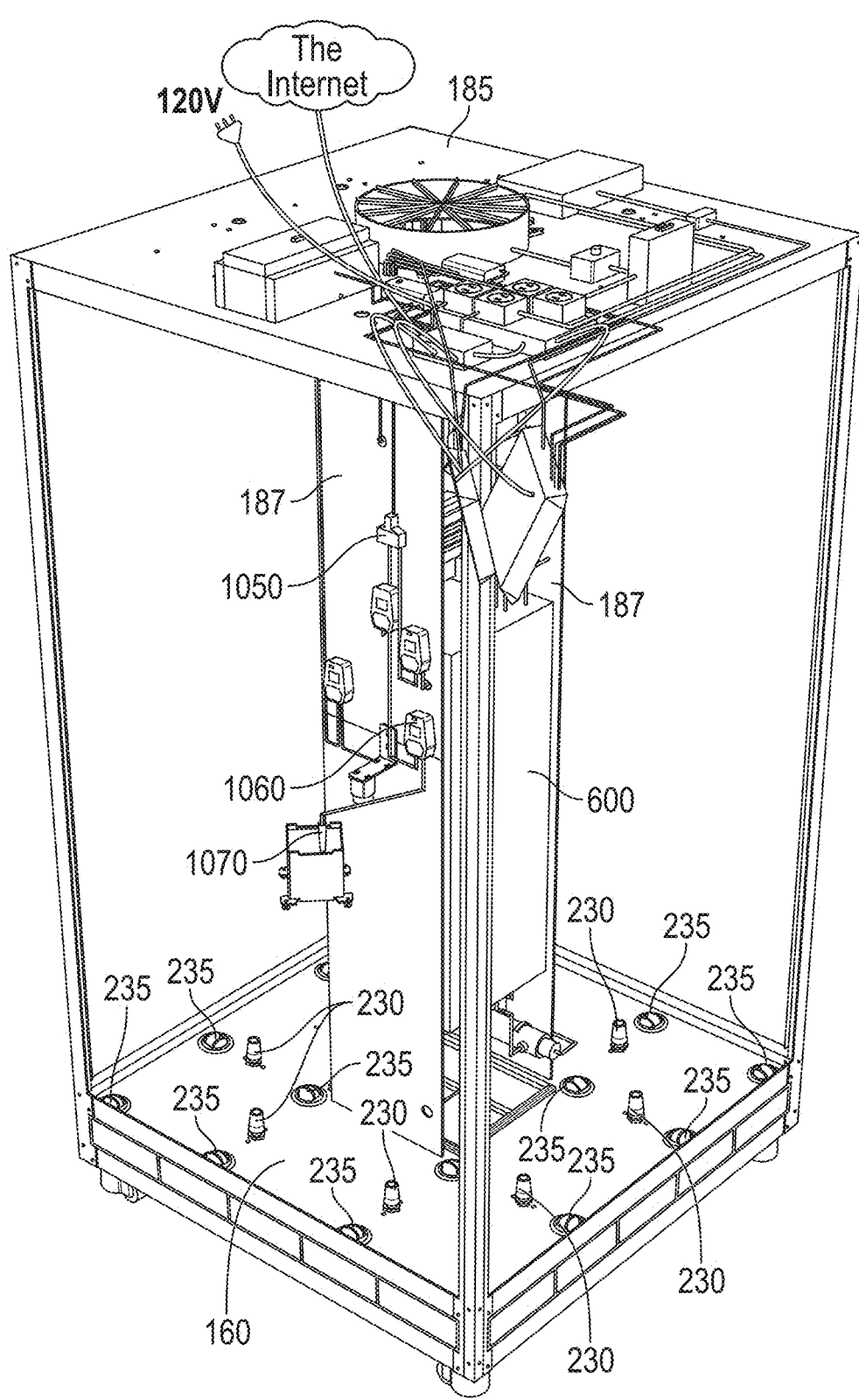
FIG. 5 is a left top perspective view of an exemplary embodiment showing the inner structural core of the disclosed embodiments.

Each portable modular indoor vertical agricultural growing machine is comprised, in part, of a cabinet (100), the elements of which are shown in FIG. 1 unless otherwise noted. The cabinet (100) is comprised of a plurality of legs (110);

a plurality of vertical frame members (120);

a plurality of lateral subframe members (130) that are connected to the vertical frame members (120) and which support a subfloor (140);

a plurality of lateral frame members (150) that are connected to the vertical frame members (120) and which support a floor (160) [FIG. 5] and a plurality of doors (170);

a plurality of lateral top frame members (180) that are connected to the vertical frame members (120) and which support a top cover (185) [FIG. 4]; and a plurality of inner support members (187) [FIG. 4] which extend from the floor (160) [FIG. 4] to the top cover (185) [FIG. 4].

Ventilation System Common to All Disclosed Exemplary Embodiments

Figure 2:
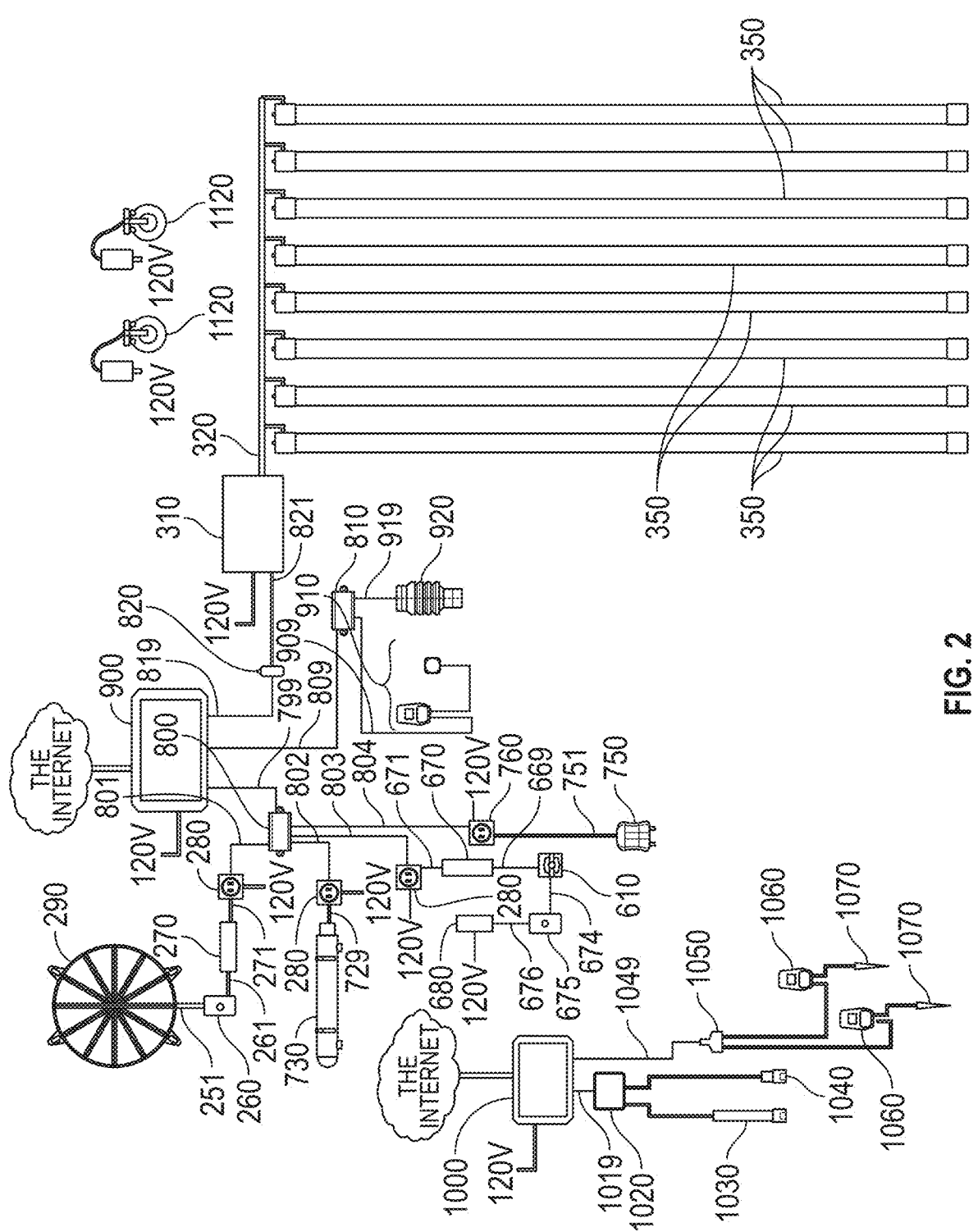
FIG. 2 is a schematic of an exemplary embodiment using two pumps; that Figure further depicts cameras, electrical and data connections of the nutrition supply and monitoring control computer to sensors, and of the environmental control system computer to sensors and devices controlled by said environmental control system computer.
Figure 3:
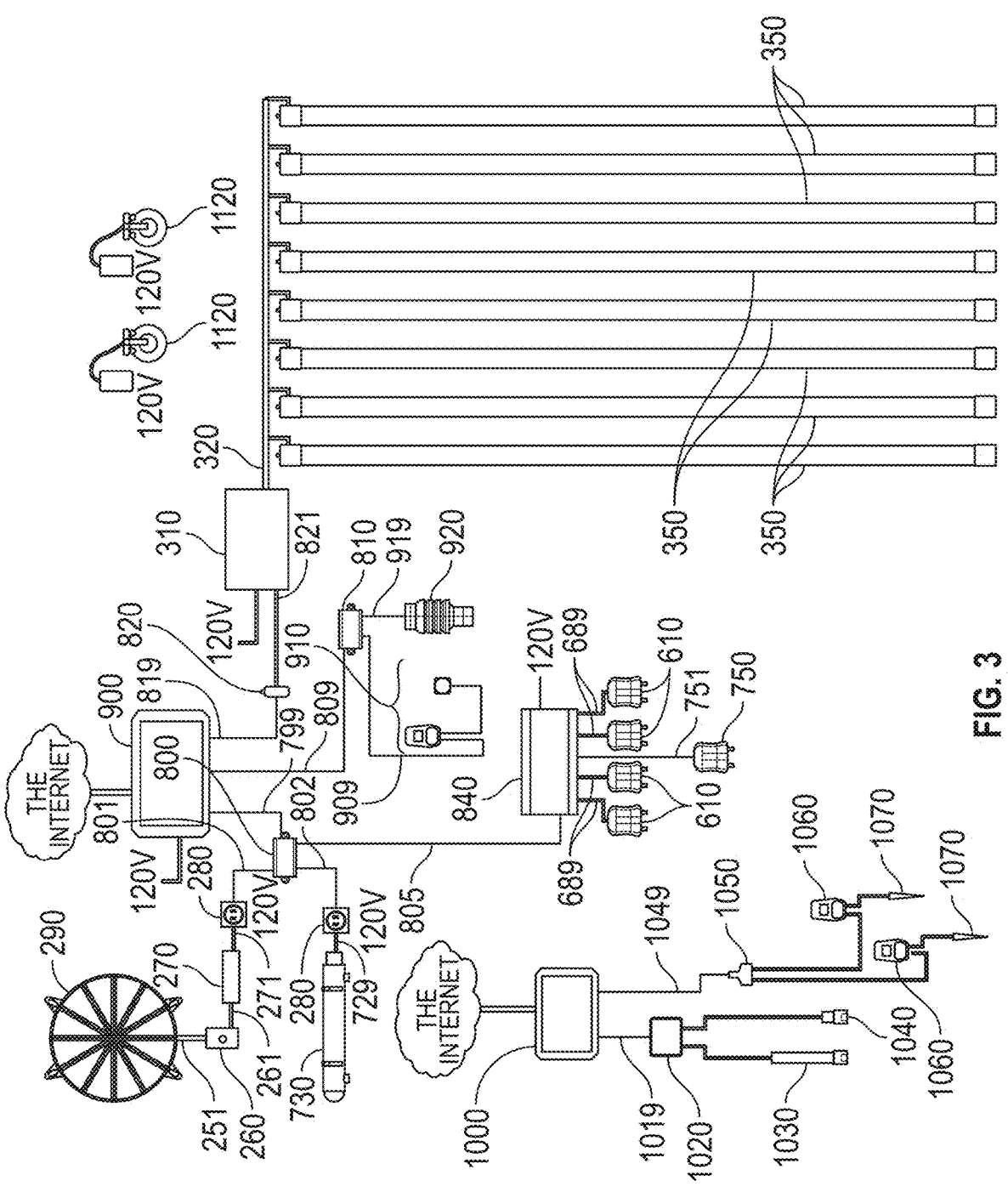
FIG. 3 is a schematic of an exemplary embodiment using five pumps; that Figure further depicts cameras, electrical and data connections of the nutrition supply and monitoring control computer to sensors, and the environmental control system computer to sensors and devices controlled by said environmental control system computer.
Figure 13:
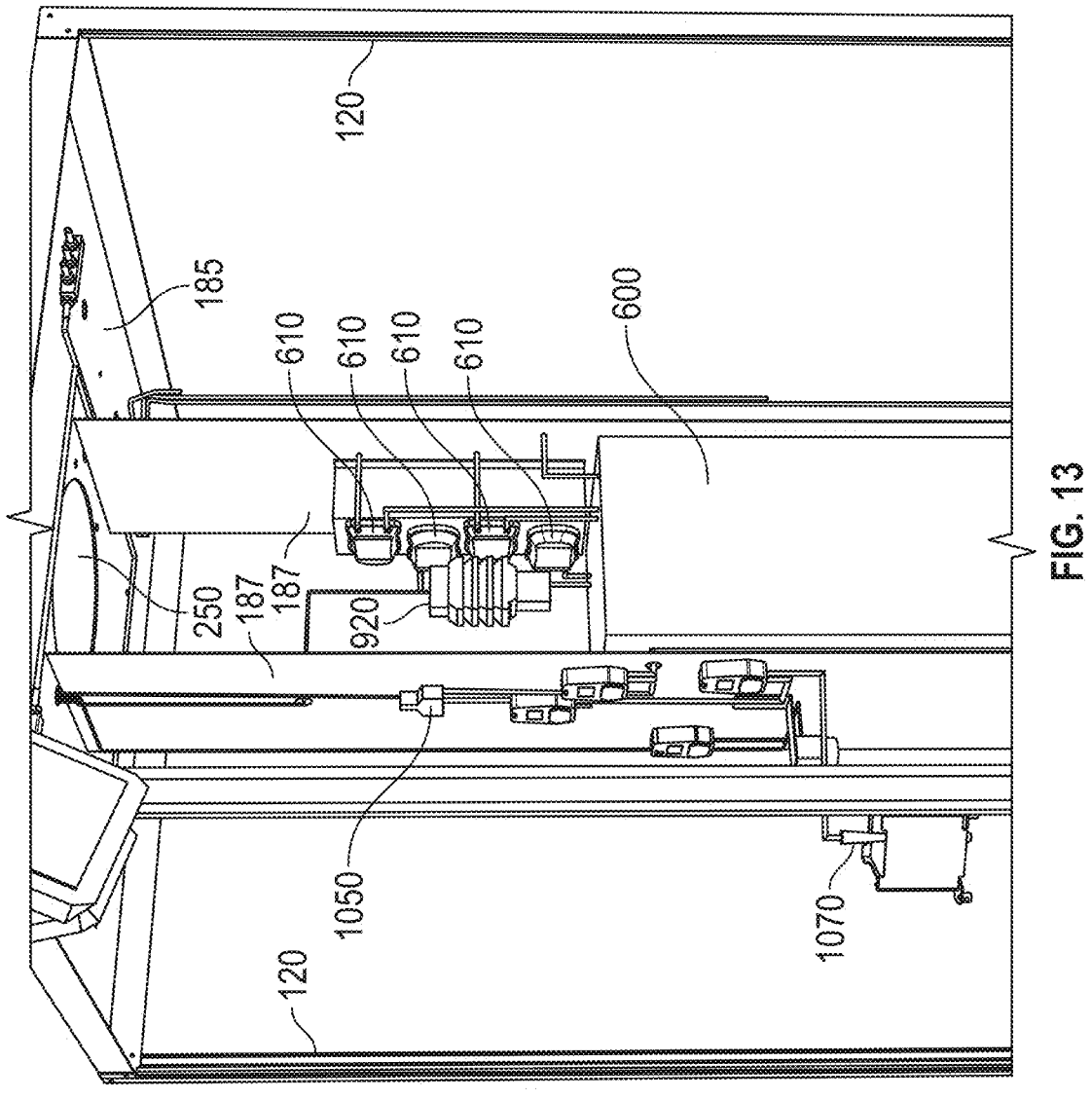
FIG. 13 is a left perspective view of an exemplary embodiment showing the relative positions of various elements around the inner structural core of a disclosed embodiment.

Each portable modular indoor vertical agricultural growing machine is further comprised, in part, of a ventilation system, said ventilation system being comprised of the following elements:

an air filtration chamber (210) [FIG. 1] comprising
the plurality of lateral subframe members (130) [FIG. 1];
the subfloor (140) [FIG. 1];
the plurality of lateral frame members (150) [FIG. 1];
an air filter (220) [FIG. 4] and
the floor (160) [FIG. 5], said floor being further comprised of a plurality of air flow nozzles (230) [FIG. 5] and adjustable air vents (235) [FIG. 5] that penetrate said floor;

a grow chamber (240) [FIG. 4] comprising
the plurality of lateral frame members (150) [FIG. 4];
the floor (160) [FIG. 4];
the plurality of vertical frame members (120) [FIG. 4];
the plurality of doors (170) [FIG. 1];
the top cover (185) [FIG. 13], said top cover comprising at least one exhaust port (250) [FIG. 13]; and a controllable exhaust fan system comprising these electrically connected elements
a rheostat (260) [FIG. 2 & FIG. 3];
a power supply (270) [FIG. 2 & FIG. 3];
a programmable timer module (280) [FIG. 2 & FIG. 3]; and
a fan (290) [FIG. 2, FIG. 3 & FIG. 4].

Lighting System Common to All Disclosed Exemplary Embodiments

Figure 15:
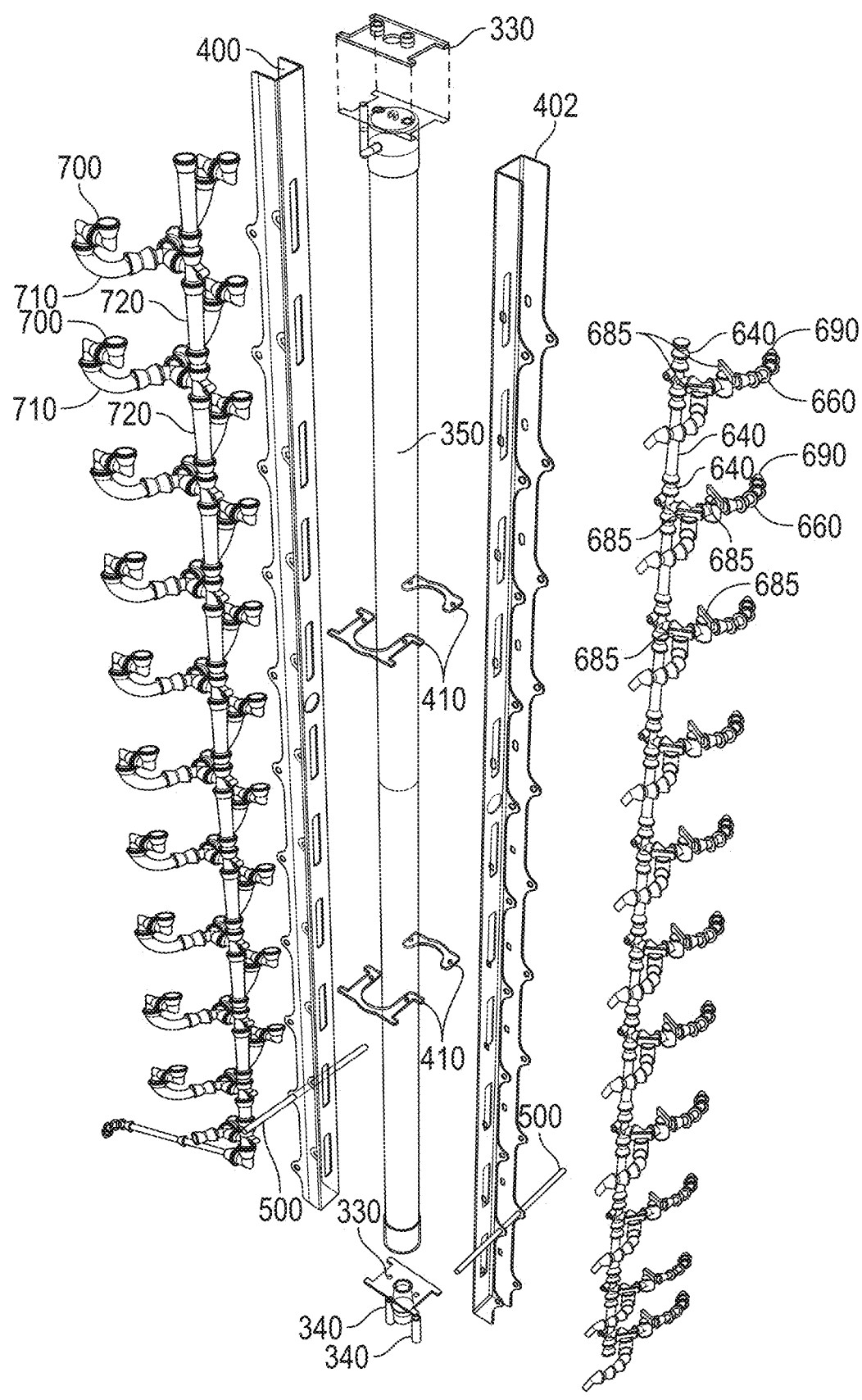
FIG. 15 is an exploded view of an exemplary embodiment of a column support member.

Each portable modular indoor vertical agricultural growing machine is further comprised, in part, of a lighting system, said lighting system being comprised of the following elements:

an LED driver (310) [FIG. 2 & FIG. 3];
a light wiring harness (320) [FIG. 2 & FIG. 3];
a light holder (330) [FIG. 15];
a plurality of mounting spacers (340) [FIG. 15]; and
an LED bulb (350) [FIG. 15].

Structural Column Support Common to All Disclosed Exemplary Embodiments

Figure 17:
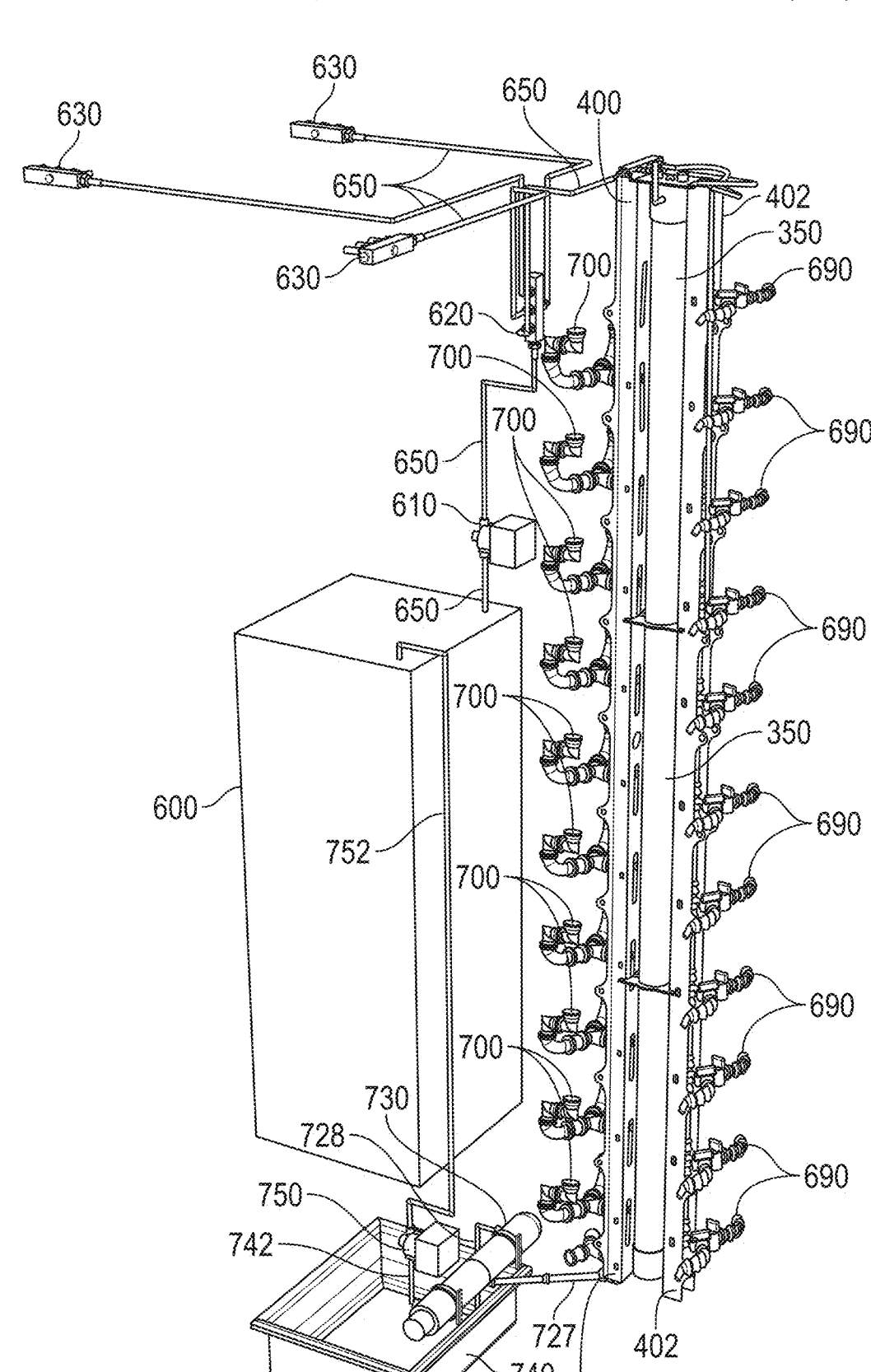
FIG. 17 is a schematic showing elements of the fertigation supply and liquid return system.
Figure 22:
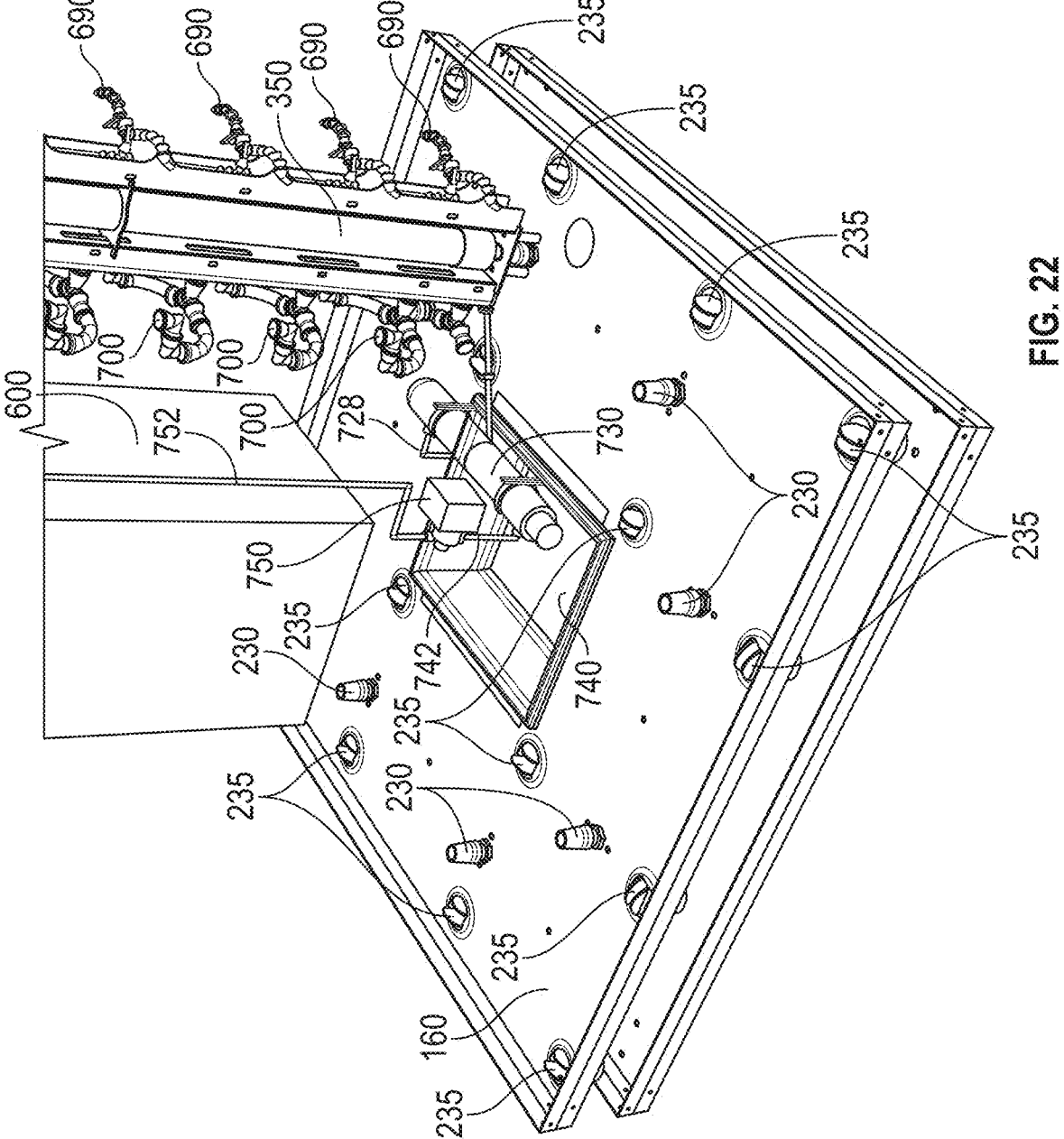
FIG. 22 is a fragmentary view of the floor and lower portion of the fertigation supply and liquid return system.
Figure 47:
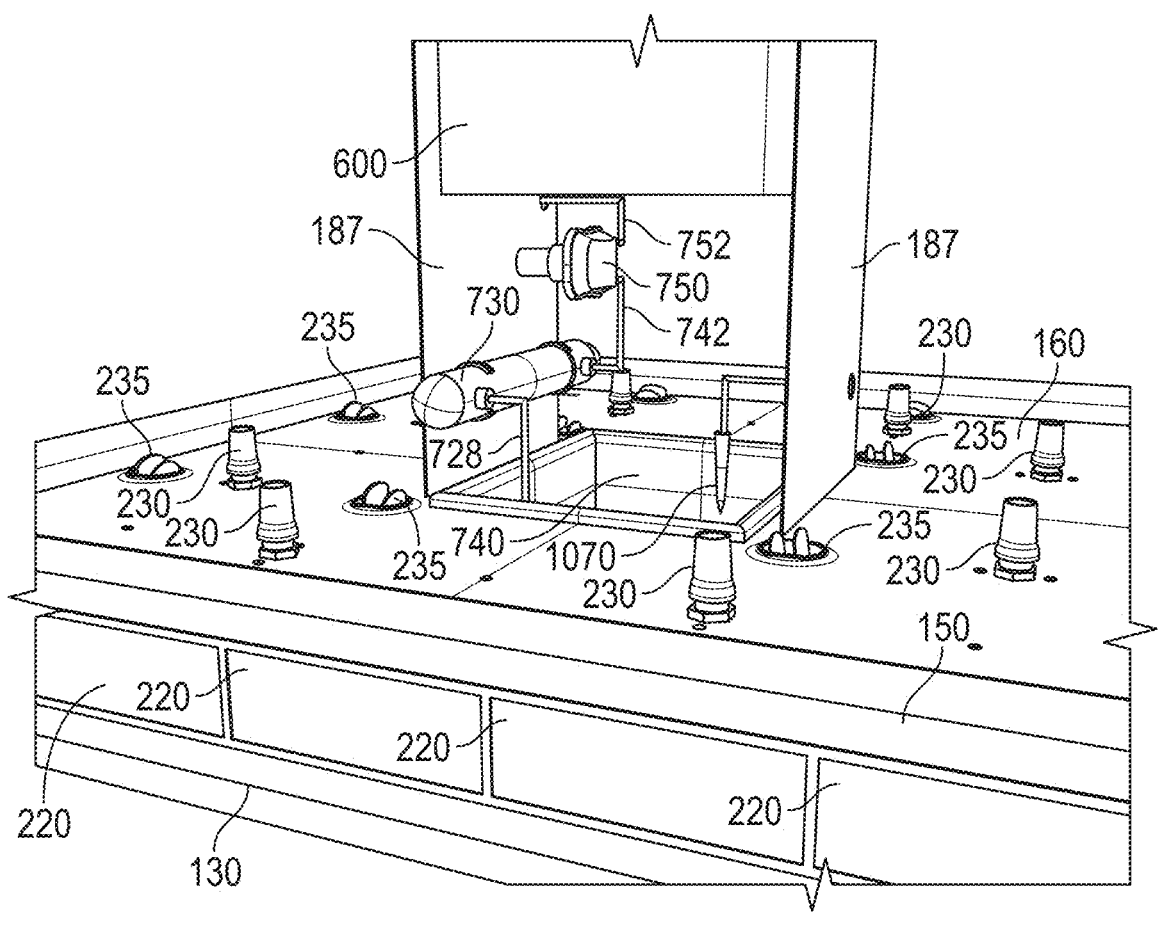
FIG. 47 is a fragmentary view illustrating elements near and in the return tub.

Each portable modular indoor vertical agricultural growing machine is further comprised, in part, of a structural column support, said structural column support being comprised of the following elements as shown in FIG. 15:
a plurality of type A column support members (400) and type B column support members (402); and
an LED bulb spacer/holder (410);

Portion of Fertigation Drain and Return System Common to All Disclosed Exemplary Embodiments Each portable modular indoor vertical agricultural growing machine is further comprised, in part, of a fertigation drain and return system, said fertigation drain and return system being comprised of the following elements:
a plurality of removable drain ports (700) fluidly connected to a plurality of liquid drain conduits (710) [FIG. 15];
a columnar drain (720) that is fluidly connected to the plurality of liquid drain conduits (710) [FIG. 15];
a controllable ultraviolet radiation sterilizing filtration system that is fluidly connected to a plurality of the columnar drains (720), said controllable ultraviolet radiation sterilizing filtration system comprising these electrically connected elements
an ultraviolet filter (730) [FIG. 2, FIG. 3 & FIG. 22];
a programmable timer module (280) [FIG. 2 & FIG. 3]; and
a return tub (740) [FIG. 47];
a controllable return pump system that is fluidly connected to both the return tub (740) [FIG. 17]; and the nutrition supply reservoir (600) [FIG. 17], said return pump system comprising the following electrically connected elements
a splitter hub containing ports for a full spectrum suite of environmental sensors (810);
a dry-contact relay (760); and
a return pump (750) [FIG. 47];

Interface for an Environmental Control System Common to All Disclosed Exemplary Embodiments Each portable modular indoor vertical agricultural growing machine is further comprised, in part, of an interface for an environmental control system, said interface comprising a plurality of ports for controlling:
a ventilation system, an ultraviolet radiation sterilizing filtration system, a fertigation supply system pump and a fertigation drain and return system pump (800) [FIG. 2 & FIG. 3];
a full spectrum suite of environmental sensors (810) [FIG. 2 & FIG. 3]; and a lighting system (820) [FIG. 2 & FIG. 3].

Environmental Control System Common to All Disclosed Exemplary Embodiments

Each portable modular indoor vertical agricultural growing machine is further comprised, in part, of an environmental control system, said environmental control system comprising
the full spectrum suite of environmental sensors (910) [FIG. 2 & FIG. 3].

Figure 8:
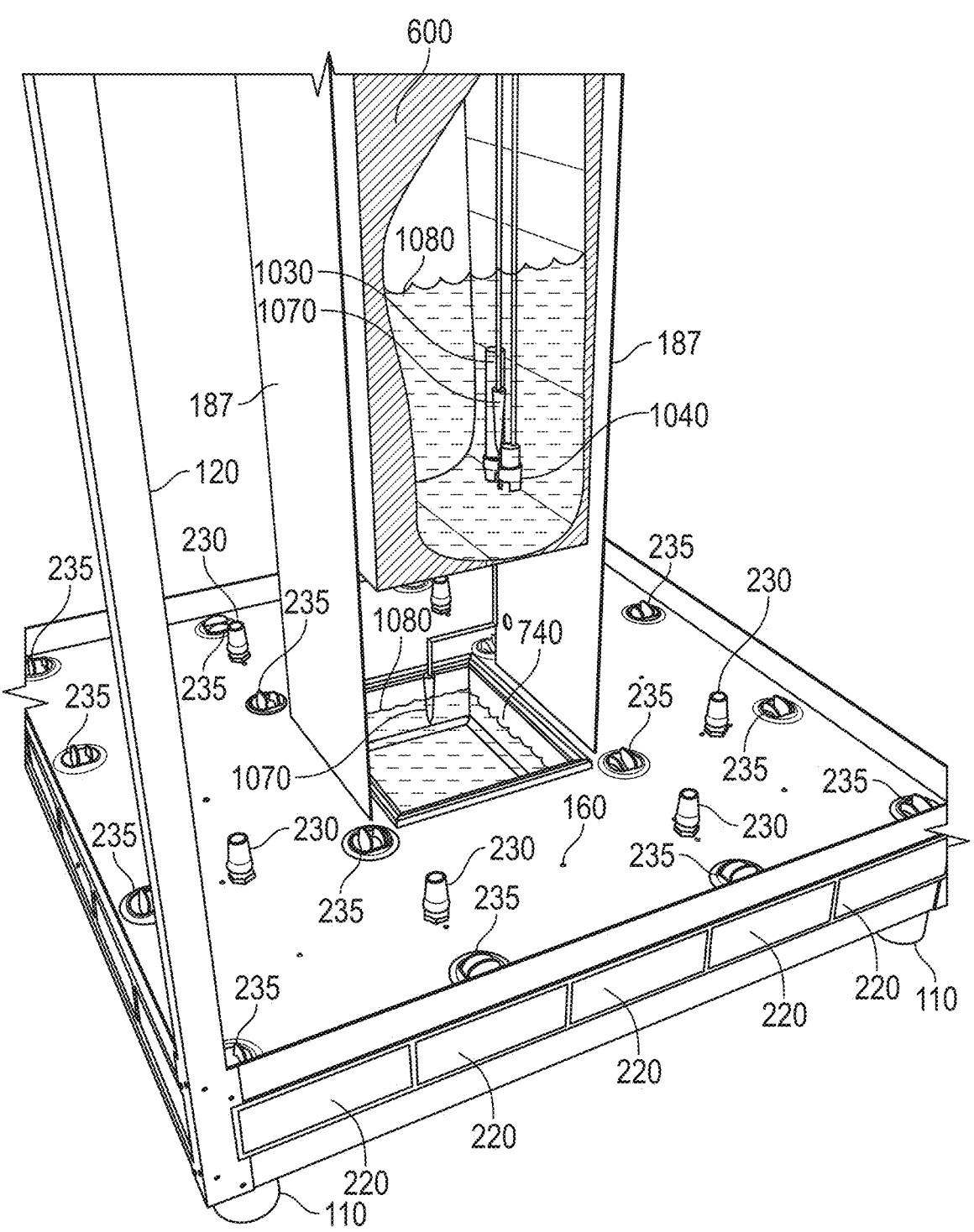
FIG. 8 is a perspective view of the lower portion of an exemplary embodiment showing the inner structural core of the disclosed embodiments and a sectional view of the nutrition supply reservoir showing the contents of said reservoir.

Nutrition Supply Control System Common to All Disclosed Exemplary Embodiments Each portable modular indoor vertical agricultural growing machine is further comprised, in part, of a nutrition supply control system, said nutrition supply control system comprising:

a sensor interface board (1020) [FIG. 2 & FIG. 3] that is
electrically connected to
a nutrient pH sensor (1030) [FIG. 2, FIG. 3 & FIG. 8];
an electrical conductivity and temperature sensor for
liquids (1040) [FIG. 2, FIG. 3 & FIG. 8]; and
a splitter hub (1050) [FIG. 2, FIG. 3 & FIG. 5] that is
electrically connected to
a plurality of water detectors (1060) [FIG. 2, FIG. 3 &
FIG. 5] and water detector sensors (1070) [FIG. 2,
FIG. 3 & FIG. 5].

EXEMPLARY EMBODIMENTS OF A PLANT SUPPORT SYSTEM

Each portable modular indoor vertical agricultural grow-
ing machine is further comprised, in part, of a plant support
system. The plant support system physically supports the
plants and is comprised of one or more of any of the
following three exemplary embodiments:

First Exemplary Embodiment—A Growing Tray Plant Support System

Figure 24:
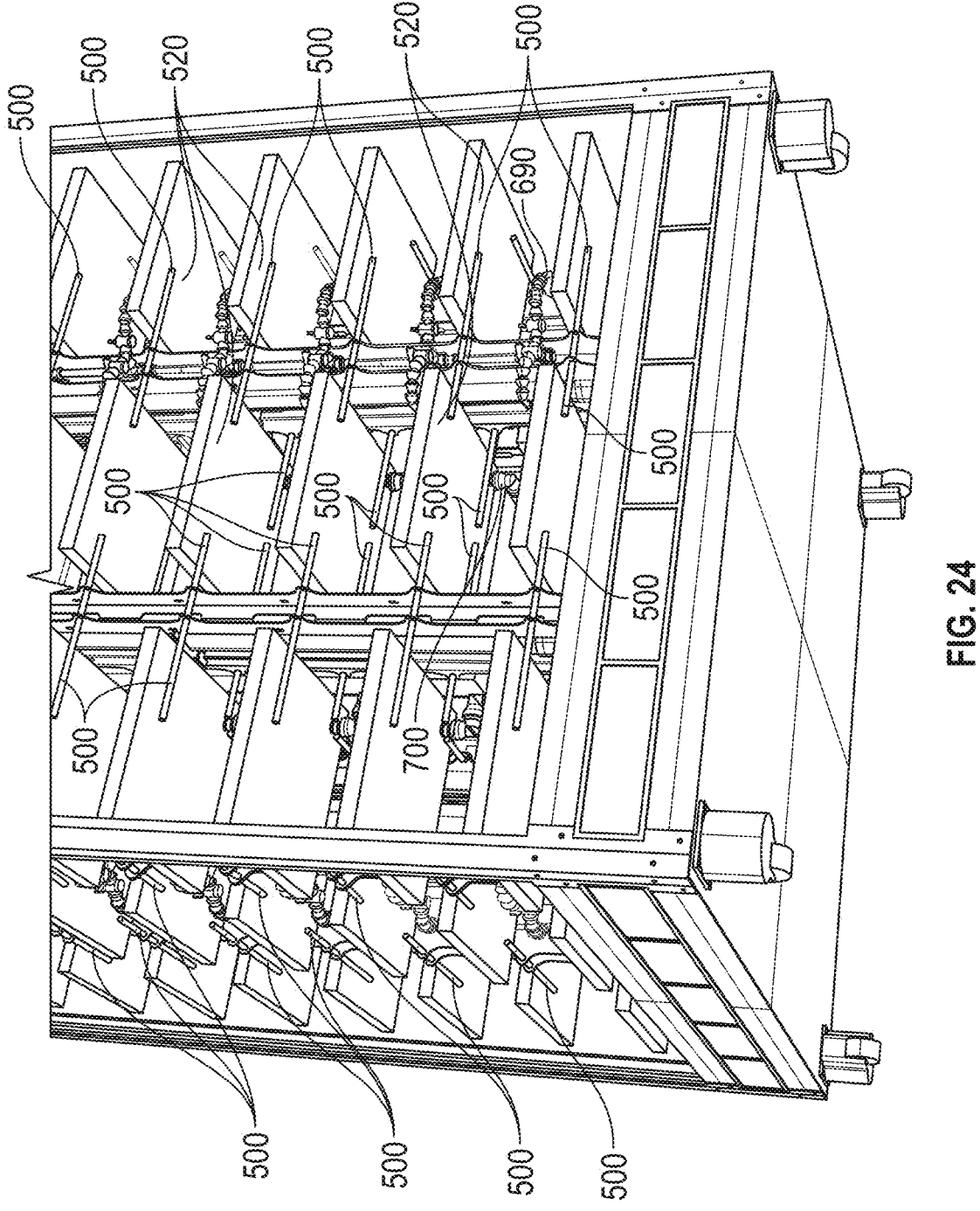
FIG. 24 is a fragmentary view of the interior of an exemplary embodiment equipped with a plurality of growing trays supported by a plurality of structural support pins with the doors not illustrated to aid in visualization.
Figure 25:
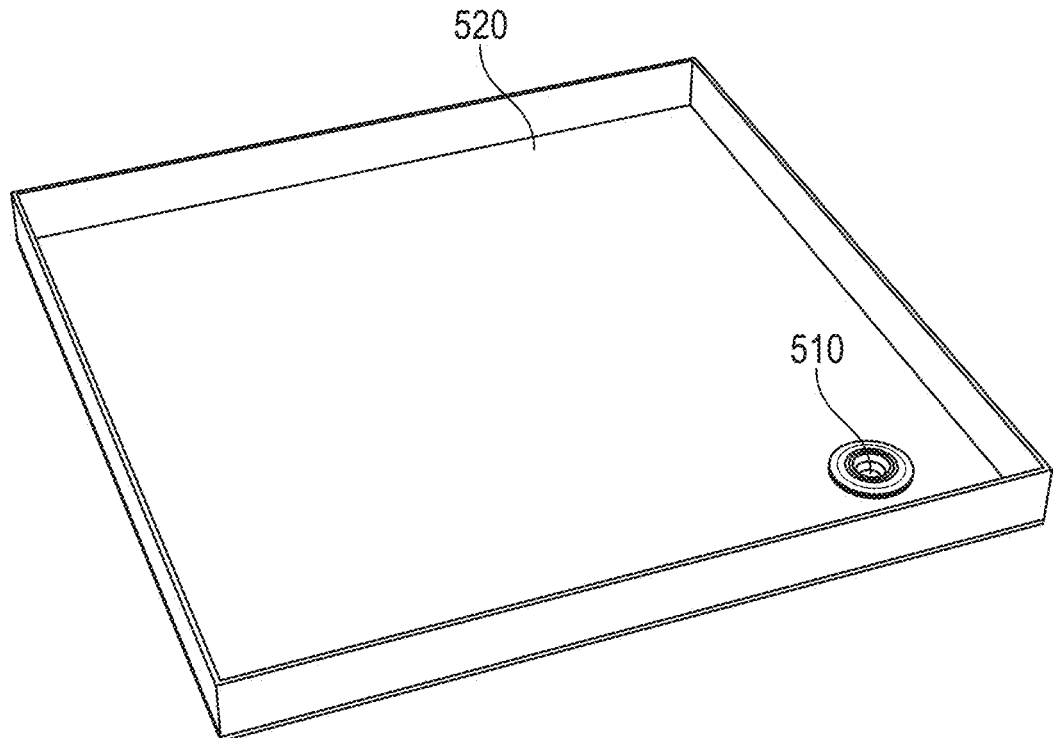
FIG. 25 is top left perspective view of a growing tray.
Figure 26:
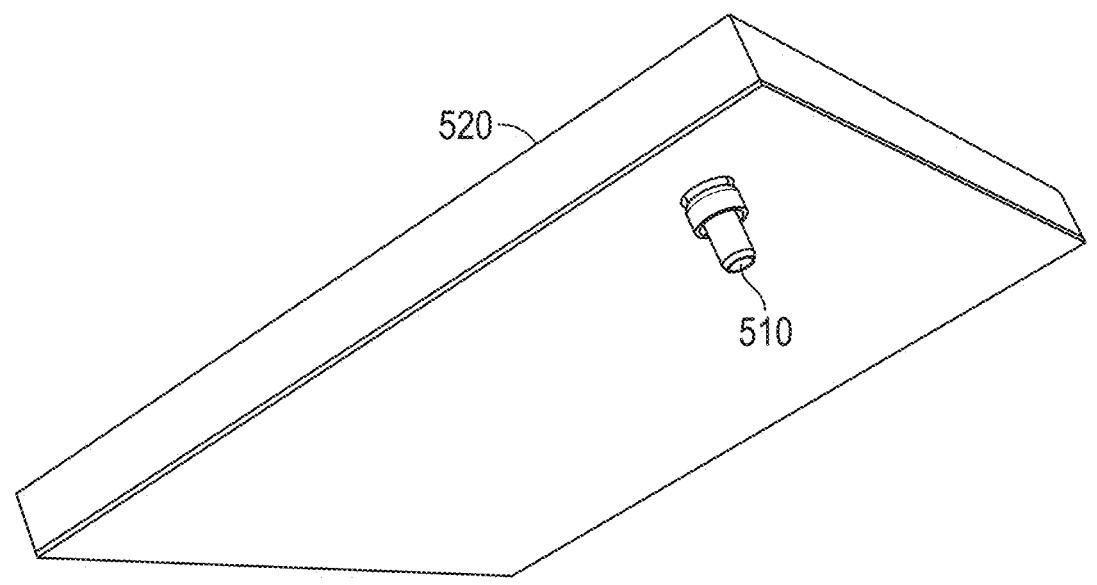
FIG. 26 is a bottom left perspective view of a growing tray.

A first exemplary embodiment of a plant support system
comprises
a plurality of structural support pins (500) [FIG. 24]; and
a plurality of growing trays (520) [FIG. 24] each of those
growing trays having
a drain port aperture (510) [FIG. 25 & FIG. 26].

Second Exemplary Embodiment—A Hanging Pod Structure Plant Support System

Figure 18:
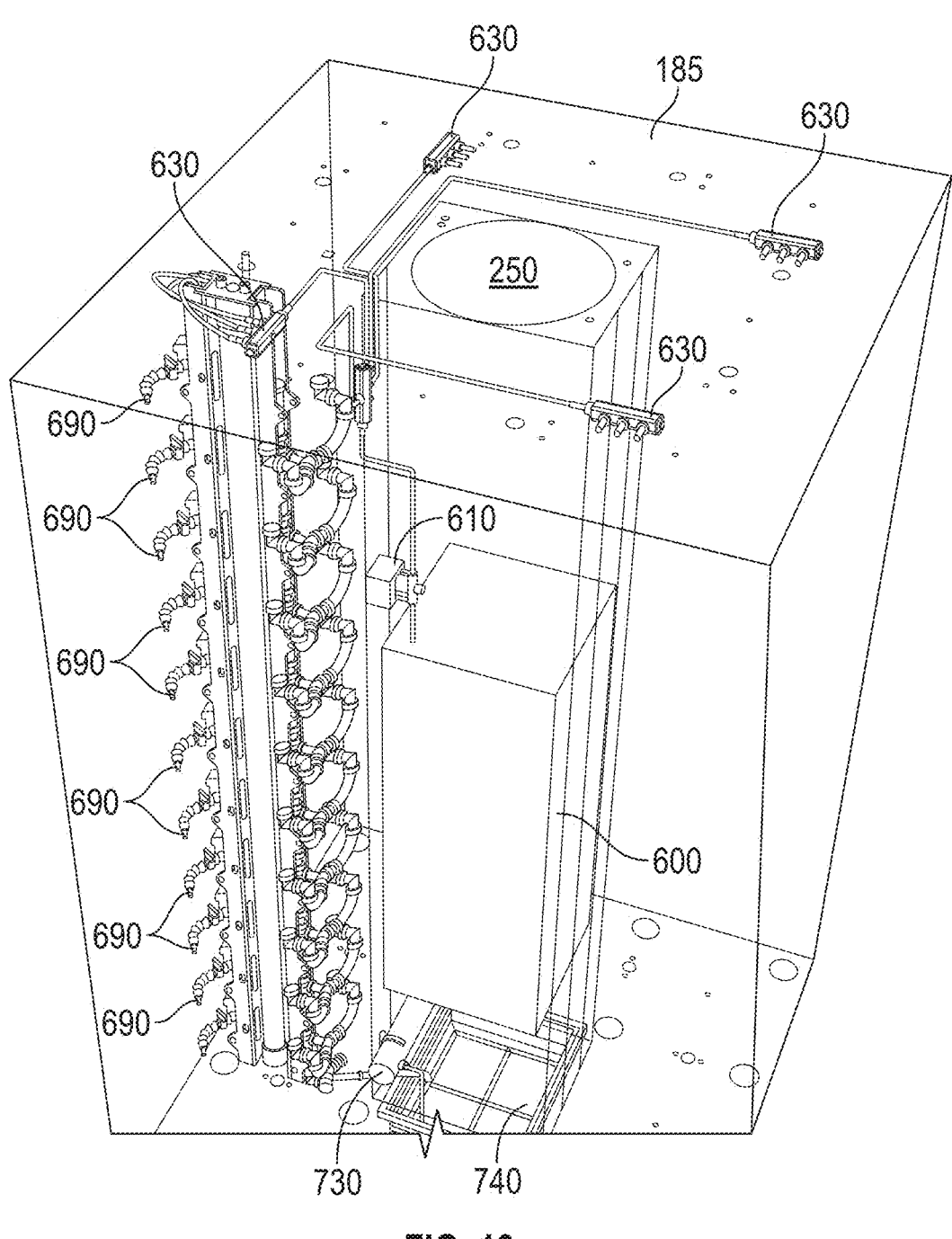
FIG. 18 is a see through perspective view showing the relative placement of the fertigation supply and liquid return system within an exemplary embodiment of a cabinet.
Figure 28:
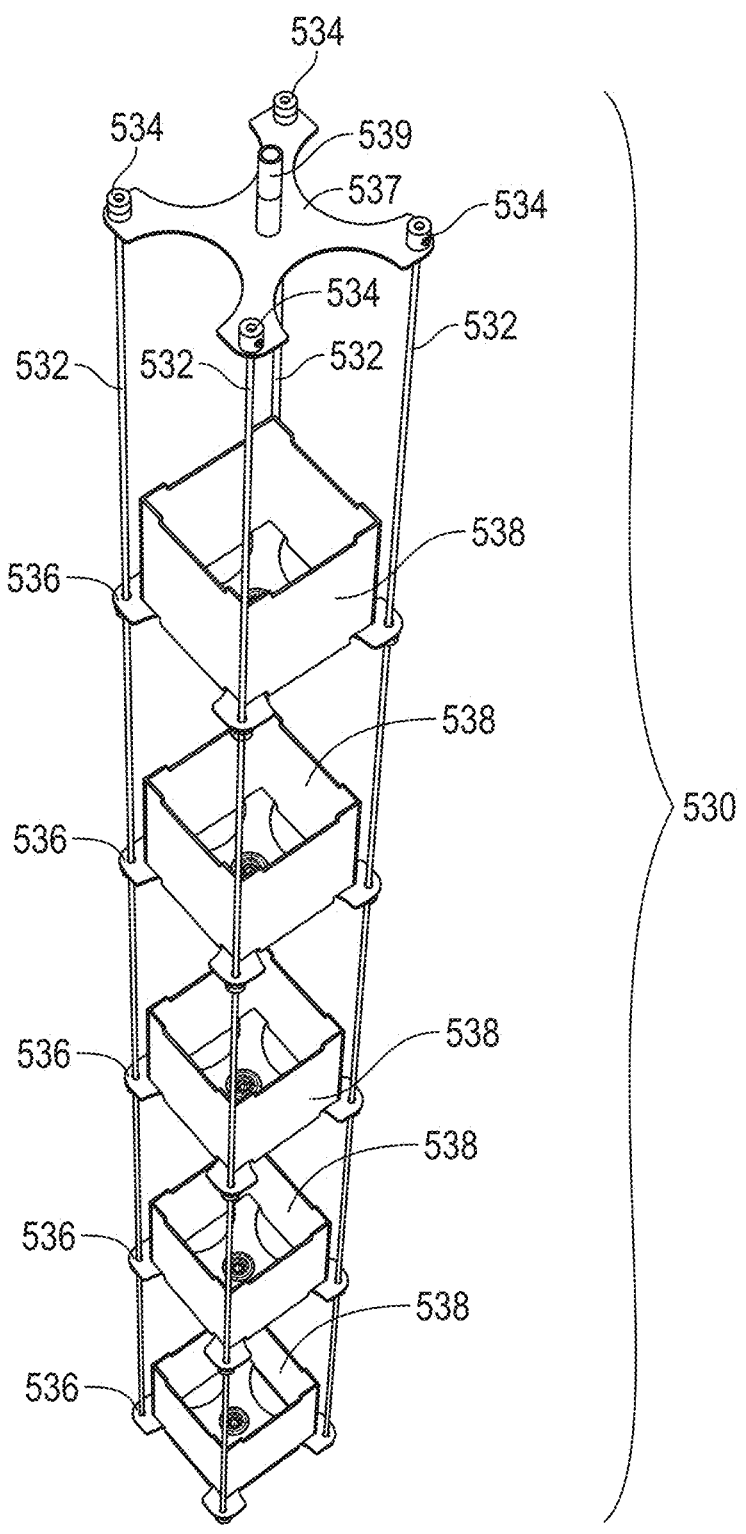
FIG. 28 is a front top perspective view of an exemplary embodiment of a hanging pod structure.
Figure 29:
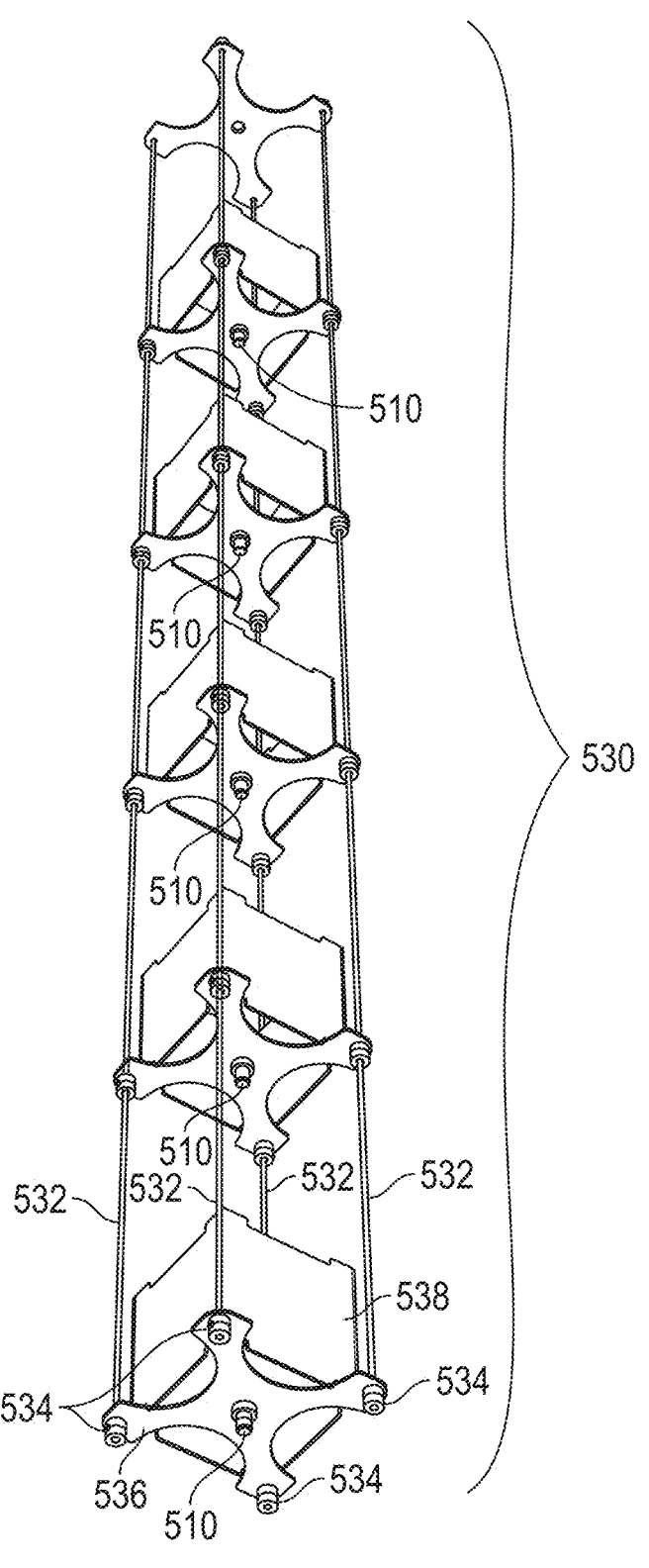
FIG. 29 is a rear bottom perspective view of an exemplary embodiment of a hanging pod structure.
Figure 30:
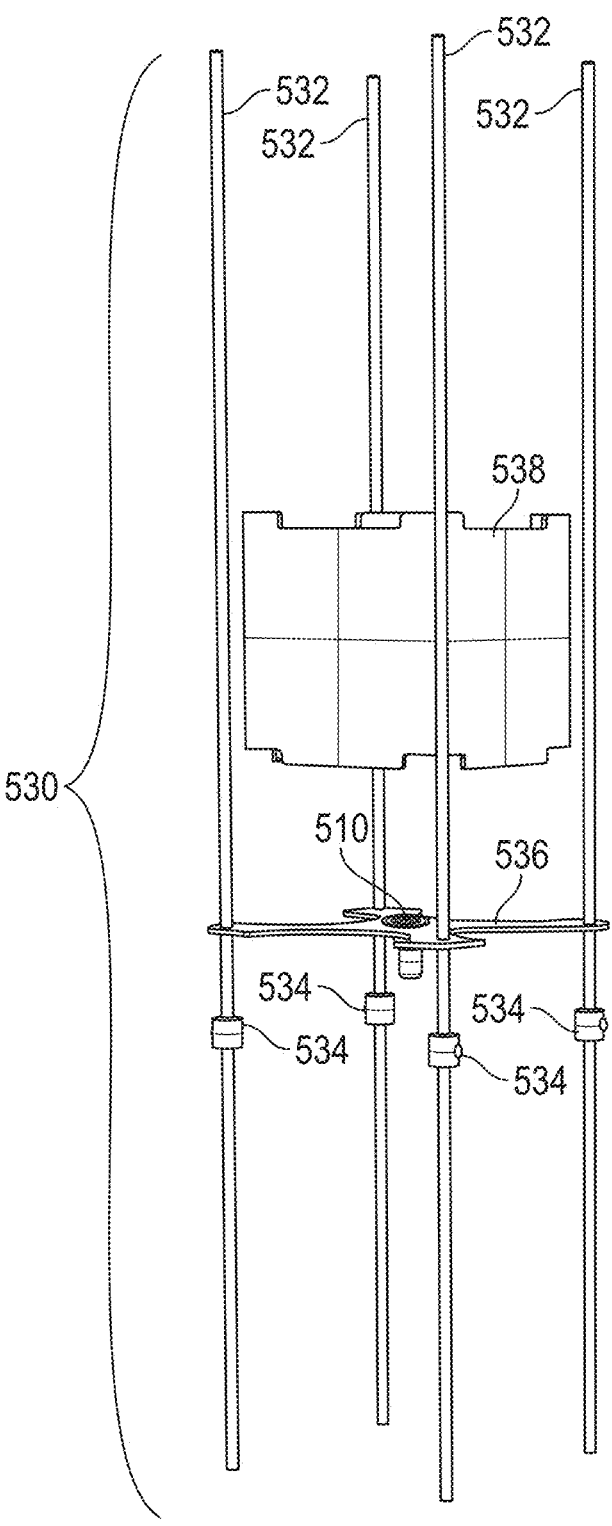
FIG. 30 is an exploded view of an exemplary embodiment of a hanging pod structure.

A second exemplary embodiment of a plant support
system that is a hanging pod structure (530) [FIGS. 28-31]
comprising
a plurality of rods (532) [FIGS. 28-31];
a plurality of set screw collars (534) [FIGS. 28-31];
a spacer/pod subfloor (536) [FIGS. 28-31] with a drain
port aperture (510) [FIG. 29 & FIG. 30];
a lateral containment structure (538) [FIGS. 28-31] that
fits between the plurality of rods (532) [FIGS. 28-31]
and sets atop the spacer/pod subfloor (536) [FIGS.
28-31]; and
a top spacer (537) [FIG. 28] conformably made to extend
through the top cover (185) [FIG. 18].

Third Exemplary Embodiment-a Lattice Structure for Viney Plants

Figure 33:
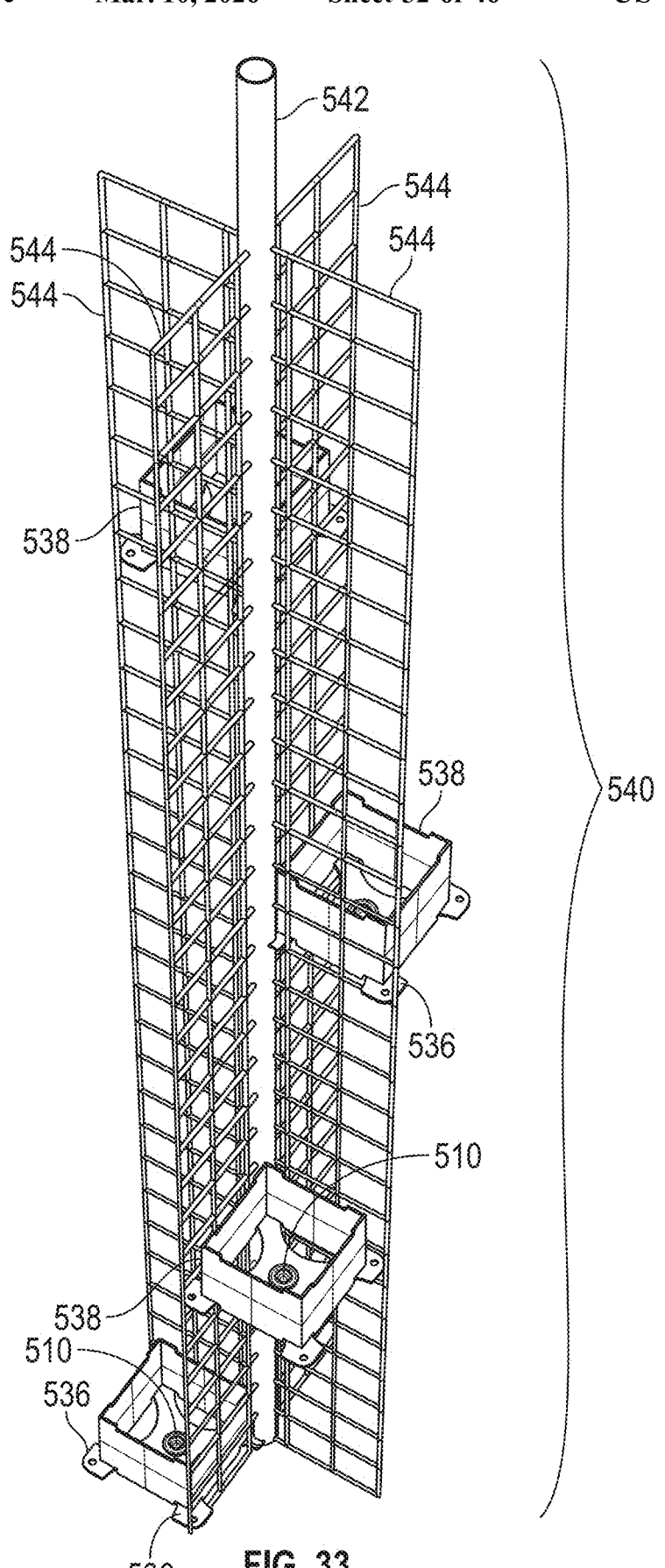
FIG. 33 is a front top perspective view of an exemplary embodiment of a lattice structure for viney plants.
Figure 46:
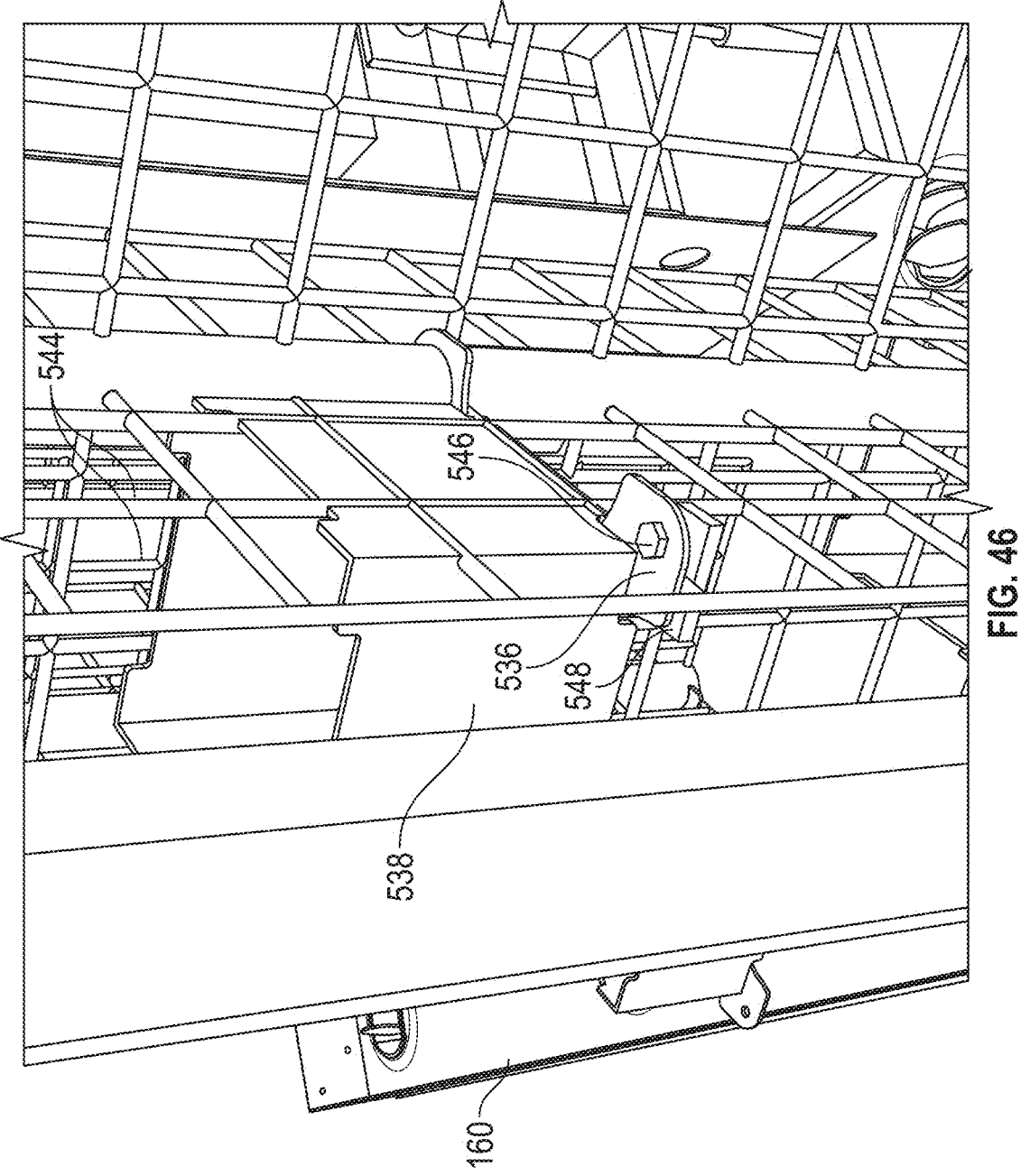
FIG. 46 is a fragmentary view showing how a spacer/pod subfloor can be attached to a climbing lattice in an exemplary embodiment equipped with a lattice structure for viney plants.

A third exemplary embodiment of a plant support system
is a lattice structure for viney plants (540) [FIG. 33], said
lattice structure for viney plants (540) [FIG. 33] comprising
a central rod (542) [FIG. 33] conformably made to extend
through the top cover (185) [FIG. 18];
a plurality of climbing lattices (544) [FIG. 18] extending
outward from the central rod (542) [FIG. 18] and
conformably arranged to hold a spacer/pod subfloor
(536) [FIG. 46];
the spacer/pod subfloor (536) [FIG. 30] with a drain port
aperture (510) [FIG. 33];
a lateral containment structure (538) [FIG. 30 & FIG. 33]
that sets atop the spacer/pod subfloor (536) [FIG. 30];
and
a means for attaching the spacer/pod subfloor (536) [FIG.
46] to the climbing lattice (544) [FIG. 18]. Said means
are defined in the Lexicography.

Exemplary Embodiments of a Fertigation Supply System

Figure 9:
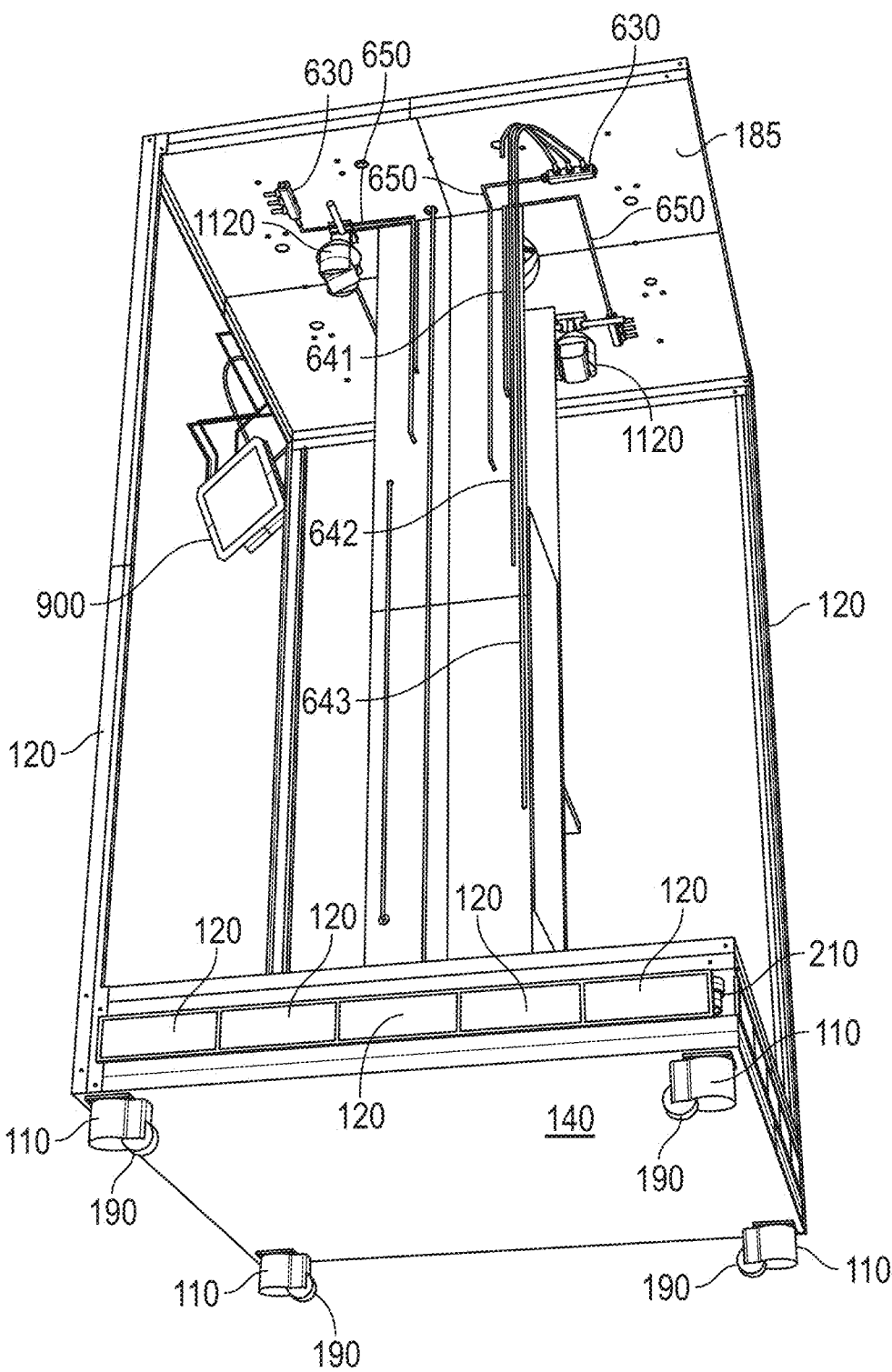
FIG. 9 is a perspective view of an exemplary embodiment showing cameras and the inner structural core of the disclosed embodiments.

Each portable modular indoor vertical agricultural growing
machine is further comprised, in part, of a fertigation supply
system. The fertigation supply system provides nutrition to
the plants and is comprised of one or more of any of the
following two exemplary embodiments:

Fourth Exemplary Embodiment—A One Pump Controllable Nutrition Supply Pump System A fourth exemplary embodiment discloses a fertigation
supply system consisting of a one pump controllable nutri-
tion supply pump system comprising:
a controllable ultraviolet radiation sterilizing filtration
system (730) that is fluidly connected to a return tub
(740), said controllable ultraviolet radiation sterilizing
filtration system comprising these electrically con-
nected elements
an ultraviolet filter (730); and
a programmable timer module (280);
a return pump (750) fluidly connected to the ultraviolet
filter (730);
a nutrition supply reservoir (600) fluidly connected to the
return pump (750);
a controllable nutrition supply pump system comprising
the following electrically connected elements
a splitter hub containing ports for controlling a venti-
lation system, an ultraviolet radiation sterilizing fil-
tration system, a fertigation supply system pump,
and a fertigation drain and return system pump (800)
[FIG. 2];
a programmable timer module (280) [FIG. 2];
a power supply (670) [FIG. 2];
a nutrition supply pump (610) [FIG. 2];
a nutrition supply pump output control rheostat (675)
[FIG. 2]; and
an MDR power supply (680) [FIG. 2];
a master manifold (620) [FIG. 17];
a plurality of sub-manifolds (630) [FIG. 17];
a plurality of columnar supply conduits (640) [FIG. 15];
a plurality of supply hoses (650) [FIG. 9] fluidly connect-
ing said nutrition supply reservoir (600) [FIG. 17],
nutrition supply pump (610) [FIG. 2], master manifold
(620) [FIG. 17], the plurality of sub-manifolds (630)
[FIG. 17]; and the plurality of columnar supply con-
duits (640) [FIG. 15];
a plurality of liquid delivery conduits (660) [FIG. 15]
fluidly connected to said columnar supply conduits
(640) [FIG. 15]; and
a plurality of liquid delivery nozzles (690) [FIG. 15]
fluidly connected to said liquid delivery conduits (660)
[FIG. 15].
Optionally, it is possible, as shown in the exemplary
embodiment depicted in FIG. 15 and FIG. 16, for the
fertigation supply system to be further comprised of a valve
(685) that can regulate or eliminate the flow of fertigation to
the liquid delivery nozzle (690).

Fifth Exemplary Embodiment—A Multi-Pump Controllable Nutrition Supply Pump System A fifth exemplary embodiment discloses a fertigation
supply system consisting of a multi-pump controllable nutri-
tion supply pump system comprising:

a controllable ultraviolet radiation sterilizing filtration system (730) that is fluidly connected to a return tub (740), said controllable ultraviolet radiation sterilizing filtration system comprising these electrically connected elements an ultraviolet filter (730); and a programmable timer module (280);

a return pump (750) fluidly connected to the ultraviolet filter (730);

a nutrition supply reservoir (600) fluidly connected to the return pump (750);

a controllable nutrition supply pump system comprising the following electrically connected elements a splitter hub containing ports for controlling a ventilation system, an ultraviolet radiation sterilizing filtration system, a fertigation supply system pump, and a fertigation drain and return system pump (800) [FIG. 3];

a dry contact board (840) [FIG. 3];

a plurality of nutrition supply pumps (610) [FIG. 3];

a master manifold (620) [FIG. 17];

a plurality of sub-manifolds (630) [FIG. 17];

a plurality of columnar supply conduits (640) [FIG. 15];

a plurality of supply hoses (650) [FIG. 9] fluidly connecting said nutrition supply reservoir (600) [FIG. 17], nutrition supply pump (610) [FIG. 2], master manifold (620) [FIG. 17], the plurality of sub-manifolds (630) [FIG. 17]; and the plurality of columnar supply conduits (640) [FIG. 15];

a plurality of liquid delivery conduits (660) [FIG. 15] fluidly connected to said columnar supply conduits (640) [FIG. 15]; and a plurality of liquid delivery nozzles (690) [FIG. 15] fluidly connected to said liquid delivery conduits (660) [FIG. 15].

Figure 16:
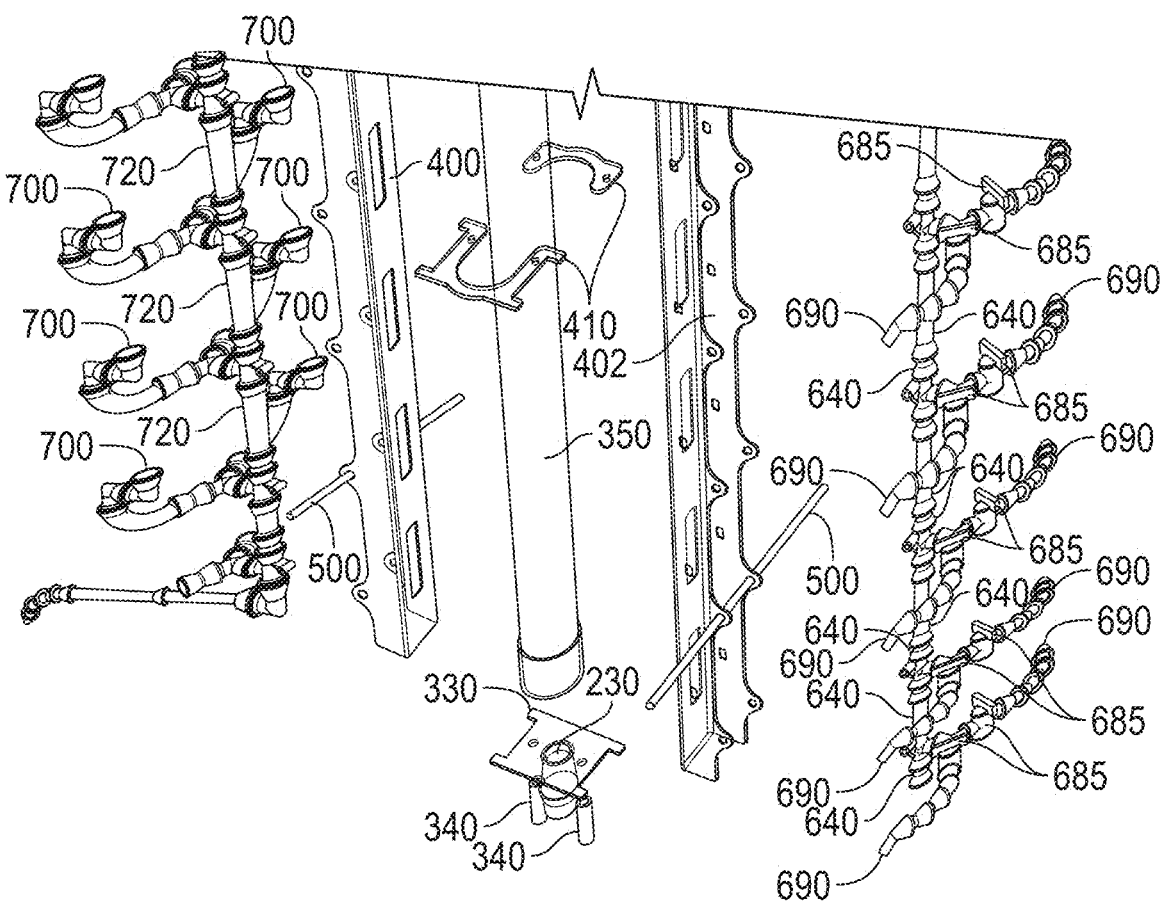
FIG. 16 is an exploded view of the lower portion of an exemplary embodiment of a column support member.

Optionally, it is possible, as shown in the exemplary embodiment depicted in FIG. 15 and FIG. 16, for the fertigation supply system to be further comprised of a valve (685) that can regulate or eliminate the flow of fertigation to the liquid delivery nozzle (690).

Sixth Exemplary Embodiment—A Fertigation Drain and Return System in Use with a Single-Pump Controllable Nutrition Supply Pump System A sixth exemplary embodiment discloses a fertigation drain and return system in use with a single-pump controllable nutrition supply pump system, said fertigation drain and return system comprising:

a plurality of removable drain ports (700) [FIG. 15] fluidly connected to a plurality of liquid drain conduits (710) [FIG. 15];

a columnar drain (720) [FIG. 15] that is fluidly connected to the plurality of liquid drain conduits (710) [FIG. 15];

a controllable ultraviolet radiation sterilizing filtration system that is fluidly connected to a plurality of the columnar drains (720) [FIG. 15], said controllable ultraviolet radiation sterilizing filtration system comprising these electrically connected elements an ultraviolet filter (730) [FIG. 2]; and a programmable timer module (280) [FIG. 2]; and a return tub (740) [FIG. 47].

Seventh Exemplary Embodiment—a Fertigation Drain and Return System in Use with a Multi-Pump Controllable Nutrition Supply Pump System A seventh exemplary embodiment discloses a fertigation drain and return system in use with a multi-pump controllable nutrition supply pump system, said fertigation drain and return system comprising:

a plurality of removable drain ports (700) [FIG. 15] fluidly connected to a plurality of liquid drain conduits (710) [FIG. 15];

a columnar drain (720) [FIG. 15] that is fluidly connected to the plurality of liquid drain conduits (710) [FIG. 15];

a controllable ultraviolet radiation sterilizing filtration system that is fluidly connected to a plurality of the columnar drains (720) [FIG. 15], said controllable ultraviolet radiation sterilizing filtration system comprising these electrically connected elements an ultraviolet filter (730) [FIG. 3];

a dry-contact relay (760) [FIG. 3]; and a return tub (740) [FIG. 47].

Exemplary Embodiments of an Environmental Control System

Eighth Exemplary Embodiment—Environmental System Control Computer, Nutrition Supply and Monitoring Control Computer and Software for Each Computer An eighth exemplary embodiment discloses an embodiment in which the environmental control system further comprises software for accepting and processing input from the full spectrum suite of environmental sensors (910) & (920);

software for producing commands to the lighting system control port (820);

the controllable exhaust fan system;

the controllable ultraviolet radiation sterilizing filtration system;

the controllable nutrition supply pump system; and the controllable return pump system;

the environmental control system computer (900) comprising a central processing unit capable of running the software;

a means for storing and retrieving data;

a means for data input;

a means for reading data output;

and the nutrition supply control system further comprises a data connection to a nutrition supply and monitoring control computer (1000) from said sensor interface board (1020) and said splitter hub (1050);

software for accepting and processing input from the nutrient pH sensor (1030);

the electrical conductivity and temperature sensor for liquids (1040);

the plurality of water detectors (1060) and water detector sensors (1070);

the nutrition supply and monitoring control computer (1000) comprising a central processing unit capable of running the software;

a means for storing and retrieving data;

a means for data input; and a means for reading data output.

Detailed Description of the Drawings

FIG. 1 is a front view of an exemplary embodiment showing the exterior of a cabinet (100) showing a plurality of doors (170) in a closed configuration and with the air filters (220) [FIG. 4] removed to reveal an air filtration chamber (210) that exists between the air filters, the subfloor (140), and the floor (160) [FIG. 4].

FIG. 1 further illustrates that the exemplary embodiment is equipped with Internet connectivity and can plug into 120 Volt alternating current electric power. That FIG. also introduces the following elements: legs (110) and caster wheels (190) (both of these collectively, are parts of a self-leveling caster); a plurality of vertical frame members (120); a plurality of lateral subframe members (130); a plurality of lateral frame members (150); and a plurality of lateral top frame members (180).

FIG. 2 is a schematic of an exemplary embodiment using two pumps and showing a plurality of cameras (1120) that are connectable to 120 Volt alternating current electrical power (although the use of a single camera is also claimed and within the scope of this disclosure). The same figure also reveals two separate control computers, each of which control different sensors and devices: an environmental control system computer (900) and a nutrition supply and monitoring control computer (1000).

An environmental control system computer (900) is shown as being electrically connectable to a 120 Volt alternating current electrical power source and to the Internet. The environmental control system computer (900) is electrically connected to a 2 channel light connector (819), a sensor connector (809), and a device connector (799).

FIG. 2 further shows that the 2 channel light connector (819) is connected to a lighting system control port (820) which is electrically connected via an LED driver connector (820) to an LED driver (310). The LED driver is, in turn, electrically connected to a light wiring harness (320); the light wiring harness is electrically connected to a plurality of LED bulbs (350) (although the use of a single LED bulb is also claimed and within the scope of this disclosure).

The sensor connector (809) connected to the environmental control system computer (900) is also electrically connected to ports (800) for controlling a ventilation system, an ultraviolet radiation sterilizing filtration system, a fertigation supply system pump, and a fertigation drain and return system pump.

FIG. 2 further reveals that one of the ports (800) is connected electrically via a progammable module connector cable (801) to a programmable timer module (280) which itself is electrically connected to a 120 Volt alternating current power source. The programmable timer module is also connected via a power supply cord (271) to a power supply (270). The power supply (270) is then electrically connected via a rheostat connection cable (261) to a rheostat (260) which, in turn, is electrically connected via a fan cord (251) to a fan (290).

One of the ports (800) in FIG. 2 is connected electrically via a progammable module connector cable (802) to a programmable timer module (280) which itself is electrically connected to a 120 Volt alternating current power source. The programmable timer module is also connected via a UV power cord (729) to an ultraviolet filter (730).

FIG. 2 further reveals that one of the ports (800) is connected electrically via a progammable module connector cable (803) to a programmable timer module (280) which itself is electrically connected to a 120 Volt alternating current electrical power source. The programmable timer module is also connected via a power supply power cord (671) to a power supply (670), which is connected via a supply pump cord (669) to a nutrition supply pump (610). The nutrition supply pump is connected via a second supply pump cord (674) to a nutrition supply pump output control rheostat (675). The nutrition supply pump output control rheostat is also connected via a power supply cord (676) to an MDR power supply (680).

FIG. 2 also illustrates that one of the ports (800) is connected electrically via a dry-contact relay connector cable (804) to a dry-contact relay (760) which itself is electrically connected to a 120 Volt alternating current electrical power source. The dry-contact relay is electrically connected via a return pump power cord (751) to a return pump (750).

A nutrition supply and monitoring control computer (1000) is also portrayed in FIG. 2 as connectable to the Internet and electrically connectable to a 120 Volt alternating current electrical power source. The nutrition supply and monitoring control computer is electrically connected via a cable (1019) to a sensor interface board (1020) to which is connected, in turn, a nutrient pH sensor (1030) and an electrical conductivity and temperature sensor for liquids (1040).

Finally, FIG. 2 further depicts that the nutrition supply and monitoring control computer (1000) is connected via a cable (1049) to a splitter hub (1050). The splitter hub is then connected to a plurality of water detectors (1060), each of which possesses its own water detector sensor (1070).

FIG. 3 is similar to FIG. 2 except with regard to the ports (800) for controlling pumps. In FIG. 3, the ports (800) for controlling pumps are electrically connected via a dry-contact relay connector cable (805) to a dry contact board (840) which is also electrically connectable to a 120 Volt alternating current electrical power source. The dry contact board (840) is, in turn, electrically connected to a plurality of nutrition supply pumps (610) and to a return pump (750).

FIG. 4, a front top perspective view of an exemplary embodiment showing the inner structural core of the disclosed embodiments, presents a number of elements. In addition to the legs (110) and caster wheels (190) (which collectively represent a self-leveling caster), a plurality of air filters (220) are shown, along with a plurality of lateral frame members (150), a plurality of lateral top frame members (180), and a plurality of vertical frame members (120). A floor (160) is depicted as being penetrated by a plurality of air flow nozzles (230) and a plurality of adjustable air vents (235) that allow air movement out of the air filtration chamber (210) [FIG. 1].

The same FIG. 4 also reveals a plurality of inner support members (187) to which is attached a nutrition supply reservoir (600). A location of a full spectrum suite of environmental sensors (920) is also shown. The fan (290) that exhausts air out of the top cover (185) is identified, along with the location of the environmental control system computer (900). Internet connectability and connectability to 120 Volt alternating current electrical power are also portrayed.

FIG. 5, a left top perspective view of an exemplary embodiment showing the inner structural core of the disclosed embodiments, shows most of the elements of the previous figure, but also shows the location of the splitter hub (1050), a water detector (1060) and its water detector sensor (1070) mounted on one of the inner support members (187).

Figure 6:
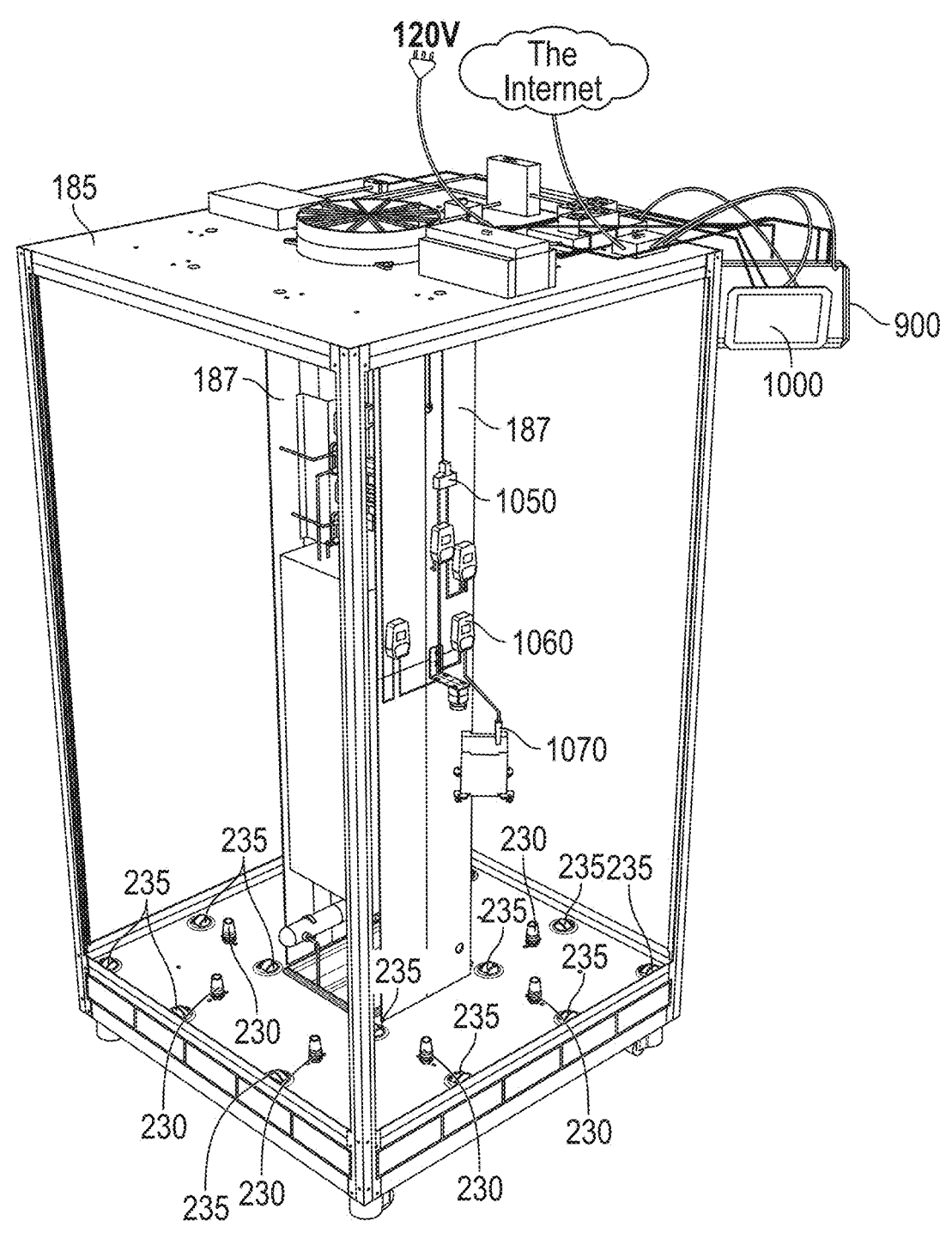
FIG. 6 is a rear top perspective view of an exemplary embodiment showing the inner structural core of the disclosed embodiments.

FIG. 6 is a rear top perspective view of an exemplary embodiment showing the inner structural core of the disclosed embodiments. The elements shown are similar to those in the previous two figures, but this Figure also shows us the mounting position of the nutrition supply and monitoring control computer (1000) with respect to the environmental control system computer (900).

Figure 7:
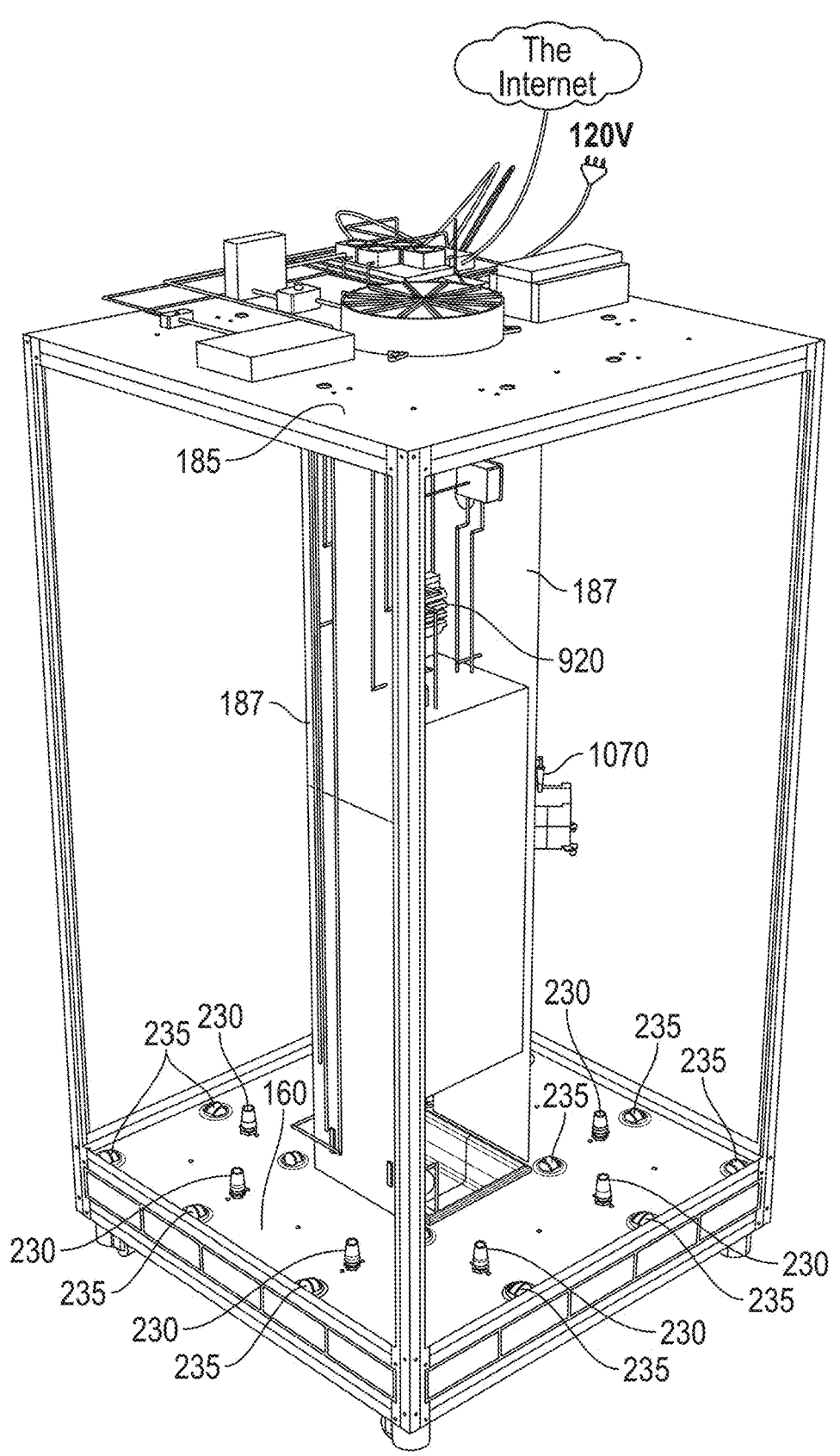
FIG. 7 is a right top perspective view of an exemplary embodiment showing the inner structural core of the disclosed embodiments.

FIG. 7 is a right top perspective view of an exemplary embodiment showing the inner structural core of the disclosed embodiments; it shows the same inner structural core as the previous three Figures, just from a different perspective.

FIG. 8 is a perspective view of the lower portion of an exemplary embodiment showing the inner structural core of the disclosed embodiments and a sectional view of the nutrition supply reservoir (600) showing the contents of the reservoir, specifically, fertigation solution (1080) and sensors evaluating it, including a nutrient pH sensor (1030), an electrical conductivity and temperature sensor for liquids (1040) and a water detector sensor (1070).

FIG. 9 is a perspective view of an exemplary embodiment. In addition to the inner structural core of the disclosed embodiments, this Figure reveals the placement of cameras (1120) and the position of a plurality of sub-manifolds (630), as well as an upper column fertigation supply hose (641), a mid-column fertigation supply hose (642), and a lower column fertigation supply hose (643). The purpose of these three supply hoses are to provide fertigation at every third of the height of the columns so that the pressure is more or less equal throughout the height of the columns, rather than all of it at the top and little at the bottom.

Figure 10:
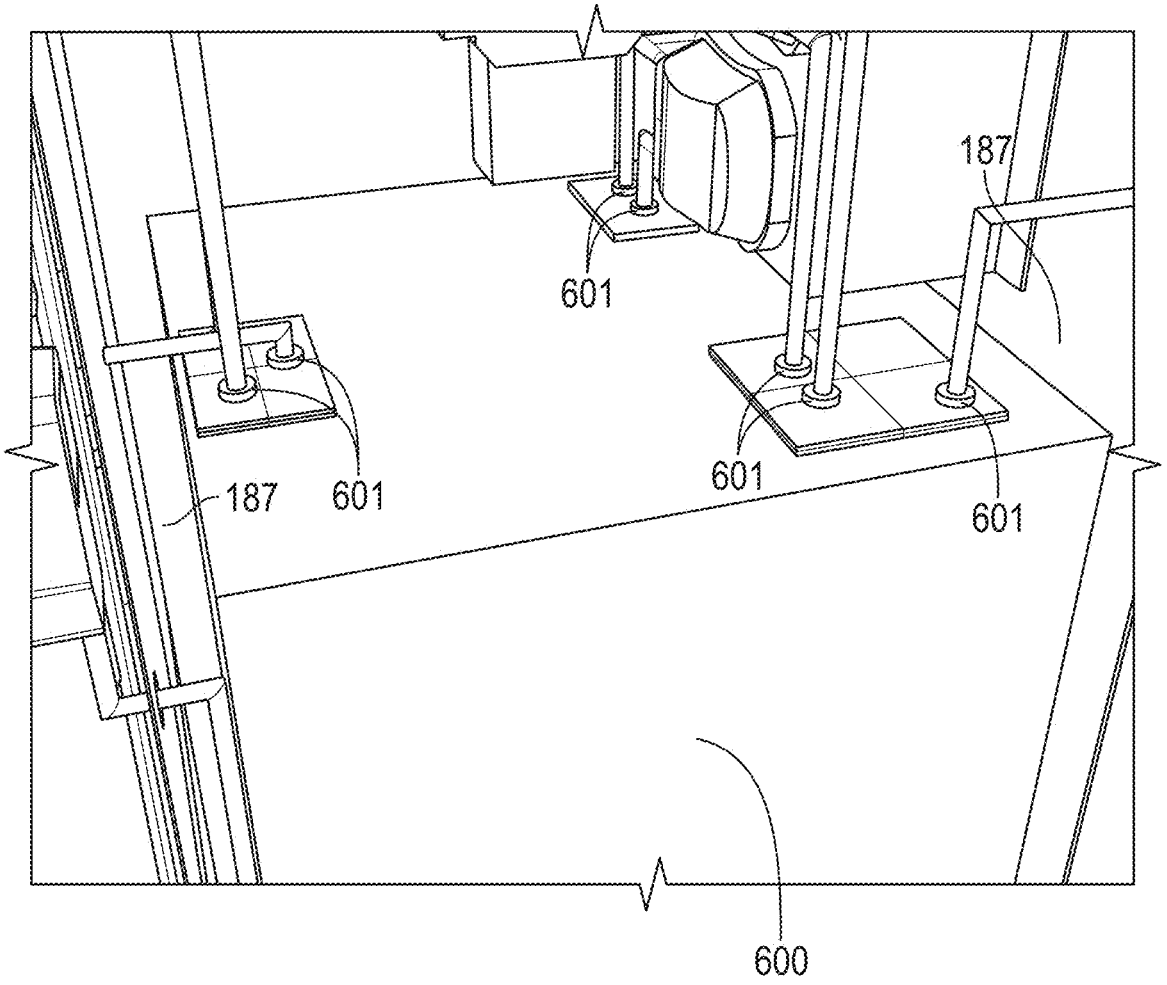
FIG. 10 is a perspective view of an exemplary embodiment showing a plurality of grommets around various elements that penetrate the top of the nutrition supply reservoir.

FIG. 10 is a perspective view of an exemplary embodiment showing a plurality of grommets (601) around various elements that penetrate the top of the nutrition supply reservoir (600). The grommets prevent the contents of the nutrition supply reservoir from leaking out at the point that the reservoir is penetrated.

Figure 11:
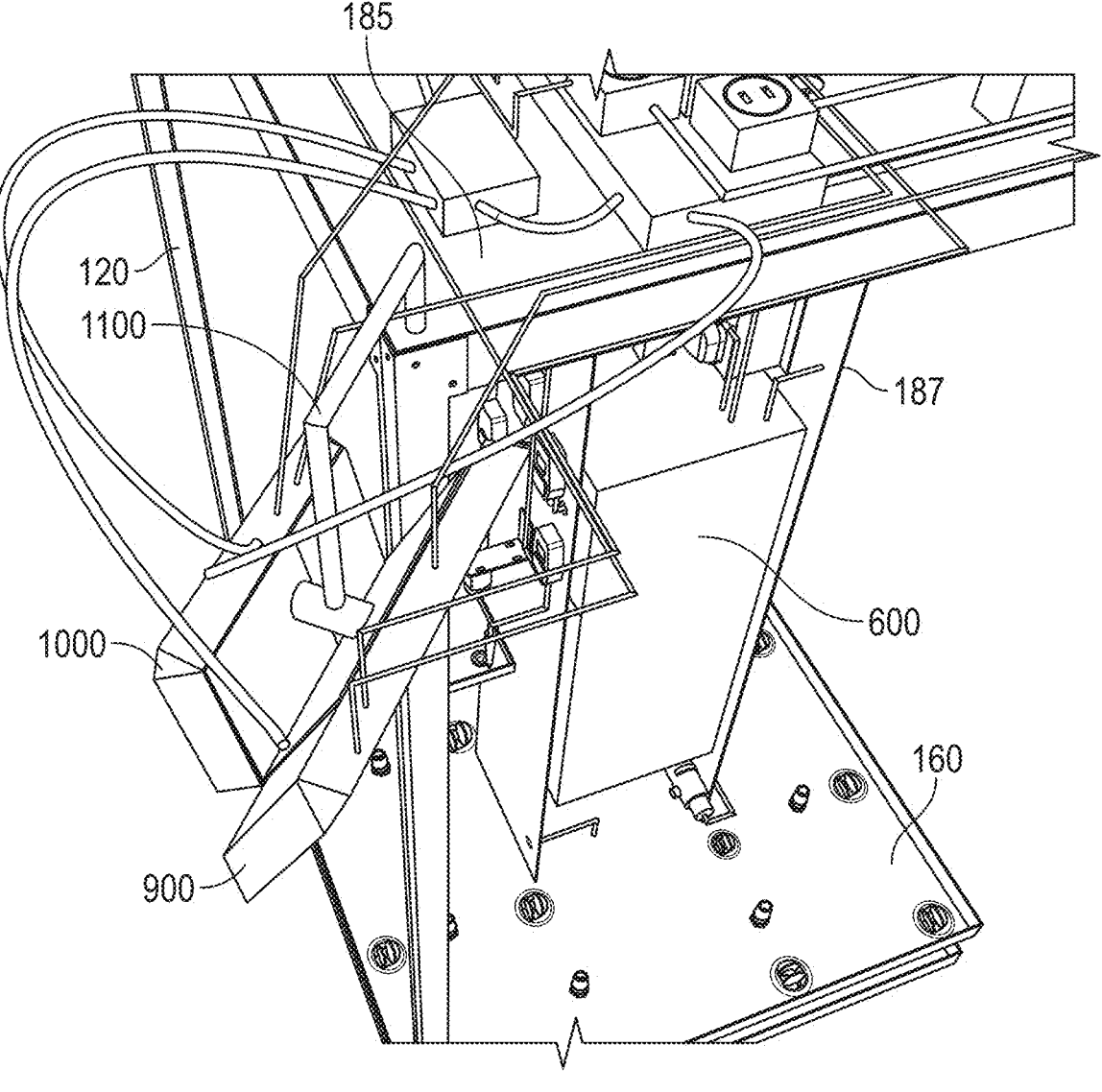
FIG. 11 is a perspective view of an exemplary embodiment showing an embodiment of a mounting bracket for an environmental control system computer and a nutrition supply and monitoring control computer.

FIG. 11, a perspective view of an exemplary embodiment, illustrates an embodiment of a mounting bracket (1100) for an environmental control system computer (900) and a nutrition supply and monitoring control computer (1000).

Figure 12:
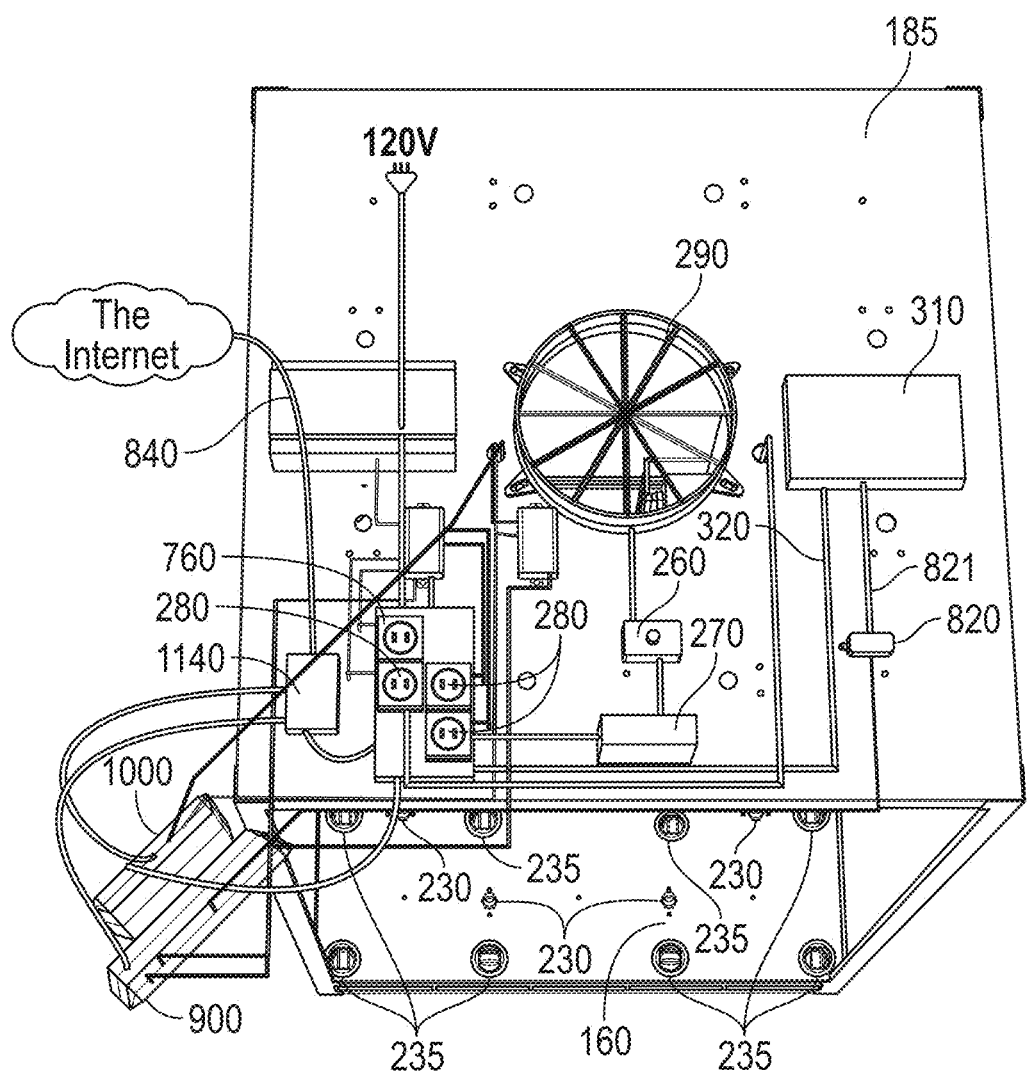
FIG. 12 is a top perspective view of an exemplary embodiment showing the top cover of the cabinet.

FIG. 12 presents a top perspective view of an exemplary embodiment showing the top cover (185) of the cabinet (100) and the following items whose location are shown thereon: the dry contact board (840); the dry-contact relay (760); a plurality of programmable timer modules (280); the power supply (270); the rheostat (260); the fan (290); the lighting system control port (820); the LED driver connector (821); and the LED driver (310).

FIG. 13 is a left perspective view of an exemplary embodiment showing the relative positions of various elements around the inner structural core of a disclosed embodiment. It reveals the existence of an exhaust port (250), the placement of a splitter hub (1050) on the outside of one inner support member (187) and the placement of a plurality of nutrition supply pumps (610) on the interior of another inner support member (187).

Figure 14:
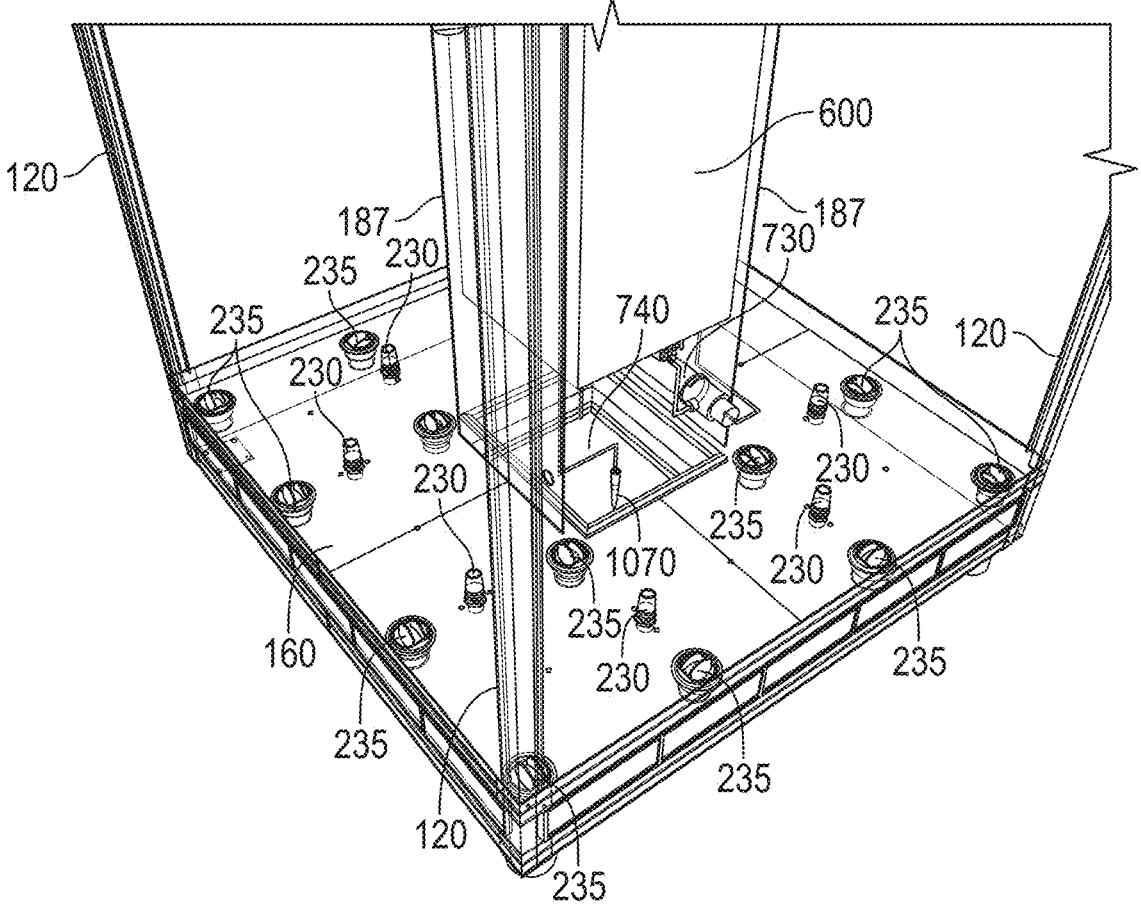
FIG. 14 is a left partial perspective view of an exemplary embodiment showing the floor and the relative positions of various elements penetrating the floor of a disclosed embodiment.

FIG. 14 is a left partial perspective view of an exemplary embodiment showing the floor (160) and the relative positions of air flow nozzles (230) and adjustable air vents (235) penetrating the floor of a disclosed embodiment. The relative positions of the air flow nozzles (230) secure cool air for the LED bulbs (350) and the adjustable air vents (235) provide for uniform air flow through the grow chamber (240); the grow chamber is bounded by the doors (170) on the sides, the floor (160) on the bottom and the top cover (185) on the top. Air flow is from bottom to top, through the air filters (220), into the air filtration chamber (210), then into the grow chamber (240) through the air flow nozzles (230) and adjustable air vents (235), and then out through the exhaust port (250) in the top cover (185), the air being expelled through the top by the fan (290). The vertical frame member (120) in the foreground is depicted as a see-through ghost image to aid in visualization of the structures behind it.

FIG. 15 is an exploded view of an exemplary embodiment of a column support member. Structural strength is provided to the column support member by a type A column support member (400) and a type B column support member (402); the two types of column support members are similar, but not identical, the holes for accommodating the structural support pins (500) being slightly offset, i.e., not in the same place, on the type A column support member (400) vis-a-vis the type B column support member (402).

FIG. 15 further introduces us to the additional elements. The LED bulb (350), is in between the type A column support member (400) and the type B column support member (402) and a plurality of LED bulb spacers/holders (410), a light holder (330), and a mounting spacer (340) prevent the LED bulb (350) from being crushed by the type A column support member (400) and the type B column support member (402).

FIG. 15 also introduces us to plumbing structures used to deliver fertigation and to drain away excess fertigation that drains out of plant growing mediums. Fertigation is delivered through a plurality of columnar supply conduits (640) which terminate in a plurality of liquid delivery nozzles (690). Excess fertigation can be drained away via a plurality of removable drain ports (700) (each of which can connect to the drain port aperture (510) in the bottom of growing trays (520) [FIG. 26]) each of which is connected to a liquid drain conduit (710) which is then connected to a columnar drain (720). A series of the columnar drains carry excess fertigation into a discharge hose (727) [FIG. 17] that empties in a return tub (740) [FIG. 17].

FIG. 15 also depicts an optional configuration in which a valve (685) is placed between the columnar supply conduit (640) and the liquid delivery nozzle (690) to allow for individual control of the rate of flow of fertigation through said liquid delivery nozzle (690) as desired or to cut off such flow entirely.

The columnar supply conduits (640), valves (685), liquid delivery nozzles (690), removable drain ports (700), drain port apertures (510), liquid drain conduits (710), columnar drains (720), and discharge hoses (727) are depicted as an embodiment constructed out of Loc-Line® Modular Hose System by Lockwood Products, Inc. This modular hose system, employs a ball and socket assembly with just enough friction to create hoses that offer flexible positioning while staying in position and not fatiguing.

Although the Loc-Line® Modular Hose System is depicted in the illustrated embodiments all other hoses that are bendable and offer flexible positioning while staying in position and not fatiguing can be used for all of the purposes for which the Loc-Line® Modular Hose System is depicted in the illustrated embodiments and are claimed and are within the scope of this disclosure. Those skilled in the art of industrial hoses will be acquainted with examples of hoses that are bendable and offer flexible positioning while staying in position and not fatiguing and how these hoses can be used in plumbing agricultural machines and thus further description of these is unnecessary for one of ordinary skill in the art to be able to comprehend and practice the disclosed technology as claimed.

FIG. 16 is an exploded view of the lower portion of an exemplary embodiment of a column support member, but provides a magnified perspective of the bottom portion of FIG. 17 to allow details to be better visualized.

FIG. 17 is a schematic showing elements of the fertigation supply and liquid return system. It also depicts the elements in the exploded view of FIG. 15 in assembled form and how they interrelate with the elements of the fertigation supply and liquid return system. FIG. 46 also provides a different and more closeup perspective of the elements close to the return tub (740). FIG. 17 and FIG. 46 both depict that liquid fertigation solution (1080) [FIG. 8] is sucked out of a return tub (740) through a UV filter supply hose (728), through an ultraviolet filter (730), and through a return pump feed hose (742) by a return pump (750) which pumps it through a reservoir return hose (752) and into the nutrition supply reservoir (600).

The liquid fertigation solution (1080) [FIG. 8] is then sucked out of the nutrition supply reservoir (600) through a supply hose (650) by a nutrition supply pump (610) and pumped through a supply hose (650) into a master manifold (620), as those elements are depicted in FIG. 17. From there, the fertigation solution exits the master manifold through a plurality of supply hoses (650) and enters into a plurality of sub-manifolds (630). Each sub-manifold supplies fertigation solution to an upper column fertigation supply hose (641), a mid-column fertigation supply hose (642) and a lower column fertigation supply hose (643) [FIG. 9] which connect to the columnar supply conduit (640) [FIG. 15] and supply fertigation solution to a plurality of plant growth mediums via a plurality of liquid delivery nozzles (690) [FIG. 17].

FIG. 17 further illustrates how excess fertigation solution can drain into the return tub (740). Excess fertigation solution can drain through the drain port aperture (510) of a growing tray (520) [FIGS. 25 & 26] and thence into a removable drain port (700), through a liquid drain conduit (710), through a columnar drain (720) [FIG. 15] and into a discharge hose (727) that empties into the return tub (740).

FIG. 18 is a see through perspective view showing the relative placement of the fertigation supply and liquid return system within an exemplary embodiment of a cabinet (100). It allows the elements of FIG. 18 to be visualized in the context of the cabinet itself from a perspective of looking down into the cabinet.

Figure 19:
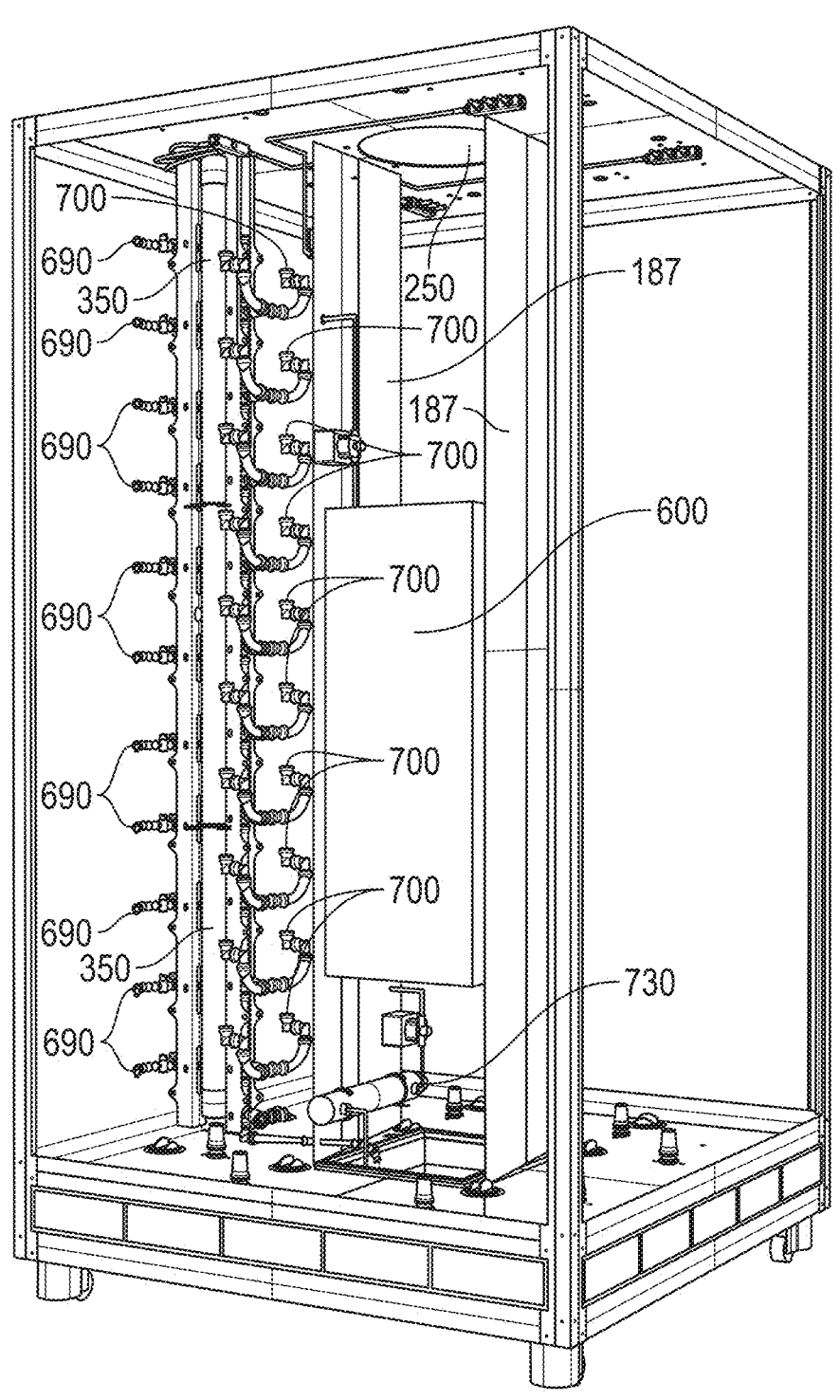
FIG. 19 is a perspective view of an exemplary embodiment showing the relative placement of the fertigation supply and liquid return system with respect to the inner structural core of the disclosed embodiments.

FIG. 19 is a perspective view of an exemplary embodiment showing the relative placement of the fertigation supply and liquid return system with respect to the inner structural core of the disclosed embodiments.

Figure 20:
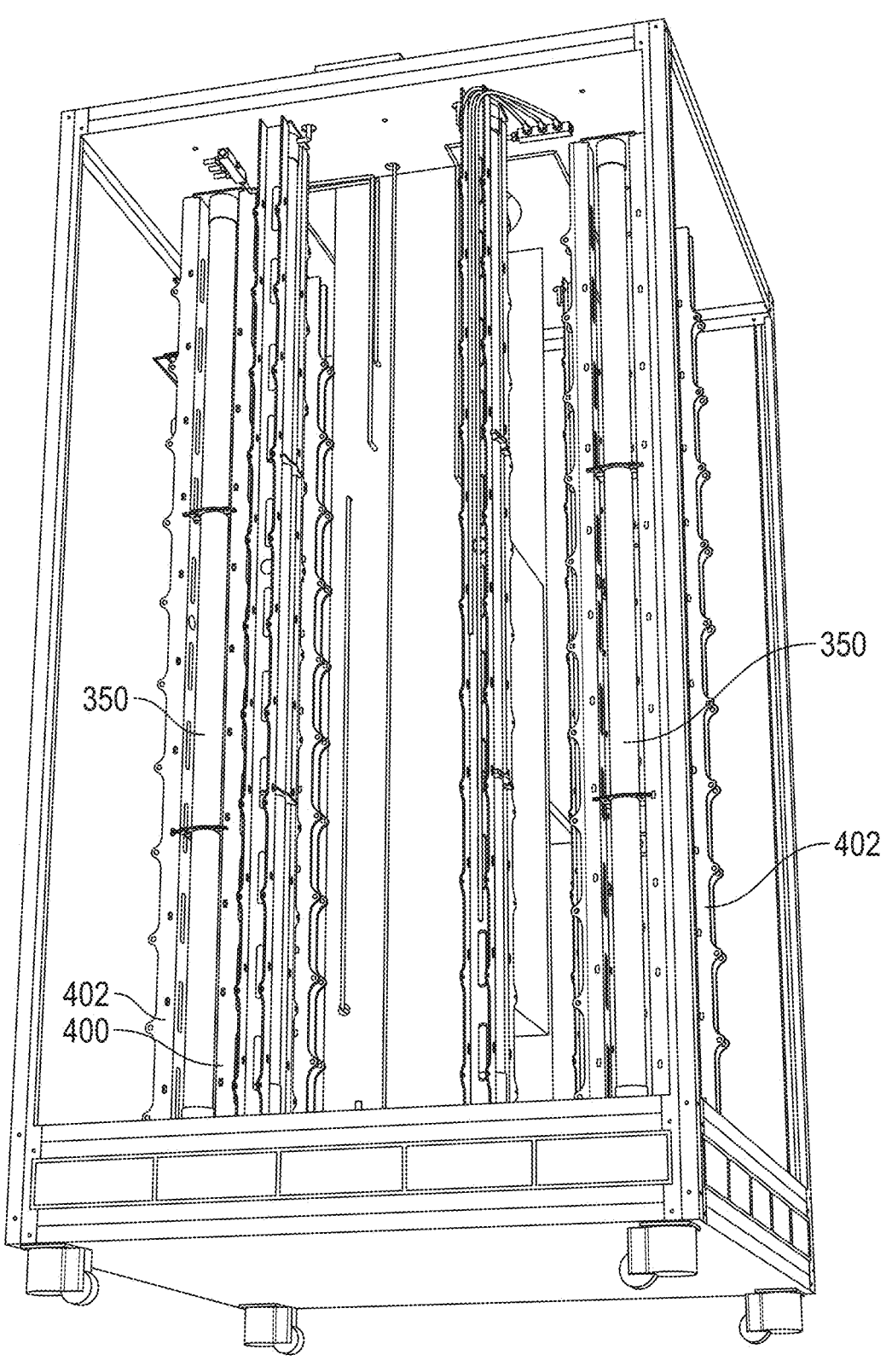
FIG. 20 is a perspective view of an exemplary embodiment showing the relative placement of the fertigation supply and liquid return system with a plurality of column support members with respect to the inner structural core of the disclosed embodiments.

FIG. 20 is a perspective view of an exemplary embodiment showing the relative placement of the fertigation supply and liquid return system with a plurality of column support members with respect to the inner structural core of the disclosed embodiments.

Figure 21:
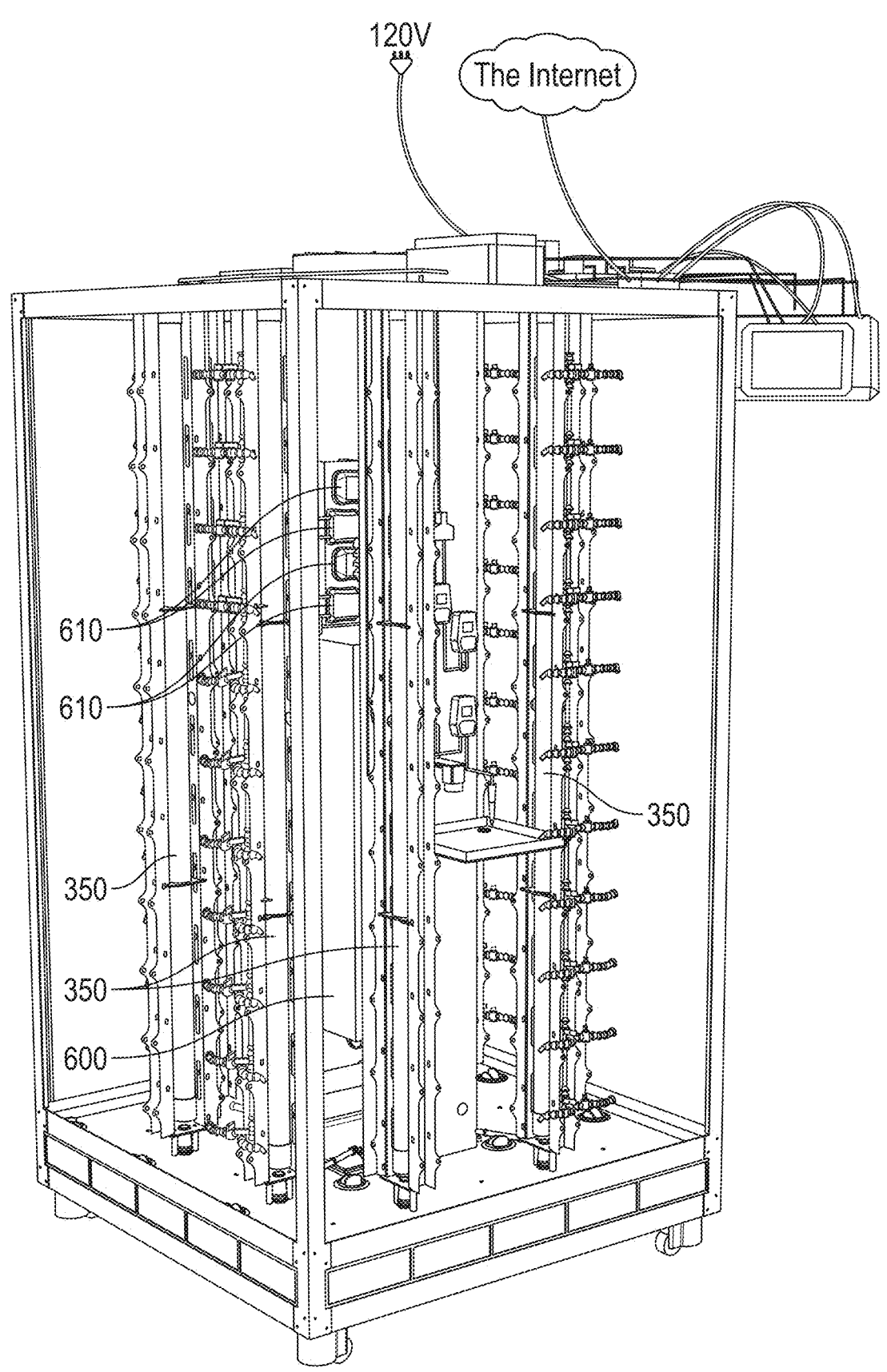
FIG. 21 is a rear perspective view of the inner structural core of the disclosed embodiments along with the relative placement of the fertigation supply and liquid return system with a plurality of column support members and sensors and pumps.

FIG. 21 is a rear perspective view of the inner structural core of the disclosed embodiments along with the relative placement of the fertigation supply and liquid return system with a plurality of column support members and sensors and pumps. It is an illustration of the fifth exemplary embodiment, having a plurality of nutrition supply pumps (610).

FIG. 22 is a fragmentary view of the floor (160), including the relative placement of the air flow nozzles (230) and the adjustable air vents (235) and affording a closeup and detailed view of elements of the lower portion of the fertigation supply and liquid return system.

Figure 23:
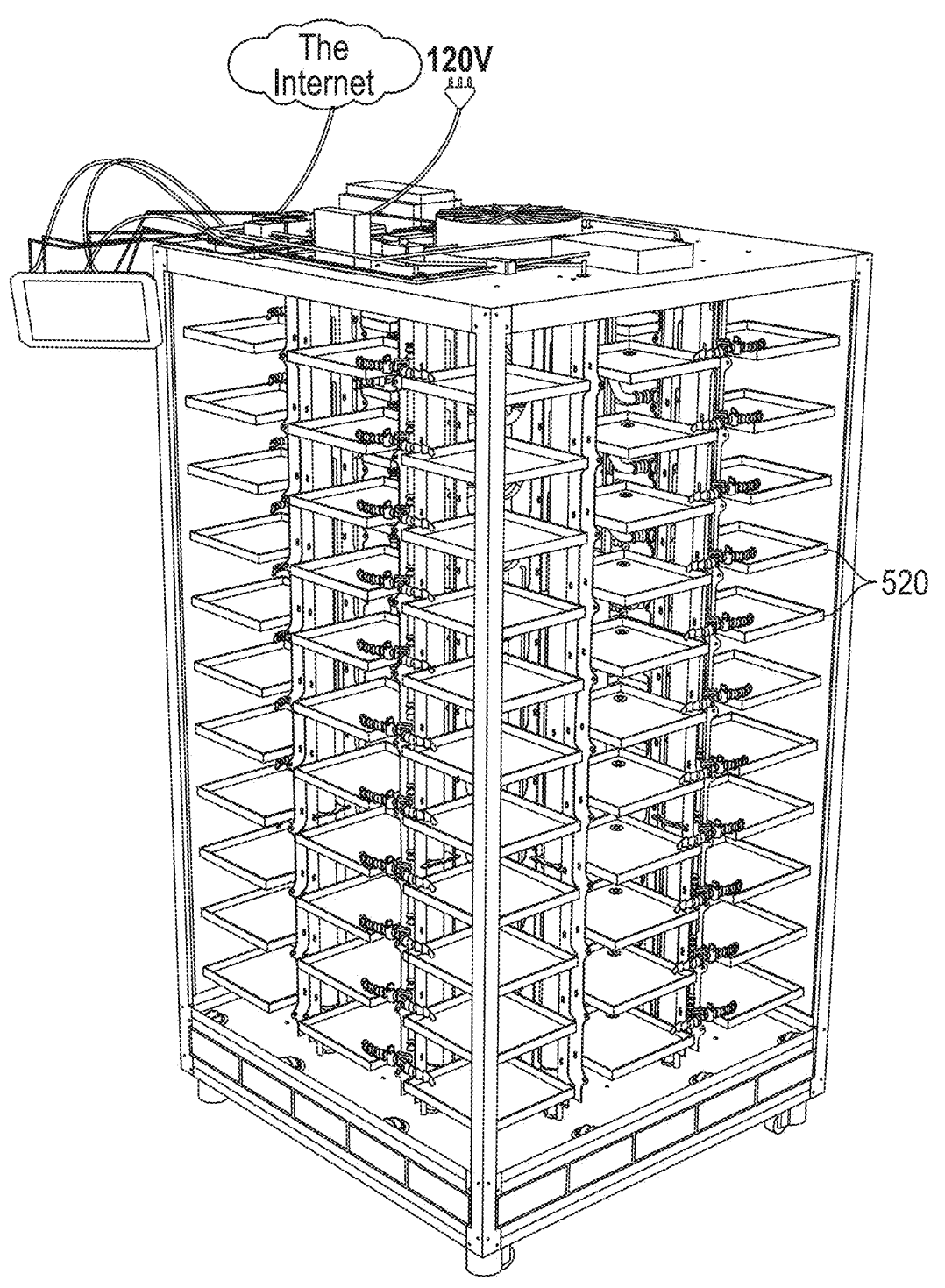
FIG. 23 is a front view of the interior of an exemplary embodiment equipped with a plurality of growing trays with the doors not illustrated to aid in visualization.

FIG. 23 is a front view of the First Exemplary Embodiment, being equipped with a plurality of growing trays (520), but the doors (170) [FIG. 1] are not illustrated to aid in visualization of the interior. The Figure also indicates that the portable, deployable, modular, indoor vertical agricultural machine illustrated in the Figure has the ability to connect to the Internet and to 120 Volt alternating current electric power.

FIG. 24 is a fragmentary view of the First Exemplary Embodiment, equipped with a plurality of growing trays (520) and with the doors (170) not illustrated for purposes of illustrating the interior. This Figure illustrates an embodiment in which each of the growing trays (520) is supported by a plurality of structural support pins (500).

FIG. 25 is top left perspective view of a growing tray (520) and FIG. 26 is a bottom left perspective view of a growing tray (520). Both Figures also show the placement of a drain port aperture (510) in the growing tray. The drain port aperture (510) is illustrated in both Figures as a removable component of the Loc-Line® Modular Hose System, but could be a component of any other modular system, a specially designed component or may be made part of the growing tray itself; all such embodiments are claimed by this disclosure.

Figure 27:
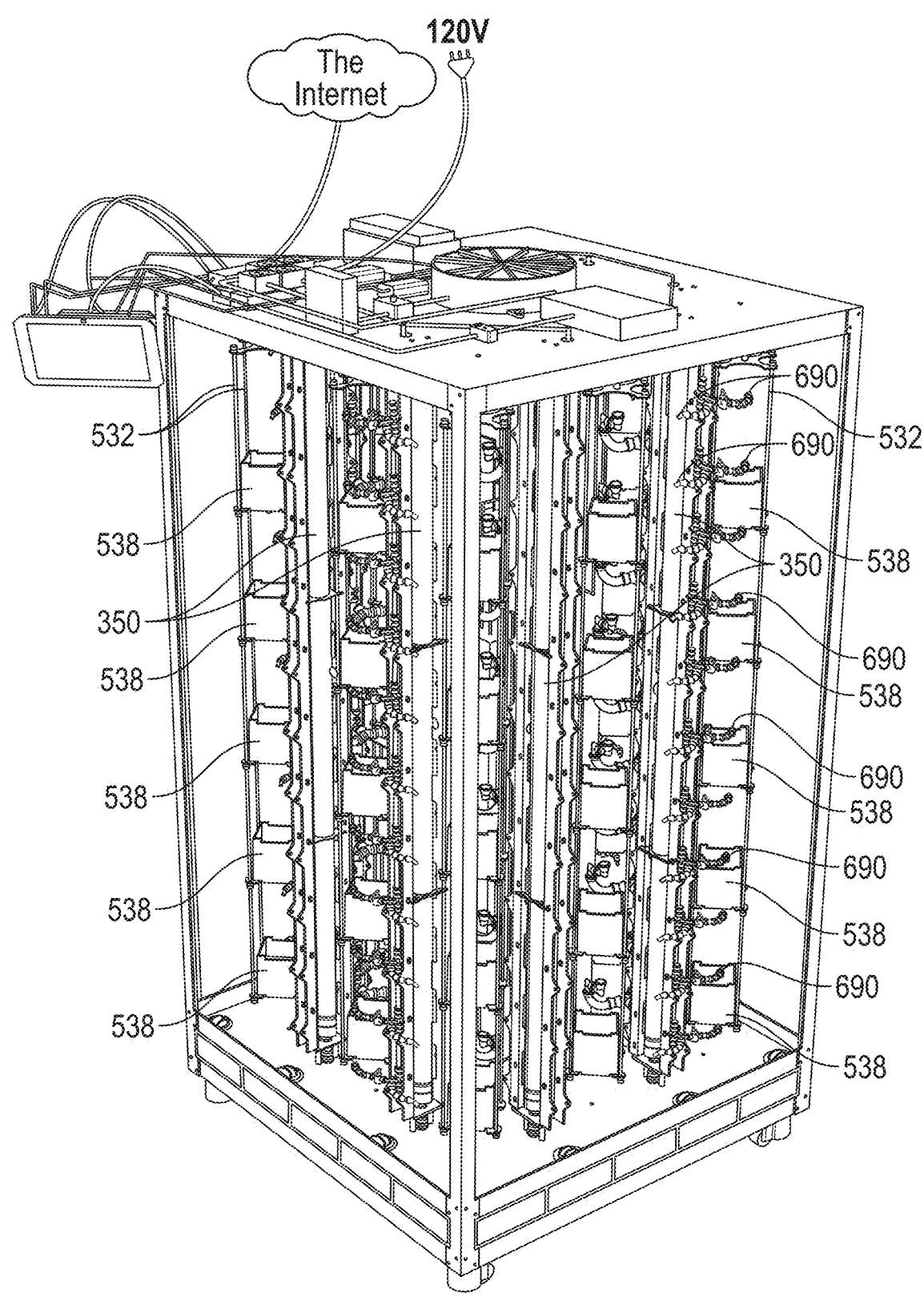
FIG. 27 is a front top perspective view of the interior of an exemplary embodiment equipped with a plurality of lateral containment structures with the doors not illustrated to aid in visualization.

FIG. 27 is a front top perspective view of the Second Exemplary Embodiment, being equipped with a plurality of hanging pod structures (530) [FIGS. 28-31], the illustration omitting the disclosure of the doors (170) to aid in the ability to visualize the interior of the portable, deployable, modular, indoor vertical agricultural machine depicted in the Figure. FIG. 27 further illustrates the presence of a plurality of lateral containment structures (538), each of which are positioned on a plurality of rods (532).

Figure 31:
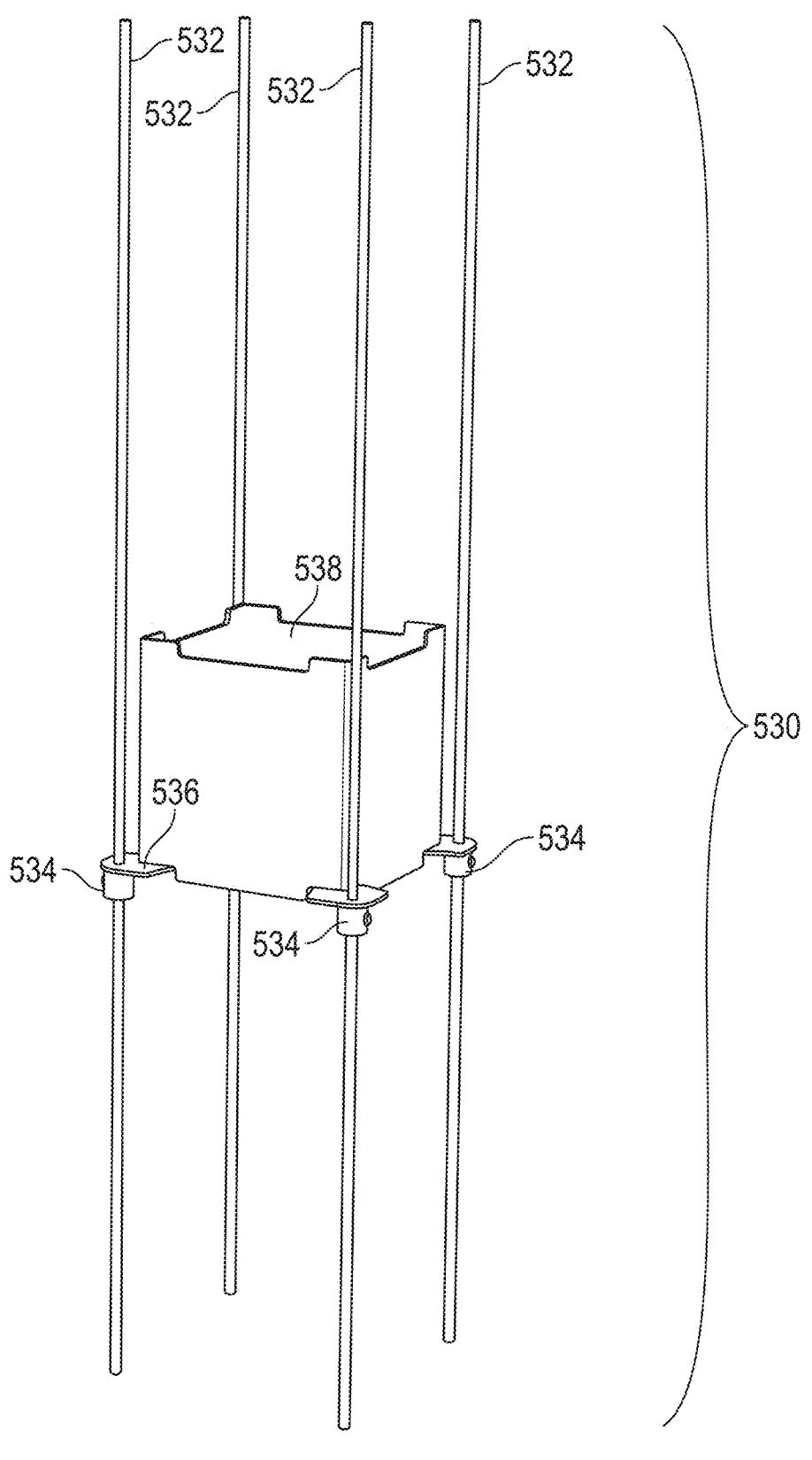
FIG. 31 is a perspective view of an exemplary embodiment of a hanging pod structure.

FIGS. 28-31 disclose exemplary embodiments of a hanging pod structure (530), with FIG. 28 showing a front top perspective view of an exemplary embodiment of a hanging pod structure (530), FIG. 29 illustrating a rear bottom perspective view of an exemplary embodiment of a hanging pod structure (530), FIG. 30 drawing an exploded view of an exemplary embodiment of a hanging pod structure (530), and FIG. 31 visualizing yet another perspective view of an exemplary embodiment of a hanging pod structure (530).

FIG. 28 illustrates a downward looking perspective of an embodiment of a hanging pod structure (530) which comprises a plurality of rods (532), set screw collars (534), spacers/pod subfloors (536), and lateral containment structures (538) and a top spacer (537) with a receiver for a fastener (539). FIG. 29 illustrates the same elements, but from an upward looking perspective and also illustrates that each spacer/pod subfloor (536) has a drain port aperture (510).

FIG. 30 is an exploded view of an exemplary embodiment of a hanging pod structure (530), showing a a plurality of rods (532), set screw collars (534), a spacer/pod subfloor (536) having a drain port aperture (510), and a lateral containment structure (538).

FIG. 31 depicts how the spacer/pod subfloor (536) rests on a plurality of set screw collars (534). The set screw collars friction fit on the plurality of rods (532) sufficiently to support the weight of the spacer/pod subfloor (536), the lateral containment structure (538) and any selected plant growth medium and any plant growing therein.

Figure 32:
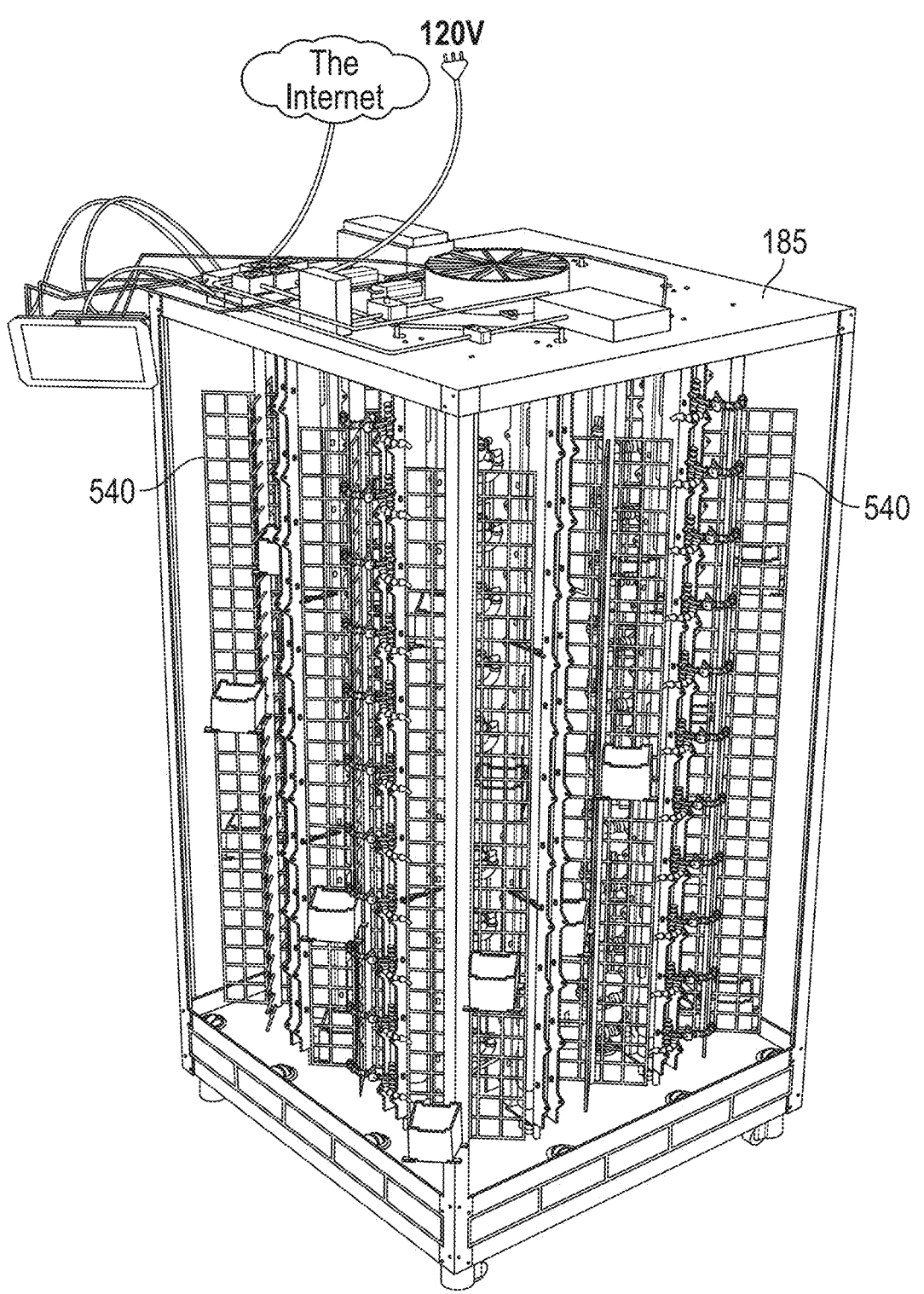
FIG. 32 is a front top perspective view of the interior of an exemplary embodiment equipped with a plurality of lattice structures for viney plants with the doors not illustrated to aid in visualization.

FIG. 32 is a front top perspective view of the Third Exemplary Embodiment, being equipped with a plurality of lattice structures for viney plants (540) and illustrated without doors (170) to allow for better visualization of the interior. Internet and 120 Volt alternating current electrical connectivity are also shown.

FIG. 33 is a front top perspective view of an exemplary embodiment of a lattice structure for viney plants (540), comprising a plurality of lateral containment structures (538), each of which rests on a spacer/pod subfloor (536) with a drain port aperture (510), which, in turn, are supported by a climbing lattice (544) which is connected to a central rod (542). FIG. 46 further illustrates that the spacer/pod subfloor (536) is connected by a means for attaching a spacer/pod subfloor, which is shown in that Figure's exemplary embodiment as comprising a bolt (546) and a washer and nut (548). However, as noted in the definition of the phrase "means for attaching a spacer/pod subfloor" in the Lexicography, the "means for attaching a spacer/pod subfloor" could also include other apparatuses which are known to those skilled in the art, all of which are claimed.

Figure 34:
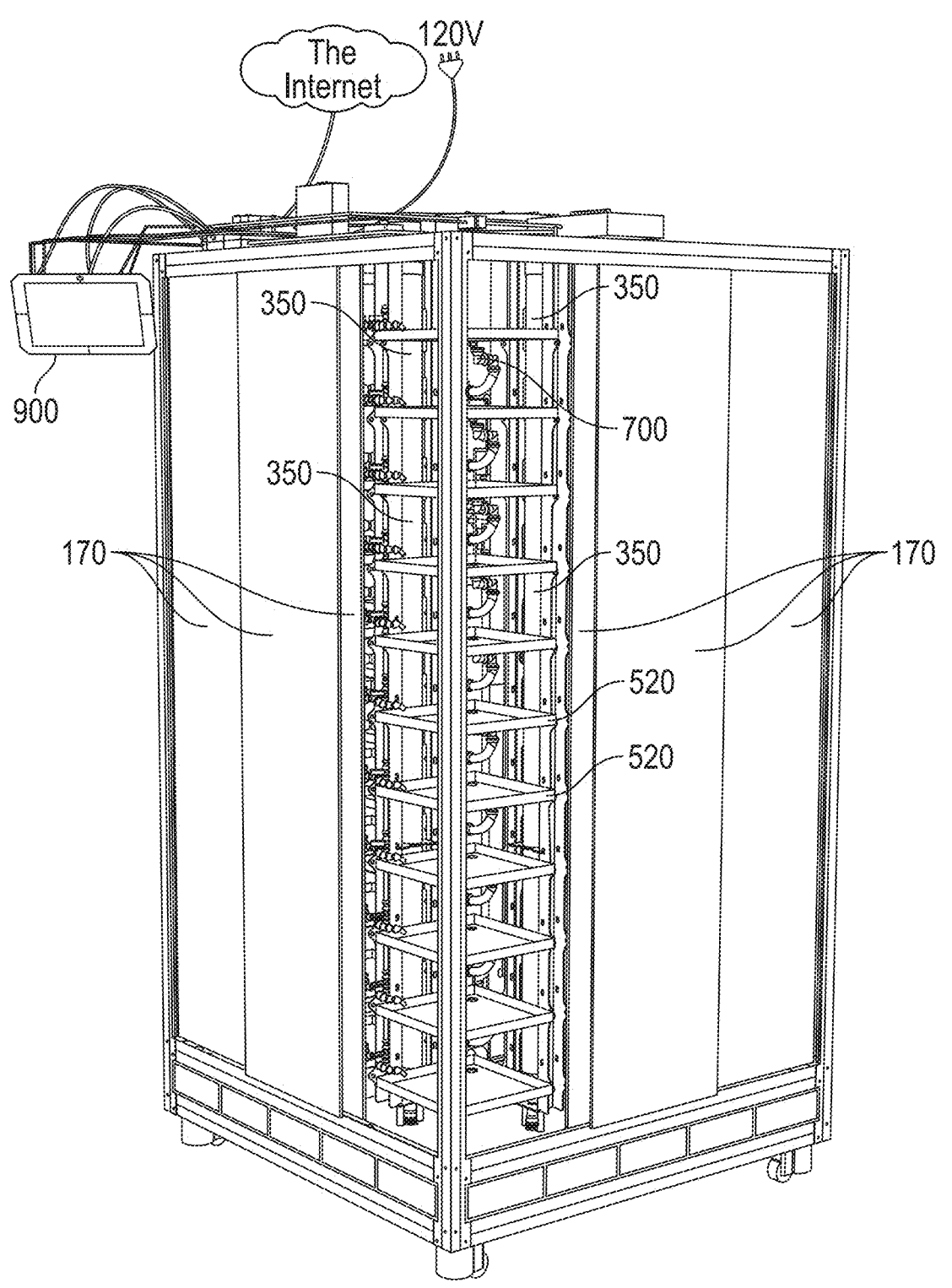
FIG. 34 is a front perspective view of an exemplary embodiment showing the exterior of the cabinet showing a plurality of the doors open and a plurality of growing trays.

FIG. 34 is a front perspective view of the First Exemplary Embodiment showing the exterior of the cabinet (100) showing a plurality of the doors (170) open and a plurality of growing trays (520), along with the positions of a plurality of LED bulbs (350) and an environmental control system computer (900). Internet connectivity and the ability to connect to a 120 Volt alternating current electrical source are also depicted.

FIG. 47 is a fragmentary view providing a closeup view of various elements near and in the return tub (740), including a lateral subframe member (130), a plurality of air filters (220), a lateral frame member (150), a floor (160), a plurality of air flow nozzles (230), a plurality of adjustable air vents (235), a plurality of inner support members (187), a water detector sensor (1070), a UV filter supply hose (728), an ultraviolet filter (730), a return pump feed hose (742), a return pump (750), a reservoir return hose (752), and a nutrition supply reservoir (600).

FIGS. 35-45 depict screenshots of exemplary embodiments of software that can be used in connection with the portable, deployable, modular, indoor vertical agricultural machine; specifically, they illustrate:

"software for accepting and processing input from the full spectrum suite of environmental sensors" and "software for producing commands to the lighting system control port (820);

the controllable exhaust fan system;

the controllable ultraviolet radiation sterilizing filtration system;

the controllable nutrition supply pump system; and the controllable return pump system"

as those two phrases are defined in the Lexicography.

Figure 35:
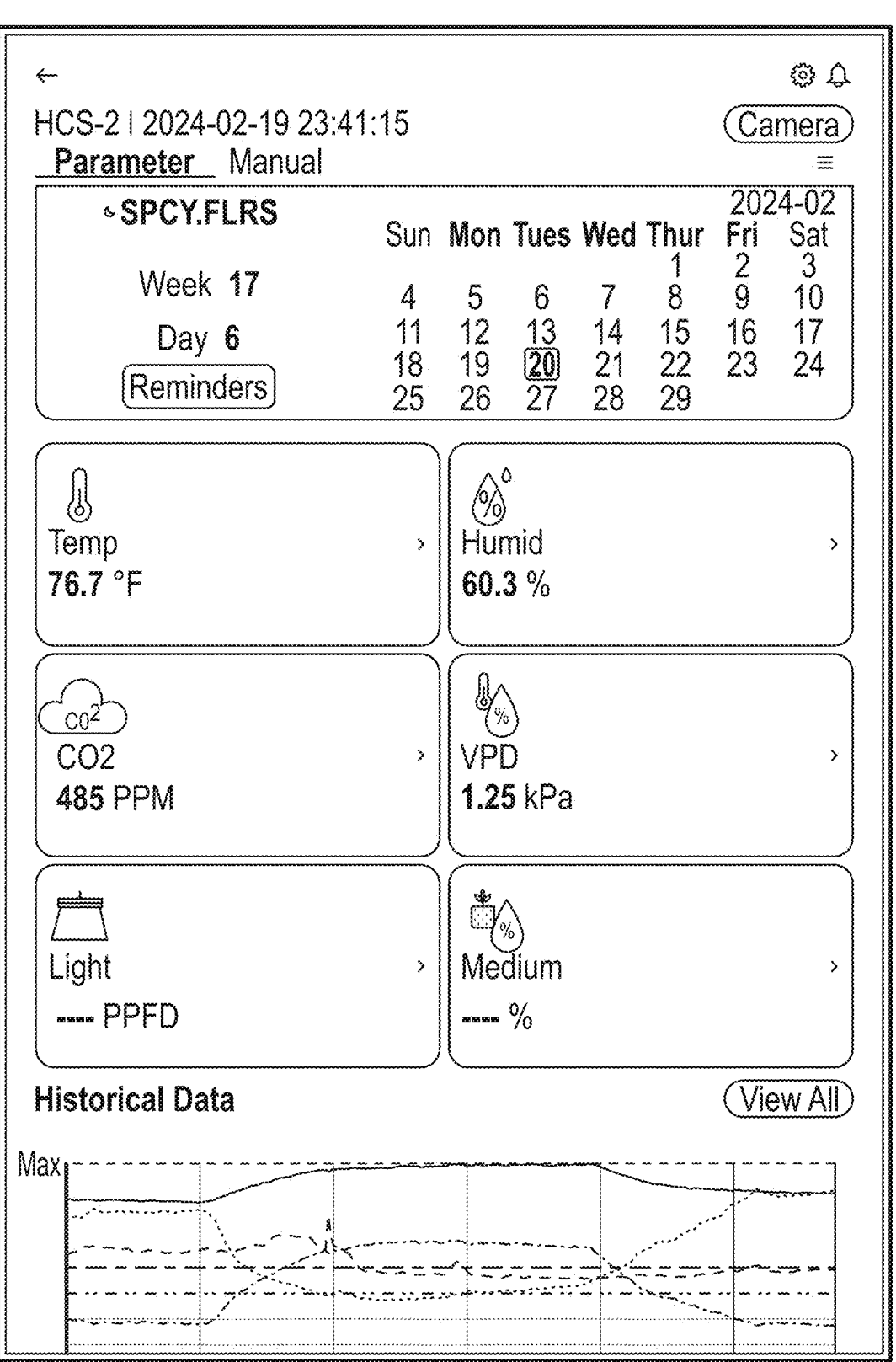
FIG. 35 is a screenshot of an exemplary embodiment of software showing environmental parameters monitorable by the software, including temperature, humidity, carbon dioxide, vapor pressure, light intensity, percent of moisture in the plant growth medium, and a real time historical graph of these environmental parameters.

FIG. 35 is a screenshot of an exemplary embodiment of software showing environmental parameters monitorable by the software, including temperature, humidity, carbon dioxide, vapor pressure, light intensity, percent of moisture in the plant growth medium, and a real time historical graph of these environmental parameters.

Figure 36:
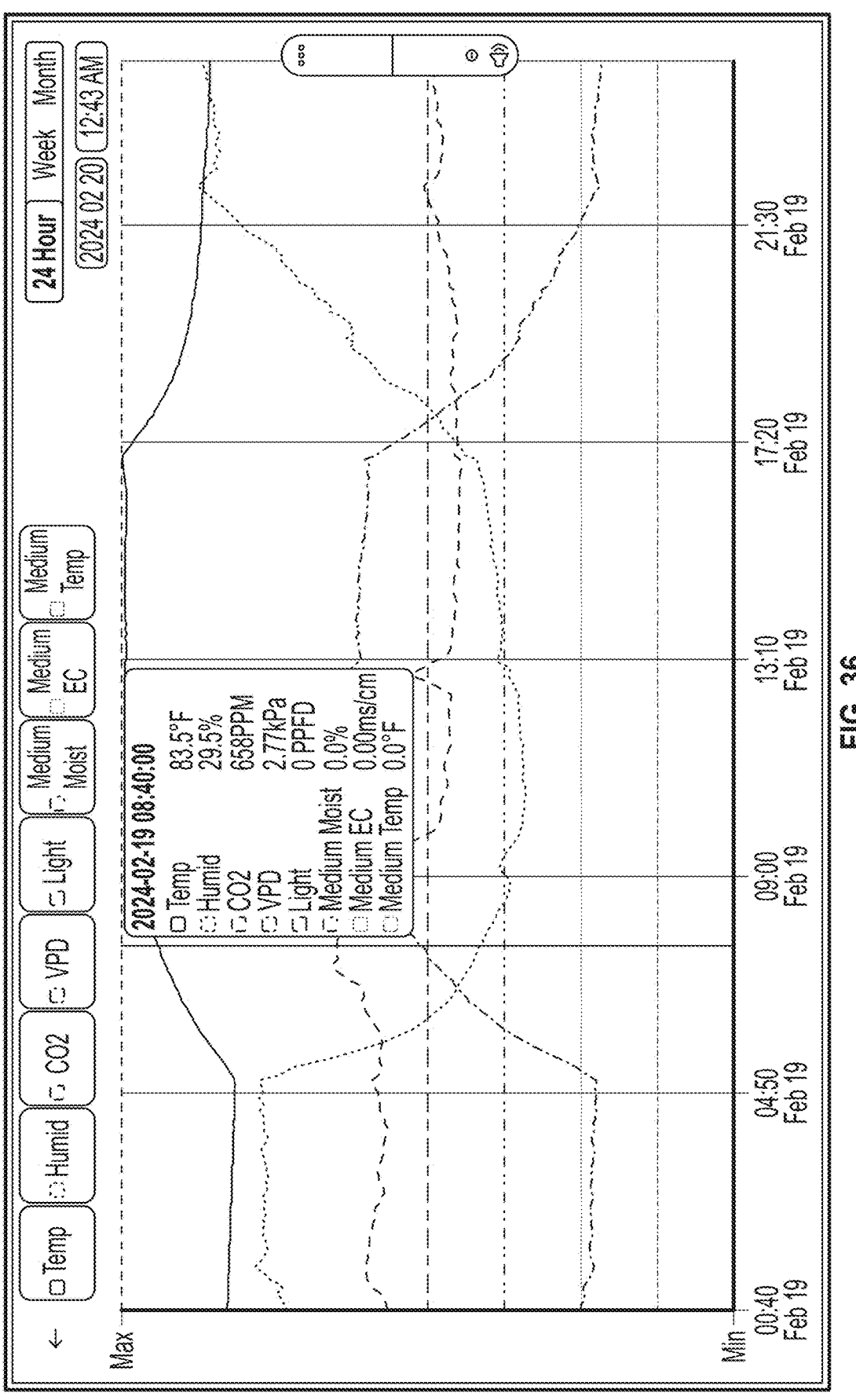
FIG. 36 is a screenshot of an exemplary embodiment of software showing a graph of environmental parameters monitorable by the software, including temperature, humidity, carbon dioxide, vapor pressure, light intensity, medium moisture, medium electroconductivity, and temperature of the plant growth medium.

FIG. 36 is a screenshot of an exemplary embodiment of software showing a graph of environmental parameters monitorable by the software, including temperature, humidity, carbon dioxide, vapor pressure, light intensity, plant growth medium moisture, plant growth medium electroconductivity, and plant growth medium temperature.

Figure 37:
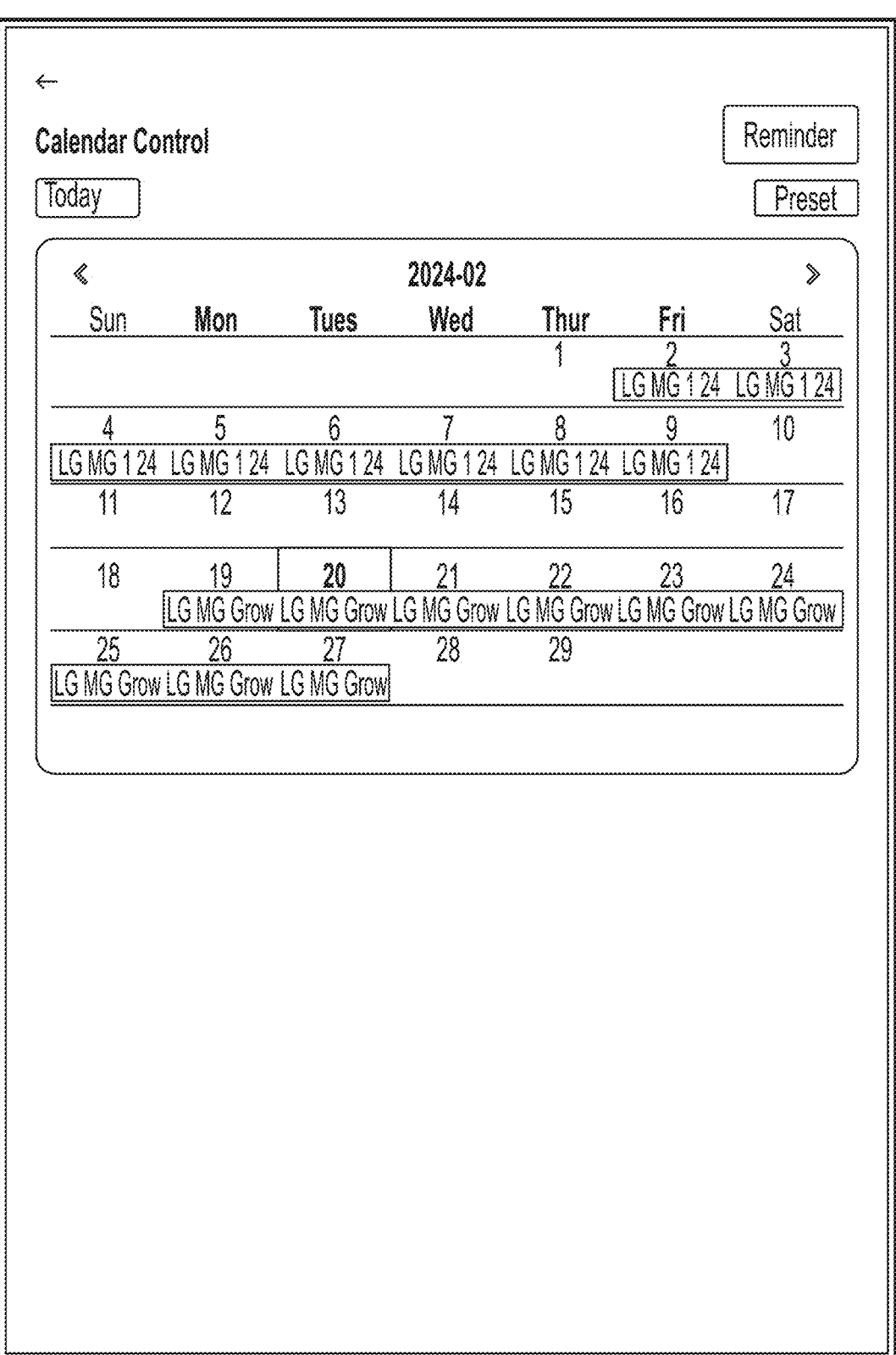
FIG. 37 is a screenshot of an exemplary embodiment of software showing, as a function of time in a calendar interface, the programmability of: light duration, intensity, and wavelength; rates of air flow, water flow and carbon dioxide flow; temperature; and humidity.

FIG. 37 is a screenshot of an exemplary embodiment of software showing the programmability of light duration, intensity, wavelength; the rates of air flow, water flow and carbon dioxide flow; temperature, and humidity, all as a function of time in a calendar interface.

Figure 38:
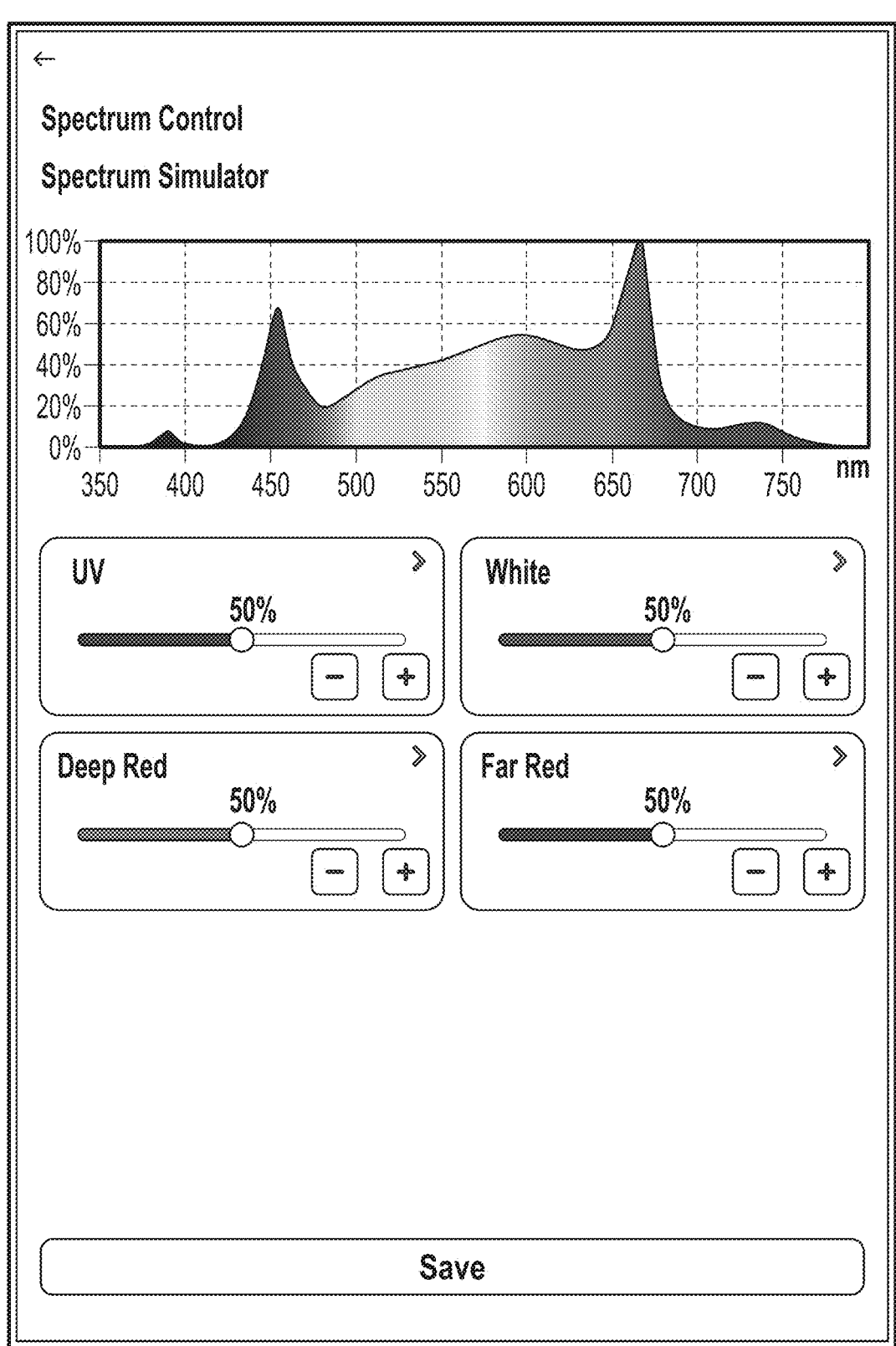
FIG. 38 is a screenshot of an exemplary embodiment of software showing the programmability of the intensity of light in the electromagnetic spectrum for ultraviolet, deep red, far red and white light and a graph of the resulting intensities of each wavelength of the light.

FIG. 38 is a screenshot of an exemplary embodiment of software (which can be either a downloadable smart phone application or a browser-based URL interface to cloud-based software) that can be used to programmably control the intensity of light in the electromagnetic spectrum for ultraviolet, deep red, far red and white light and to produce a graph of the resulting intensities of each wavelength of the light.

FIG. 39 is a screenshot of an exemplary embodiment of software showing the ability of smart phone application software to be programmed to simulate clouds moving overhead by dimming and increasing the intensity of the LED bulbs according to various programmable parameters including the percent of possible LED bulb power output, whether temperature is to be considered via an average over time or in real time, on and off times for the LED bulbs, the temperature at which to dim the LED bulbs, the temperature at which to shutdown the LED bulbs, a start and end time for cloud simulation, the percent of power consumption by which to dim the LED bulbs, the time for sunrise or sunset and the amount of time to dim the LED bulbs.

Figure 40:
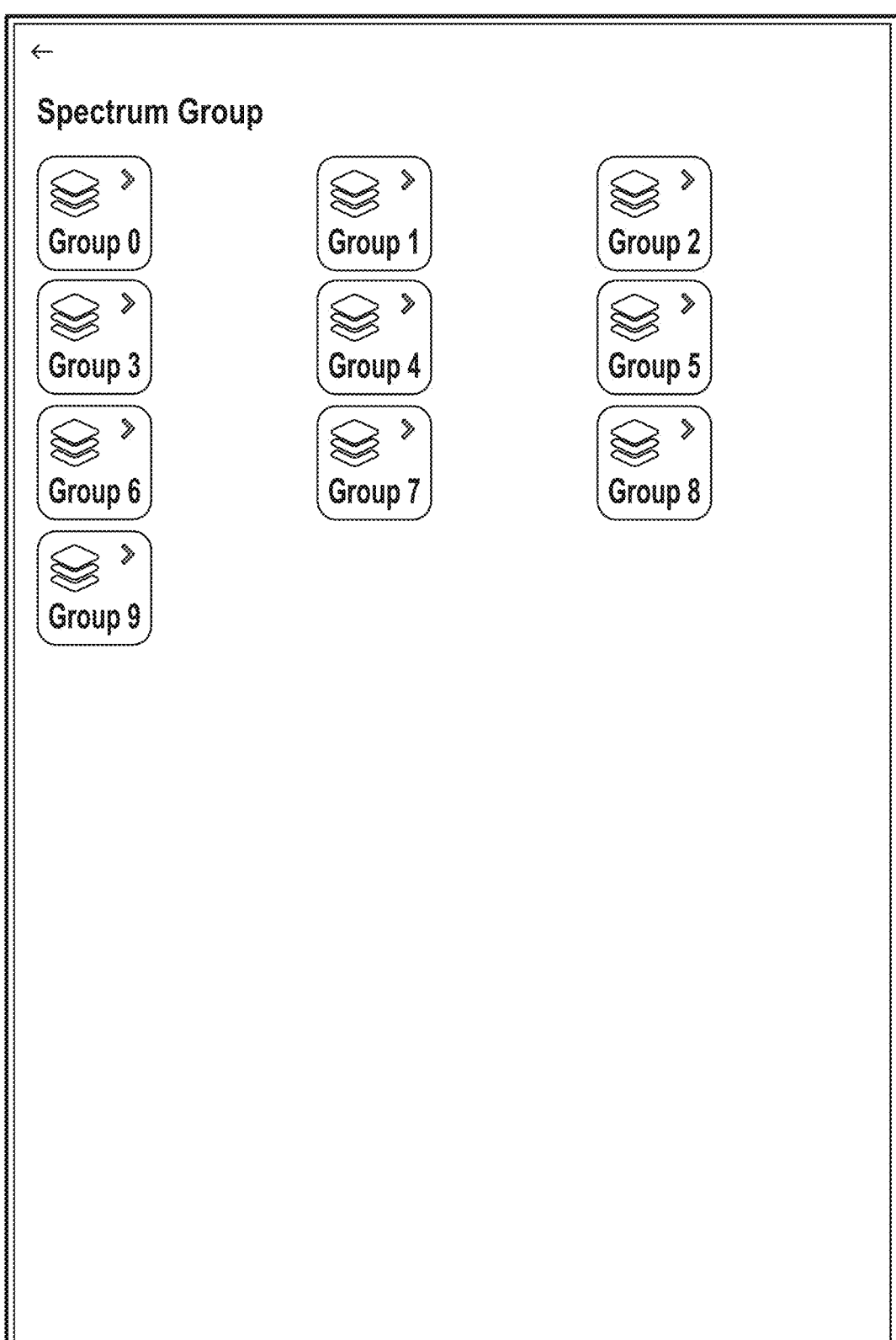
FIG. 40 is a screenshot of an exemplary embodiment of software showing the ability of the software to create and control groups of the disclosed exemplary embodiments independently of each other using different programmable parameters.

FIG. 40 is a screenshot of an exemplary embodiment of software showing the ability of the software to create and control groups of the disclosed exemplary embodiments independently of each other using different programmable parameters.

Figure 41:
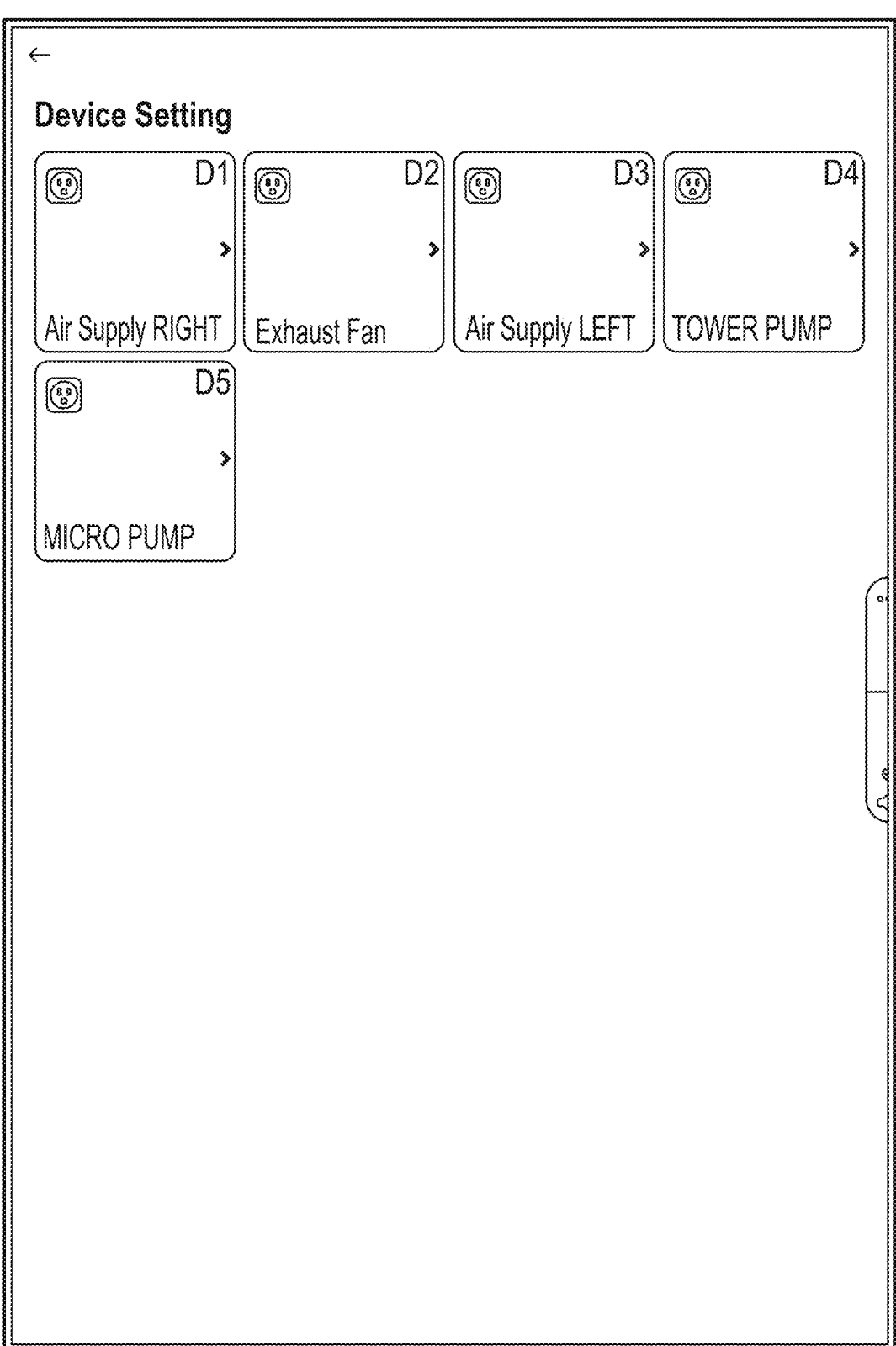
FIG. 41 is a screenshot of an exemplary embodiment of software showing the ability of the software to programmably control various devices of the disclosed exemplary embodiments such as a plurality of air supplies, a plurality of pumps and, an exhaust fan.

FIG. 41 is a screenshot of an exemplary embodiment of software showing the ability of the software to programmably control various devices of the disclosed exemplary embodiments such as a plurality of air supplies, a plurality of pumps and, an exhaust fan.

FIG. 42 is a screenshot of an exemplary embodiment of software showing the ability of the software to programmably control various devices of the disclosed exemplary embodiments such as an air supply; whether to govern air supply settings according to a default set of rules or a timer; the mode of operation for a device controlling a function and whether it should operate only during the day or only during the night; whether the device is to be activated by temperature, and, if so, whether to activate heating or cooling; whether the device is to be activated by humidity, and, if so, whether to dehumidify or humidify; whether the device exhausts carbon dioxide, injects carbon dioxide and whether to employ fuzzy logic to decide; when a controlled device is to turn on and turn off; whether to engage an interlock; whether to engage high temperature protection for a device and, if so, at what temperature; and whether to activate a hot start delay for a device, and, if so, the amount of the delay; and the ability to save the settings so specified.

Figure 43:
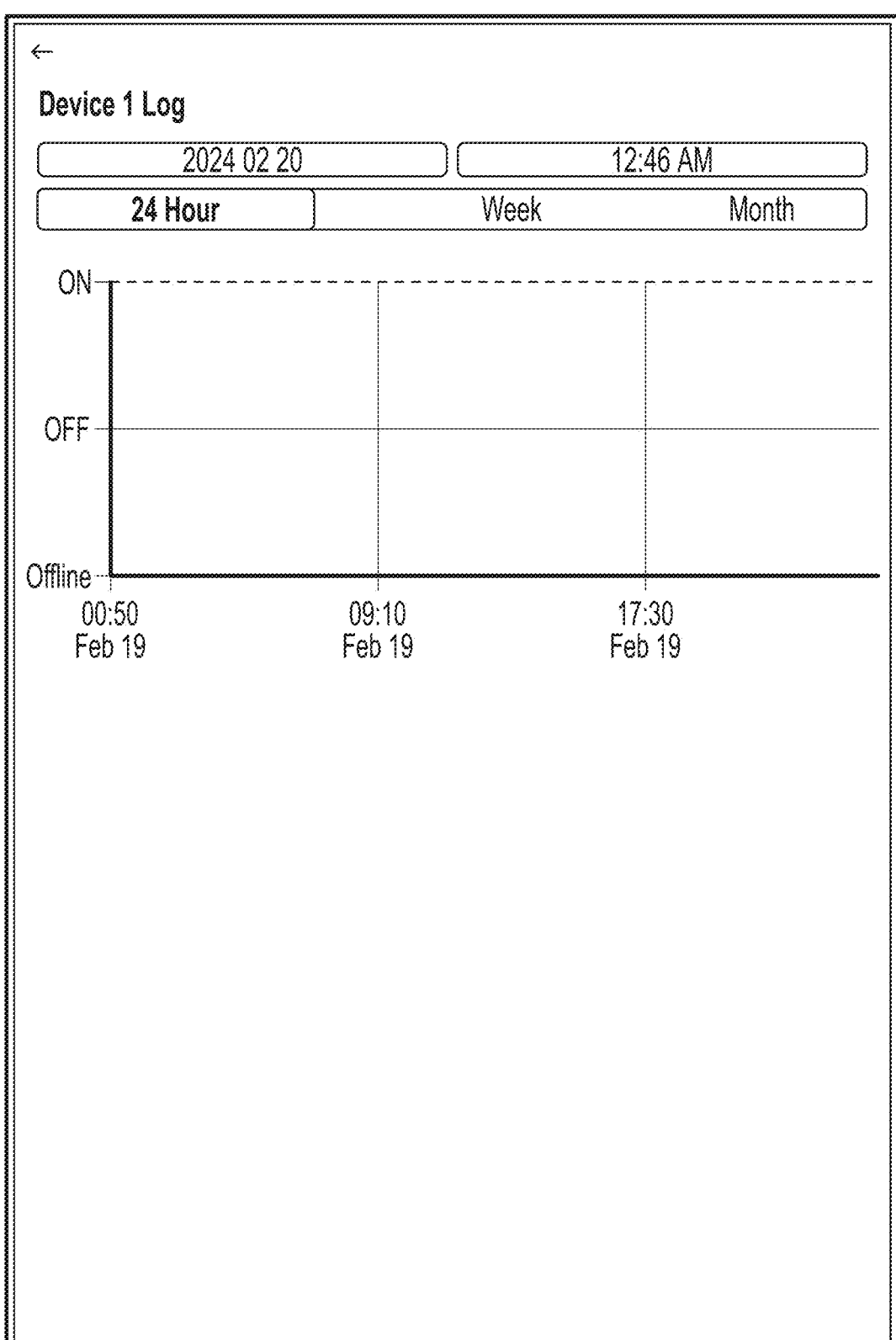
FIG. 43 is a screenshot of an exemplary embodiment of software showing the ability of the software to log the times of operation of various devices of the disclosed exemplary embodiments hourly, weekly or monthly.

FIG. 43 is a screenshot of an exemplary embodiment of software showing the ability of the software to log the times of operation of various devices of the disclosed exemplary embodiments hourly, weekly or monthly.

Figure 44:
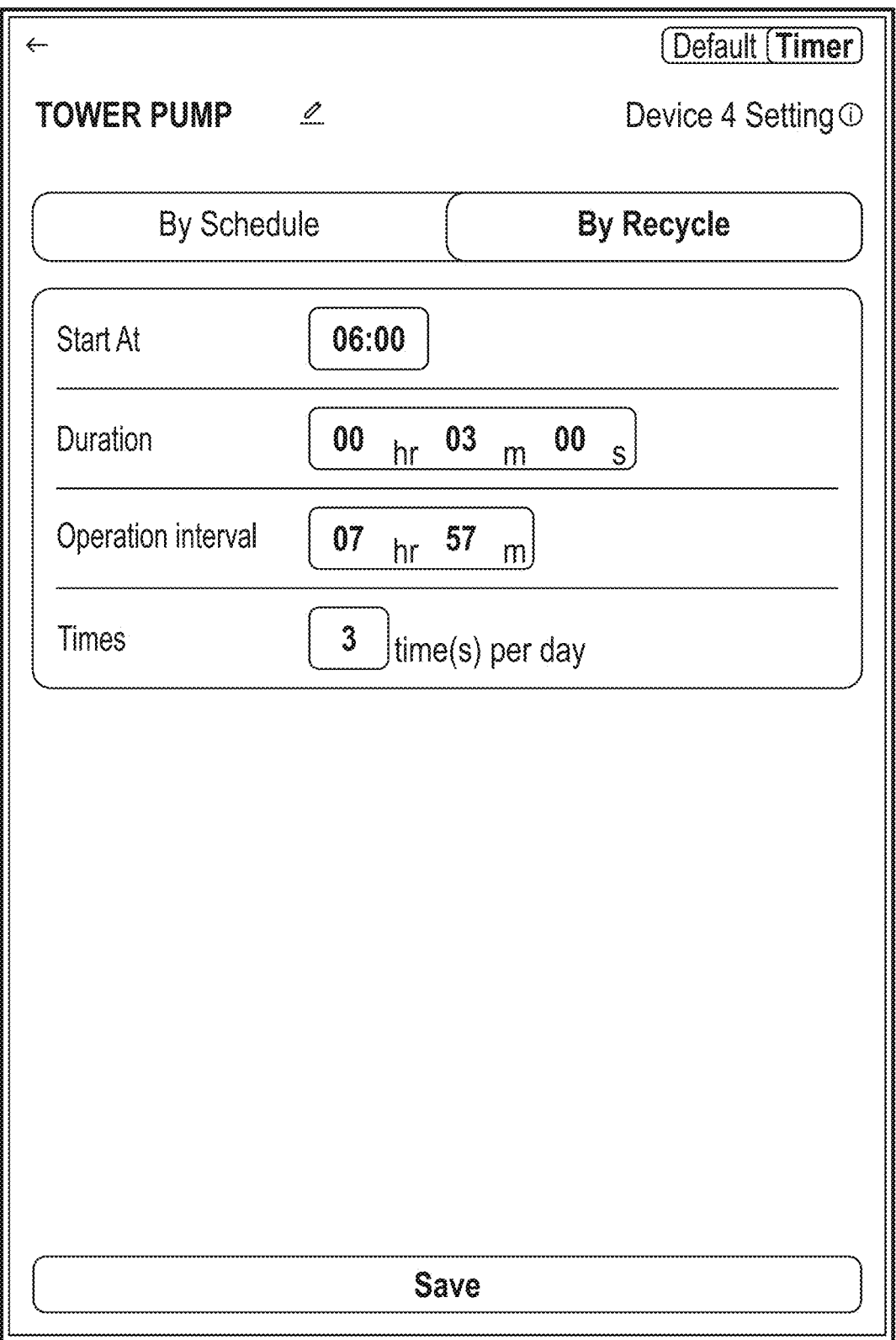
FIG. 44 is a screenshot of an exemplary embodiment of software showing the ability of the software to programmably control various devices of the disclosed exemplary embodiments such as a pump by allowing its run time to be programmably controlled by start time, duration, operation interval and number of times per day.

FIG. 44 is a screenshot of an exemplary embodiment of software showing the ability of the software to programmably control various devices of the disclosed exemplary embodiments such as a pump by allowing its run time to be programmably controlled by start time, duration, operation interval and number of times per day.

Figure 45:
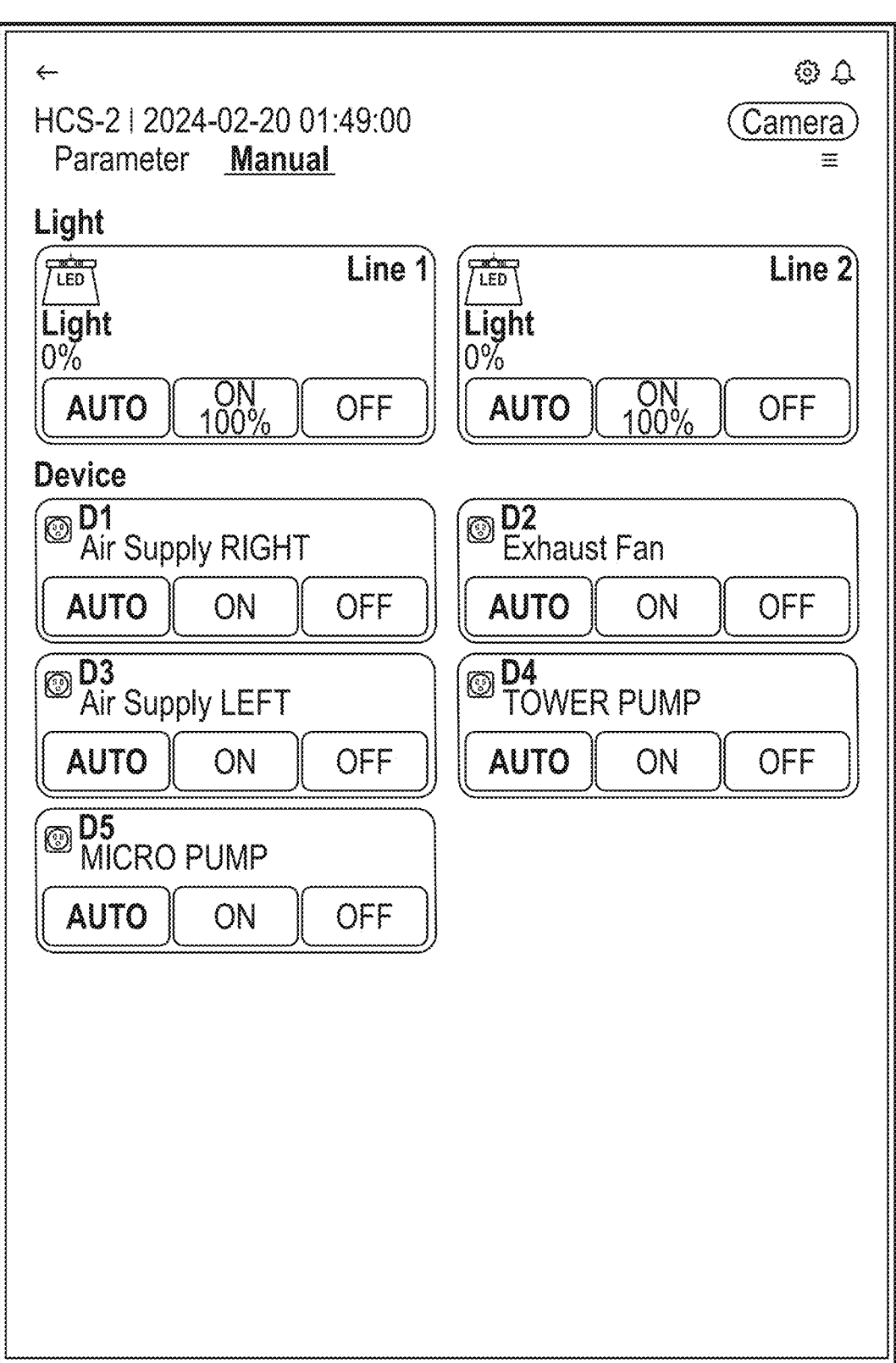
FIG. 45 is a screenshot of an exemplary embodiment of software showing the ability of the software to programmably control various devices of the disclosed exemplary embodiments such as an LED bulb, a plurality of air supplies, a plurality of pumps, and an exhaust fan programmably controlled or to be turned off or on via software commands.

FIG. 45 is a screenshot of an exemplary embodiment of software showing the ability of the software to programmably control various devices of the disclosed exemplary embodiments such as an LED bulb (350), a plurality of air supplies, a plurality of pumps, and an exhaust fan (290) programmably controlled or to be turned off or on via software commands.

Lexicography and Special Definitions

As used in this application, the following terms are defined as indicated below unless stated otherwise elsewhere.

"dry-contact relay" means any module that will allow connection and control of devices by an environmental control system computer (as defined below) or by a nutrition supply and monitoring control computer (as defined below); a non-limiting example of a dry-contact relay is a TrolMaster DSD-1 Dry Contact Station.

"electrical conductivity and temperature sensor for liquids" means any sensor that will measure the temperature and electrical connectivity of liquid solutions, such as, for a non-limiting example, the TrolMaster PCT-3 Drop-in/inline Heavy Duty Nutrient EC & Temp Sensor.

"environmental control system computer comprising
a central processing unit capable of running the software;
a means for storing and retrieving data;
a means for data input;
a means for reading data output"
means any main controller comprising a central processing unit, a means for storing and retrieving data from a full spectrum suite of environmental sensors, a means for data input, and a means for reading data output, such as, for a non-limiting example, a Hydro-X Pro System/HCS-2 main controller.

"fertigation" means the practice of applying fertilizer through an irrigation system with water soluble nutrients to supply crops with optimal levels of water and nutrients, which are essential components for proper growth.

"full spectrum suite of environmental sensors" means both (A) a sensor, such as, by non-limiting example, TrolMaster's MBS-PAR Full Spectrum Quantum Sensor, that will measure photosynthetically active radiation (PAR) from all light sources used to grow plants in the spectral range of 389 to 692 nm and which will automatically increase or decrease the output level of ultraviolet lighting systems to continuously maintain the exact lighting level (in PPFD) that the user selects; and (B) an environmental sensor, such as, by non-limiting example, TrolMaster's MBS-Pro 4-in-1 Sensor for Hydro-X Pro and Hydro-X Plus, that act as a photocell and provide data regarding temperature, humidity, and carbon dioxide levels.

"lateral containment structure" means any structure that is enclosed on the sides, but not the bottom or the top, that is capable of containing a plant growth medium laterally; a non-limiting example for such a lateral containment structure is shown as element (538) in FIG. 28, but a lateral containment structure need not be rectangular or square, but could be any other shape.

"lighting system control port" means a lighting adapter designed to allow the environmental control system computer (900) to control lights that use the 0-10V protocol control, such as LEDs by Fluence, Next light, and Photobio; a non-limiting example of a lighting system control port is the LMA-14 Lighting Control Adapter F by TrolMaster and any other command-enabled lighting system.

"MDR power supply" means a 40 watt, 5 volt output DIN rail electrical power supply with a 110-203 volt input; a non-limiting example of an MDR power supply is a Mean Well MDR-40-5 AC-DC 6 amp Industrial DIN rail power supply.

"means for attaching the spacer/pod subfloor" is defined as any fastener known to those skilled in the art of fasteners, all of which are claimed, capable of affixing the spacer/pod subfloor to a climbing lattice; non-limiting examples of means for attaching a spacer/pod subfloor include a bolt and a washer and nut, a screw, a bent tab, an "S"-shaped hook or fastener, a "U"-shaped bracket, a weld or making the spacer/pod subfloor as one piece with the climbing lattice.

"nutrient pH sensor" means a sensor designed to measure acidity/basicity pH value in liquid solution, such as, by way of a non-limiting example, TrolMaster's PPH-3 Drop-in/inline Heavy Duty Nutrient pH Sensor.

"nutrition supply and monitoring control computer comprising
a central processing unit capable of running the software;
a means for storing and retrieving data;
a means for data input;
a means for reading data output"
means any main controller comprising a central processing unit, a means for storing and retrieving data from a full spectrum suite of environmental sensors, a means for data input, and a means for reading data output, such as, for a non-limiting example, a TrolMaster NFS-3 Aqua-X Plus Irrigation Control System.

"nutrition supply pump" means any electrically-powered water pump capable of moving water from the return tub (740) through the ultraviolet filter (730) and into the nutrition supply reservoir (600).

"nutrition supply pump output control rheostat" means a variable resistor(s) or adjustable resistor(s) used to divide voltage in applications that require the adjustment of resistance in an electrical circuit, in this case, to control the output of the nutrition supply pump.

"plant growth medium" means rockwool, coconut husk, bamboo paper, hemp fiber and other similar mediums that cohere, hold moisture and are suitable for the germination and growth of seeds and can also include soil that is contained in a permeable grow bag.

"port for controlling a full spectrum suite of environmental sensors" means any splitter hub that provides one RJ12 cable input jack to a plurality of RJ12 output jacks; a non-limiting example of said port for controlling a full spectrum suite of environmental sensors is TrolMaster's SPH-1 RJ12 Splitter Hub.

"port for controlling a ventilation system, an ultraviolet radiation sterilizing filtration system, a fertigation supply system pump and a fertigation drain and return system pump" means any splitter hub that provides one RJ12 cable input jack to a plurality of RJ12 output jacks; a non-limiting example of said port for controlling a full spectrum suite of environmental sensors is TrolMaster's SPH-1 RJ12 Splitter Hub.

"powered dry contact board" means an electrical connection device that allows a main controller to control a plurality of devices including cooling, heating, dehumidification, humidification, carbon dioxide, lights, irrigation pumps, and solenoids and which can be connected to a 100-240 volt power supply; a non-limiting example of a powered dry contact board is a TrolMaster OM-8 Dry Contact Board.

"power supply (270)" means a DIN rail electrical power supply with a 12 volt direct current output that will accept input voltage of 120-240 volts alternating current; a non-limiting example of a power supply that could serve as element (270) is a Mean Well NDR-120-12 12Vdc DIN Rail Power Supply.

"power supply (670)" means a DIN rail electrical power supply with a 24 volt direct current output that will accept input voltage of 120-240 volts alternating current; a non-limiting example of a power supply that could serve as element (670) is a Mean Well NDR-120-24 24Vdc DIN Rail Power Supply.

"programmable timer module" means a module that will allow any device that needs to be controlled by time to be connected to and controlled by an environmental control system computer (as defined); a non-limiting example of a programmable timer module is the TrolMaster DSP-1 Program Device Station.

"self-leveling caster" means plate casters equipped with a leveling pad so that when the leveling pad is lowered, it lifts the wheel slightly off the ground, rendering the piece of equipment stationary. Elements (110) and (190) refer to the leveling pad (sometimes also referred to as a "leg") and the plate casters (sometimes also referred to as a "caster wheel") and, collectively, are parts of a self-leveling caster.

"sensor interface board" means a module that will connect the nutrition supply and monitoring control computer to a set of precision pH/environmental control & temperature probes to constantly measure the pH/EC & temperature of the water being sampled. A non-limiting example of a sensor interface board is the TrolMaster AMP-2 module Sensor Board for Aqua-X only.

"software for accepting and processing input from the full spectrum suite of environmental sensors" means remote control web-based software that can be used from a touch screen display and associated smart phone application capable of providing real-time data from sensors and control modules, as well as user notifications, and which allows remote control and monitoring through the internet with any desktop, laptop, smartphone or tablet. One non-limiting example of software for accepting and processing input from the full spectrum suite of environmental sensors is the TrolMaster software on its HCS-2 Hydro-X Pro System, which allows monitoring of temperature, humidity, and carbon dioxide, as well as smoke, water leakage and abnormal moisture level in the plant growth medium, to measure and track the percentage of water or nutrients within the plant growing medium, and to generate user alerts regarding these monitored conditions.

"software for producing commands to
the lighting system control port;
the controllable exhaust fan system;
the controllable ultraviolet radiation sterilizing filtration
    system;
the controllable nutrition supply pump system; and
the controllable return pump system"
means remote control web-based software that can be used from a touch screen display and associated smart phone application capable of issuing control commands to low voltage control devices; that can control multiple sub-zones to ensure a complete and balanced growing environment by allowing separate control on device groups by assigning specific sensors to control specific device modules; that can be used to calculate the exact amount of light needed to enhance plant growth rates and to save energy; that can craft desired light recipes on LED ultraviolet lights, with adjustable ultraviolet, white, deep red, and far-red spectra; that can ramp up or ramp down light intensity; that can send commands to simulate natural cloud movements to mimic a natural outdoor-like environment and create a stress-free light environment for plants while optimizing power efficiency; that will automatically reduce the power to the lights, or turn lights off, or lower fan speed or turn off equipment when spraying plants, and then turn the equipment back on to the initial setting after a period of time. One non-limiting example of said software for producing commands is the TrolMaster software on its HCS-2 Hydro-X Pro System.

"splitter hub" means any hub that provides one RJ12 cable input jack to a plurality of RJ12 output jacks; a non-limiting example of said splitter hub is TrolMaster's SPH-1 RJ12 Splitter Hub.

"water detector" means any sensor that can both act as a leak-detector and as a water-verification monitor and which can communicate with a nutrition supply and monitoring control computer; a non-limiting example of a water detector is TrolMaster's WD-1 Water Detector.

While the present exemplary embodiments are shown in the drawings and fully described above with particularity and detail, it will be apparent to those of ordinary skill in the art that many modifications thereof may be made without departing from the principles and concepts set forth herein, including, but not limited to, variations in size, materials, shape, form, function and manner of operation, assembly, and use.

Hence, the proper scope of the present application should be determined only by the appended claims to encompass all such modifications as well as all relationships equivalent to those illustrated in the drawings and described in the specification.

Finally, it will be appreciated that the purpose of the annexed Abstract is to enable various patent offices throughout the world, the public generally, and especially the scientists, engineers, and practitioners in the art who are not familiar with patent or legal terms or phraseology, to determine quickly from a cursory inspection the nature and essence of the technical disclosure of this application. Accordingly, the Abstract is not intended to define the invention or the application, which are defined only by the claims, and the Abstract is not intended to limit the scope of the invention in any way.

INDUSTRIAL APPLICABILITY

The disclosed embodiments and the methods associated therewith have applicability to the area of machinery for creating portable, deployable, modular, indoor vertical agricultural machinery that can be used to efficiently grow a variety of plants.

CITATION LIST

Patent Literature

Bertram, US 2023/0020175 A1, "Vertical Farming Systems and Methods."
Tran, U.S. Pat. No. 11,631,243 B2, "Indoor Growing System."

The invention claimed is:

1. An apparatus, known as a portable modular indoor vertical agricultural growing machine, said apparatus comprising:
   a cabinet comprising
      a plurality of legs;
      a plurality of vertical frame members;
      a plurality of lateral subframe members that are connected to the vertical frame members and which support a subfloor;
      a plurality of lateral frame members that are connected to the vertical frame members and which support a floor and a plurality of doors;
      a plurality of lateral top frame members that are connected to the vertical frame members and which support a top cover; and
      a plurality of inner support members which extend from the floor to the top cover;
   a ventilation system comprising
      an air filtration chamber comprising
         the plurality of lateral subframe members;
         the subfloor;
         the plurality of lateral frame members;
         an air filter; and
         the floor, said floor being further comprised of a plurality of air flow nozzles and adjustable air vents that penetrate said floor;

a grow chamber comprising
   the plurality of lateral frame members;
   the floor;
   the plurality of vertical frame members;
   the plurality of doors;
   the top cover, said top cover comprising at least one
      exhaust port; and
   a controllable exhaust fan system comprising these
      electrically connected elements
      an exhaust fan control rheostat;
      a first power supply;
      a first programmable timer module; and
      a fan;
a lighting system comprising
   an LED driver;
   a light wiring harness;
   a light holder;
   a plurality of mounting spacers; and
   an LED bulb;
a structural column support comprising
   a plurality of type A column support members and type
      B column support members; and
   an LED bulb spacer/holder;
a plant support system comprising
   a plurality of structural support pins;
   a plurality of growing trays each of those growing trays
      having a first drain port aperture;
a fertigation supply system comprising
   a controllable ultraviolet radiation sterilizing filtration
      system that is fluidly connected to a return tub, said
      controllable ultraviolet radiation sterilizing filtration
      system comprising these electrically connected ele-
      ments
      an ultraviolet filter; and
      a second programmable timer module;
   a return pump fluidly connected to the ultraviolet filter;
   a nutrition supply reservoir fluidly connected to the
      return pump;
   a controllable nutrition supply pump system compris-
      ing the following electrically connected elements
      a first splitter hub containing ports for controlling the
         ventilation system, the ultraviolet radiation steril-
         izing filtration system, a fertigation supply system
         pump, and a fertigation drain and return system
         pump;
      a third programmable timer module;
      a second power supply;
      a nutrition supply pump;
      a nutrition supply pump output control rheostat; and
      an MDR power supply;
   a master manifold;
   a plurality of sub-manifolds;
   a plurality of columnar supply conduits;
   a plurality of supply hoses fluidly connecting said
      nutrition supply reservoir, said nutrition supply
      pump, said master manifold, the plurality of sub-
      manifolds; and
   the plurality of columnar supply conduits;
   a plurality of liquid delivery conduits fluidly connected
      to said columnar supply conduits; and
   a plurality of liquid delivery nozzles fluidly connected
      to said liquid delivery conduits,
a fertigation drain and return system comprising
   a plurality of removable drain ports fluidly connected to
      a plurality of liquid drain conduits;

a columnar drain that is fluidly connected to the plu-
      rality of liquid drain conduits fluidly connected to a
      discharge hose; and
   the return tub;
an interface for an environmental control system, said
   interface comprising a plurality of ports for controlling
   the ventilation system, the ultraviolet radiation steril-
      izing filtration system, the fertigation supply system
      pump and the fertigation drain and return system
      pump;
   a full spectrum suite of environmental sensors; and
   the lighting system;
an environmental control system comprising
   the full spectrum suite of environmental sensors;
a nutrition supply control system comprising
   a sensor interface board that is electrically connected to
      a nutrient pH sensor;
      an electrical conductivity and temperature sensor for
         liquids; and
   a second splitter hub that is electrically connected to
      a plurality of water detectors and water detector
         sensors.

2. The apparatus of claim 1 in which the environmental
control system further comprises
   a first software for accepting and processing input from
      the full spectrum suite of environmental sensors;
   a second software for producing commands to
      the lighting system control port;
      the controllable exhaust fan system;
      the controllable ultraviolet radiation sterilizing filtra-
         tion system;
      the controllable nutrition supply pump system; and
      the controllable return pump system;
   the environmental control system computer comprising
      a central processing unit capable of running the first
         and second softwares;
      a first means for storing and retrieving data;
      a means for data input;
      a means for reading data output;
   and the nutrition supply control system further comprises
      a data connection to a nutrition supply and monitoring
         control computer from said sensor interface board
         and said second splitter hub;
      a third software for accepting and processing input
         from
         the nutrient pH sensor;
         the electrical conductivity and temperature sensor
             for liquids;
         the plurality of water detectors and water detector
             sensors;
      the nutrition supply and monitoring control computer
         comprising
         a central processing unit capable of running the third
             software;
         a second means for storing and retrieving data;
         the means for data input; and
         the means for reading data output.

3. The apparatus of claim 1 in which the plant support
system is a hanging pod structure comprising
   a plurality of rods;
   a plurality of set screw collars;
   a spacer/pod subfloor with a second drain port aperture;
   a lateral containment structure that fits between the plu-
      rality of rods and sets atop the spacer/pod subfloor; and
   a top spacer conformably made to extend through the top
      cover.

4. The apparatus of claim 1 in which the plant support system is a lattice structure for viney plants, said lattice structure for viney plants comprising a central rod conformably made to extend through the top cover;

a plurality of climbing lattices extending outward from the central rod and conformably arranged to hold the spacer/pod subfloor;

the spacer/pod subfloor;

the lateral containment structure that sets atop the spacer/pod subfloor with the second drain port aperture; and a means for attaching the spacer/pod subfloor to the climbing lattice.

5. The apparatus of claim 1 in which the fertigation supply system comprises the controllable ultraviolet radiation sterilizing filtration system that is fluidly connected to the return tub, said controllable ultraviolet radiation sterilizing filtration system comprising these electrically connected elements the ultraviolet filter; and the second programmable timer module;

the return pump fluidly connected to the ultraviolet filter;

the nutrition supply reservoir fluidly connected to the return pump;

the controllable nutrition supply pump system comprising the following electrically connected elements the first splitter hub containing ports for controlling the ventilation system, an ultraviolet radiation sterilizing filtration system, the fertigation supply system pump, and the fertigation drain and return system pump;

a first dry contact board;

a plurality of the nutrition supply pumps;

the master manifold;

a plurality of the sub-manifolds;

a plurality of the columnar supply conduits;

a plurality of the supply hoses fluidly connecting said nutrition supply reservoir, said nutrition supply pump, said master manifold, the plurality of sub-manifolds;

and the plurality of columnar supply conduits;

the plurality of liquid delivery conduits fluidly connected to said columnar supply conduits; and the plurality of liquid delivery nozzles fluidly connected to said liquid delivery conduits.

6. The apparatus of claim 5 in which the fertigation supply system is further comprised of the valve that can regulate or eliminate the flow of fertigation to the liquid delivery nozzle.

7. The apparatus of claim 1 in which the controllable nutrition supply pump system comprises the plurality of removable drain ports fluidly connected to a plurality of liquid drain conduits;

the columnar drain that is fluidly connected to the plurality of liquid drain conduits;

the controllable ultraviolet radiation sterilizing filtration system that is fluidly connected to a plurality of the columnar drains, said controllable ultraviolet radiation sterilizing filtration system comprising these electrically connected elements the ultraviolet filter;

a dry-contact relay;

the return tub; and the fertigation supply system comprises the nutrition supply reservoir;

the controllable nutrition supply pump system further comprising the following electrically connected elements a third splitter hub containing ports for the full spectrum suite of environmental sensors;

a second dry contact board;

a plurality of the nutrition supply pumps;

the master manifold;

the plurality of sub-manifolds;

the plurality of columnar supply conduits;

the plurality of supply hoses fluidly connecting said nutrition supply reservoir, said nutrition supply pump, said master manifold, the plurality of sub-manifolds;

and the plurality of columnar supply conduits;

the plurality of liquid delivery conduits fluidly connected to said columnar supply conduits; and the plurality of liquid delivery nozzles fluidly connected to said liquid delivery conduits.

8. The apparatus of claim 1 which further comprises a mounting bracket for securing the environmental control system computer and the nutrition supply and monitoring control computer to the cabinet.

9. The apparatus of claim 1 which further comprises a camera for observing the inside of the grow chamber.

10. The apparatus of claim 1 in which the cabinet contains only a single door on each side.

11. The apparatus of claim 1 in which the cabinet is further comprised of a means for rolling such as a caster wheel or at least one roller.

12. The apparatus of claim 1 in which the cabinet is further comprised of a self-leveling caster.

13. The apparatus of claim 1 in which the fertigation supply system is further comprised of a valve that can regulate or eliminate the flow of fertigation to the liquid delivery nozzle.

* * * * *